United States Patent [19]

Inatani et al.

[11] Patent Number: 5,978,324
[45] Date of Patent: Nov. 2, 1999

[54] DISC RECORDING/REPRODUCING UNIT ELASTICALLY SUPPORTED ON A MAIN BODY OF THE APPARATUS INCLUDING A LOCK MECHANISM FOR THE ELASTIC SUPPORT DEVICE

[75] Inventors: Akihisa Inatani; Shuichi Nagano, both of Kanagawa; Kanji Mita, Tokyo; Shuji Minami, Kanagawa; Haruyuki Tamura, Tokyo; Tsutomu Watanabe, Ibaragi; Akira Katsuyama; Masami Ishikawa, both of Kanagawa; Taiji Noshitani, Tokyo, all of Japan

[73] Assignee: Sony Corporation, Tokyo, Japan

[21] Appl. No.: 08/786,810

[22] Filed: Jan. 21, 1997

Related U.S. Application Data

[62] Division of application No. 08/307,671, Feb. 19, 1995, Pat. No. 5,828,633.

[30] Foreign Application Priority Data

Jan. 30, 1993 [JP] Japan ................................. 5-034749
Jan. 30, 1993 [JP] Japan ................................. 5-034750
Jan. 24, 1994 [JP] Japan ................................. 6-005933

[51] Int. Cl.[6] .................................................. G11B 17/22
[52] U.S. Cl. .......................................................... 369/37
[58] Field of Search ................................. 369/36, 37, 244, 369/191–192, 178

[56] References Cited

U.S. PATENT DOCUMENTS

| | | | |
|---|---|---|---|
| 3,501,153 | 3/1970 | Osborne et al. | 369/37 |
| 4,750,160 | 6/1988 | Miller et al. | 369/37 |
| 5,067,116 | 11/1991 | Kadrmas | 369/37 |
| 5,307,331 | 4/1994 | D'Alayer De Costemore D'Arc | 369/37 |
| 5,504,723 | 4/1996 | Ross | 369/37 |
| 5,615,184 | 3/1997 | Tsuruta et al. | 369/37 |

*Primary Examiner*—Brian E. Miller
*Attorney, Agent, or Firm*—Jay H. Maioli

[57] ABSTRACT

A multiple disc changer apparatus has an elastic support mechanism for supporting the recording/reproducing unit on a main body of the apparatus and includes a locking mechanism for controlling the elastic support of the elastic support mechanism when a disc is loaded on the recording/reproducing unit by a chucking mechanism.

12 Claims, 47 Drawing Sheets

DISC RECORDING/REPRODUCING UNIT ELASTICALLY SUPPORTED ON A MAIN BODY OF THE APPARATUS INCLUDING A LOCK MECHANISM FOR THE ELASTIC SUPPORT DEVICE

This is a division of application Ser. No. 08/307,671 filed Feb. 19, 1995 now U.S. Pat. No. 5,828,633.

TECHNICAL FIELD

This invention relates to a recording and/or reproducing apparatus for a disc-shaped recording medium, such as an optical disc or a magneto-optical disc. More particularly, it relates to a recording and/or reproducing apparatus for a disc-shaped recording medium having an exchange function of disc-shaped recording media in which one of the disc-shaped recording media is selectively taken out from a container unit containing a large number of the disc-shaped recording media and information signals recorded on the thus taken out recording medium, such as music signals, are reproduced from the disc-shaped recording medium, or the information signals, such as music signals, are recorded on the disc-shaped recording medium.

BACKGROUND ART

In general, a disc reproducing apparatus in which one of disc-shaped recording media, such as replay-only optical discs, is taken out of a disc housing unit housing a large number of the optical discs, and the information signals, such as music signals, recorded on the optical disc, are reproduced, includes, in addition to the disc housing unit housing a large number of the optical discs, a disc transporting mechanism for selectively transporting a sole optical disc housed within the disc housing unit, and a reproducing unit for reproducing the information signals recorded on the optical disc transported by the disc transporting mechanism.

The reproducing unit of the disc reproducing apparatus includes a disc rotating mechanism holding the sole optical disc selected from the disc housing unit and an optical pickup unit movable along the radius of the optical disc rotated by the disc rotating mechanism for reproducing the information signals, such as music sound signals, recorded on the optical disc.

Further, the reproducing unit includes, in addition to the disc transporting mechanism for delivering the sole optical disc selected from a large number of the optical discs housed within the disc housing unit, to the disc table for loading and a clamp mechanism for clamping the optical disc thus transported by the disc transporting mechanism onto the disc table for rotation in unison with the disc table.

For selecting the optical disc reproduced by the reproducing unit, the disc housing unit housing a large number of the optical discs is moved for moving a desired optical disc to a position registering with the disc transporting mechanism and the optical disc is then taken out of the disc housing unit by the disc transporting mechanism. Alternatively, the disc housing unit is moved to a position registering with a desired optical disc housed in the disc housing unit and the optical disc is then taken out of the disc housing unit. The optical disc, positioned in register with the disc transporting mechanism, is transported by the disc transporting mechanism onto the disc rotating mechanism of the reproducing unit and loaded on the disc table constituting the disc rotating mechanism. The optical disc is then scanned by the optical pickup unit as the disc is rotated by the disc rotating mechanism for reproducing the recorded information signals.

For selecting one of a large number of the optical discs housed within the disc housing unit, serial numbers are accorded to disc holding sections each containing and holding an optical disc. This serial number is defined as being the number of the optical disc contained and held in each disc holding section and designated for specifying the optical disc contained and held within the disc holding section. That is, with the disc reproducing apparatus having a disc housing unit capable of housing a large number of optical discs, the serial number affixed to each disc holding section of the disc housing unit is specified for specifying the optical disc contained in the disc housing section and the optical disc thus specified is transported by the disc transporting mechanism to the disc reproducing unit for reproduction by the disc reproducing unit.

For reproducing the optical disc by the disc reproducing unit, the number input key, such as a ten-key, provided on an operating panel, is actuated for entering a desired disc number for reproducing the optical disc corresponding to the entered disc number.

If the optical discs are housed within all of the disc holding sections in the disc housing unit, the numbers corresponding to the desired disc holding sections may be designated within a predetermined range for reproducing one or more optical discs corresponding to the designated numbers. However, with a disc housing unit capable of housing a large number of optical discs, there may be occasions wherein the optical discs are not housed within all of the disc holding sections. For example, some of the disc holding sections remain empty because they do not house optical discs therein. In such case, for supervising the optical discs, it is necessary for the user to become aware of which disc holding sections are devoid of optical discs, that is, which of the disc numbers are invalid. It is also necessary for the user to be apprised of the fact that the disc number now entered corresponds to the disc holding section presently devoid of the optical disc.

Thus the optical disc reproducing apparatus of this type is so arranged and constructed that a detection sensor is provided at a portion of each disc holding section of the disc housing unit and the possible presence of the optical disc is detected based upon a detection signal from the detection sensor in order to check whether the disc number corresponding to each disc housing section remains effective.

However, with the above-described conventional disc reproducing apparatus, since there are provided a number of the detection sensors corresponding to the number of the disc holding sections housing the optical discs therein, it becomes necessary to provide a space within which electrical wiring for interconnecting the detection sensors is accommodated in order to permit detection signals to be output from the respective detection sensors. There is also raised a problem that a detection display circuit for detecting the possible presence of the optical discs in the disc housing sections and specifying the disc numbers corresponding to the empty housing section in order to apprise the user of such state becomes complicated in construction.

For example, with the disc reproducing apparatus having a disc housing unit capable of accommodating as many as 50 or more optical discs, the space for accommodating the electrical wiring drawn out from the detection sensors becomes bulky, while the detection circuit becomes complex in construction in proportion to the number of detection sensors, leading to an extremely large size of the reproducing apparatus per se.

With the disc reproducing apparatus in which a light reflecting or light transmitting type sensor is used as a detection sensor for detecting the optical disc housed within each disc housing section of the disc housing unit, and the optical disc is directly sensed by such sensor for determining the presence or absence of the optical disc, there is produced an error in the disc detection accuracy due to fluctuations in the surface states or transparency of the optical disc, with the result that the presence or absence of the optical disc cannot be detected accurately.

On the other hand, with the disc reproducing apparatus having a disc exchange function in which the optical discs are selectively taken out one by one from the disc housing unit accommodating a large number of the optical discs and the optical discs thus taken out are transported by a disc transporting mechanism to the disc reproducing unit and loaded on a disc rotational driving mechanism constituting the disc reproducing unit, the disc reproducing unit is supported via a supporting mechanism within a main body of the apparatus housing the disc housing unit therein. If an impact is applied to the disc reproducing unit supported via the supporting mechanism within the main body of the apparatus, the information signal cannot be stably reproduced under vibrations resulting from such impact. Above all, with the reproducing apparatus of the type employing an optical pickup reading out the information signals recorded on the optical disc in a contact-free manner with respect to the optical disc, it may be feared that, if vibrations are exerted to the reproducing unit during reproduction, the recording tracks formed on the optical disc cannot be scanned by the optical pickup with the result that reproduction of the information signals becomes impractical. Thus there is employed a disc reproducing apparatus in which the disc reproducing unit is resiliently supported by the main body of the apparatus by an interposed floating unit. With the use of the interposed floating unit, the optical pickup constituting the disc reproducing unit or the disc rotating driving mechanism may be safeguarded against harmful vibrations, thus assuring stable reproduction of the optical disc.

However, since the floating unit is adapted for flexibly supporting the main body of the apparatus via elastic members, such as rubber members or springs, the disc rotating driving unit, thus supported by the floating unit, becomes extremely labile in relative positioning accuracy with respect to the optical disc supported via the floating unit. Above all, since a supporting member supporting the disc reproducing unit comprising an optical pickup and a disc rotating driving unit built into a chassis is wobbled and deviated in its position by the floating unit, it becomes extremely difficult to provide for centering for engaging a centering member provided at a rotational center of the disc table in a centering hole of the optical disc delivered to the disc loading position of the disc reproducing unit.

If, with the disc reproducing apparatus having the disc exchange function in which a sole optical disc is taken out by a disc take-out unit from a disc housing unit housing a large number of optical discs therein and the optical disc thus taken out is loaded on a disc table of the disc rotating driving unit for reproducing information signals from the thus loaded optical disc, the optical disc cannot be loaded reliably, it becomes impossible to run the optical disc in rotation in stability for accurately reproducing the information signals.

With the disc reproducing apparatus having the disc exchange function in which the optical discs are selectively taken out one by one from the disc housing unit housing a large number of optical discs therein and the optical disc thus taken out is transported by a disc transporting mechanism to the disc reproducing unit and loaded on the disc rotating and driving unit constituting the disc reproducing unit for reproducing information signals, such as music signals, serial numbers are accorded to the disc housing sections provided in the disc housing unit for housing the individual discs for specifying the optical discs accommodated in the disc housing sections by these serial numbers. For selecting a desired one of a large number of optical discs housed within the disc housing unit for reproduction, a number entering key, such as a ten-key, provided on an operating panel of the main body of the apparatus is actuated for entering a desired disc number for reproducing the optical disc contained in the disc housing section bearing the entered disc number.

There is also known a disc reproducing apparatus in which the letter display information, such as a title, corresponding to the disc number, is registered in a memory, using a letter key or the like, and the disc number is entered for reproduction, whereby the disc number and the letter display information corresponding to the disc number are displayed on a display for improving convenience of the disc reproducing apparatus.

However, with such disc reproducing apparatus, since number keys, such as ten-keys, are used in selecting a desired one of a large number of the optical discs, there is raised the following problem in registering letter display data corresponding to the disc numbers. That is, for registering the letter display information by entering disc numbers and subsequently entering the letter display information corresponding to the entered disc number using a letter key or the like, it is necessary to activate a number key corresponding to the entered disc number. If the disc housing unit is capable of housing a large number of the optical discs, it is necessary to select ten-keys a plurality of times, with an significantly increased number of operating steps.

Further, since a toggle operation is performed using a particular operating key for retrieving a disc number, the retrieving operation becomes complex if there are a large number of registered disc numbers.

With the disc reproducing apparatus having the disc exchange function, in which a large number of the optical discs are reproduced sequentially, the optical disc to be reproduced is automatically selected by a selecting mechanism provided within the reproducing apparatus for reproducing the selected optical disc, without the user directly handling the optical discs. With such disc reproducing apparatus, the disc number displayed on a display panel is solely the disc number corresponding to the optical disc currently reproduced, while it is not possible to recognize the optical disc which is to be reproduced next. Thus, in order to recognize the optical disc to be reproduced subsequently, it is necessary to check for the sequence by a key operation, which is a great inconvenience.

In addition, when a number of desired music selections are selected from one or more optical discs in order to form a group of music selections, desired discs are selected using operating keys, such as ten-keys, by way of programming, and the desired music selections are selected from the selected optical discs. Consequently, it is necessary to provide operating keys for selecting optical discs and desired music selections from the selected optical discs, while laborious operations are involved in selecting the discs and the music selections.

The above-mentioned program needs to be reset for the next reproduction after the end of the reproduction of the previously set of music selections by a laborious setting operation.

It is an object of the present invention to provide a recording and/or reproducing apparatus for disc-shaped recording media in which disc-shaped recording medium are selectively and sequentially taken out from a housing unit singly from a housing unit housing a large number of disc-shaped recording media, such as optical discs or magneto-optical discs, and in which the information signals, such as music signals, are recorded on or reproduced from the thus taken out disc-shaped recording medium.

It is another object of the present invention to provide a recording and/or reproducing apparatus for a disc-shaped recording medium in which a large number of disc-shaped recording media are efficiently housed and in which desired ones of these recording medium are accurately selected and reliably loaded in a recording and/or reproducing unit.

It is another object of the present invention to provide a recording and/or reproducing apparatus for a disc-shaped recording medium in which the transporting distance for the disc-shaped recording media from the housing unit up to the recording and/or reproducing unit is diminished to enable prompt exchange of the disc-shaped recording media.

It is another object of the present invention to provide a recording and/or reproducing apparatus for a disc-shaped recording medium in which the recording and/or reproducing unit for the disc-shaped recording media having a housing unit capable of housing a large number of disc-shaped recording media may be diminished in size and in which a determination of whether or not a disc-shaped recording medium is housed and held within the holding section for the recording medium provided in the housing unit can be accurately detected by a simplified detection mechanism.

It is another object of the present invention to provide a recording and/or reproducing apparatus for a disc-shaped recording medium in which a determination of whether the disc-shaped recording medium is present may be accurately made without being affected by the surface state or transparency of the detected disc-shaped recording medium.

The present invention is proposed in view of the above-described status of the prior art, and has as an object to provide a recording and/or reproducing apparatus in which the relative position of the disc-shaped recording medium may be accurately set relative to the rotating driving mechanism for the recording medium or the recording and/or reproducing mechanism such as an optical pickup to realize stable loading of the disc-shaped recording medium on the rotating driving mechanism for the disc-shaped recording medium to render it possible to record and/or reproduce information signals accurately on or from the disc-shaped recording medium.

The present invention also has as an object to provide a recording and/or reproducing apparatus in which disc-shaped recording media are selectively and sequentially taken out singly from a housing unit housing a large number of disc-shaped recording media, such as optical discs or magneto-optical discs, in which the disc-shaped recording media thus taken out may be loaded reliably and with correct positioning on the loading unit of the rotating and driving mechanism and in which the information signals may be recorded and/or reproduced on or from the thus loaded disc-shaped recording medium.

The present invention also has as an object to provide a recording and/or reproducing apparatus in which, during the operation of recording and/or reproducing the information signals on or from the disc-shaped recording medium, the information signals may be recorded and/or reproduced on or from the recording medium without being affected by external vibrations.

The present invention also has as an object to provide a recording and/or reproducing apparatus in which music selections recorded on a large number of the disc-shaped recording media contained in the housing unit are classed into desired groups and the music selections may be reproduced on the group basis and in which operating keys for classing the music selections into groups and reproducing the music selections on the group basis are simplified in structure in order to reduce the size of the operating panel.

The present invention also has as an object to provide a recording and/or reproducing apparatus in which a group of music selections, once set, need not be reset for the next replay and in which the music selection to be reproduced next may be known in addition to the air being reproduced.

DISCLOSURE OF THE INVENTION

The recording and/or reproducing apparatus for a disc-shaped recording medium according to the present invention comprises a housing unit for housing a plurality of disc-shaped recording media, a recording/reproducing unit on which one of the disc-shaped recording media contained and held within a plurality of holders provided in the housing unit for containing and holding the disc-shaped recording media and which is adapted for recording and/or reproducing information signals, such as music signals, a transporting mechanism for transporting one of the disc-shaped recording media contained and held within the selected holder as far as the recording/reproducing unit, and a chuck unit for holding the disc-shaped recording medium transported by the transporting mechanism for rotation in unison with a rotational driving mechanism provided in the recording/reproducing unit.

The transporting mechanism transporting the disc-shaped recording medium selected from the housing unit as far as the recording/reproducing unit includes a mechanism for detecting whether the disc-shaped recording medium is contained in the holder provided in the housing unit. The detecting mechanism detects the presence of the recording medium in the holder depending on the state of contact of a part of the transporting mechanism with the outer periphery of the disc-shaped recording medium.

The transporting mechanism for the disc-shaped recording medium includes guide means having a feed guide section having its surface facing the disc-shaped recording medium curved smoothly and continuously and feed means for feeding the disc-shaped recording medium as far as a loading position on the recording and/or reproducing unit with the outer periphery of the disc-shaped recording medium being guided by the feed guide section of the feed guide means.

The recording and/or reproducing apparatus for the disc-shaped recording medium according to the present invention includes a housing unit having a plurality of holders for radially holding a plurality of disc-shaped recording media with the disc surface erected upright and first and second detection units for detecting the rotational position of the housing unit which is rotatable about a pivot, rotational driving controlling means having a first driving unit for rotationally driving the housing unit, detection means for detecting the amount of rotation of the housing unit by the first and second detection units, and a controller for supplying a driving signal to the first driving unit based upon an input signal from an input unit for rotating the housing unit in an amount corresponding to the input signal from the input unit. The controller controls the amount of rotation of the housing unit by the first driving unit. The apparatus also includes transporting means having first and second arms for taking out a selected one of the disc-shaped recording media housed within the holders of the housing unit rotationally controlled by the rotational driving controlling unit which corresponds to an input signal from the input unit, and an arcuate guide section for being abutted against the outer periphery of the disc-shaped recording medium transported by the first and second arms for guiding the disc-shaped recording medium transported by the first and second arms. The apparatus additionally includes a second driving unit rotationally driving the first and second arms for moving the disc-shaped recording medium along the arcuate guide section, and a detection switch actuated by rotational movements of the first and second arms for detecting that there is no disc-shaped recording medium contained in the holder, and a recording and/or reproducing unit having disc-shaped recording medium rotating means for rotatably holding the disc-shaped recording medium transported by the transporting means in cooperation with a chuck member. The apparatus also includes recording and/or reproducing means for recording and/or reproducing information signals on or from the disc-shaped recording medium held by the transporting means in cooperation with said chuck member, and a third driving unit for producing relative movement between the disc-shaped recording medium rotating means and the recording and/or reproducing means on one hand and said chuck member on the other hand for holding disc-shaped recording medium transported by the transporting means by the chuck member and the disc-shaped recording medium rotating means.

The recording and/or reproducing apparatus for a disc-shaped recording medium according to the present invention includes a housing unit having a plurality of holders for radially holding a plurality of disc-shaped recording media with disc surfaces being erected upright. The housing unit is rotatably mounted about a pivot as a center of rotation between an exchange enabling position allowing for housing and exchange of at least one of the disc-shaped recording media exposed via an opening in a main body of the apparatus and a transport enabling position allowing for housing and transporting of the exposed disc-shaped recording medium. The housing unit has at least first and second detecting units for detecting its rotational position.

The transporting mechanism for the disc-shaped recording medium constituting the recording and/or reproducing apparatus according to the present invention has first and second arms for taking out a selected one of the disc-shaped recording media housed within the holders of the housing unit rotationally controlled by the rotational driving controlling unit which corresponds to an input signal from the input unit and for clamping the outer peripheral portion of the disc-shaped recording medium from a direction parallel to the disc surface for transporting the disc-shaped recording medium from the transporting enabling position as far as the recording and/or reproducing position, and an arcuate guide section for being abutted against the outer periphery of the disc-shaped recording medium transported by the first and second arms for guiding the disc-shaped recording medium transported by the first and second arms. The transporting mechanism also includes a second driving unit rotationally driving the first and second arms for moving the disc-shaped recording medium along the arcuate guide section, and a detection switch actuated by rotational movements of the first and second arms for detecting that there is no disc-shaped recording medium contained in the holder.

The transporting mechanism for the disc-shaped recording medium constituting the recording and/or reproducing apparatus according to the present invention also has an arcuate guide member arranged within a vertical plane including a radial line centered about a pivot rotatably supporting the housing unit. The transporting mechanism takes out the disc-shaped recording medium contained in the designated one of the holders of the housing unit disposed on the radial line and transports the disc-shaped recording medium along the arcuate guide with the disc surface being held upright.

The recording and/or reproducing apparatus for a disc-shaped recording medium comprises means for reproducing the information data from a disc-shaped recording medium having a plurality of information data recorded thereon, information designating means for designating the desired information data from the a plurality of information data recorded on the disc-shaped recording medium, group designating means for designating a group to which belongs the information data designated by the designating means and for designating reproduction of the grouped information, display means for displaying the attributes of the group designated by the group designating means and displaying the information data constituting the group, storage means for storing the attributes of the group designated by the group designating means and the attributes of the information data constituting the group, and control means for controlling the display means for displaying the attributes of the group designated by the group designating means and displaying the desired information data constituting the group and for controlling said storage means for storing the attributes of the group and the attributes of the information data, in a manner that, when the reproduction of the grouped information data is designated by the group designating means, the control means controls the reproducing means so that the information of the designated group is reproduced based upon the attributes stored in the storage means. The control means also controls the display means for displaying the attributes of the reproduced information.

The recording and/or reproducing apparatus for the disc-shaped recording medium also includes control means for controlling the storage means and the display means for storage and display of the attributes when group designation is made during reproduction or reproduction pause. When group designation is made except during reproduction or reproduction pause, the control means controls the reproducing means and the display means for reproducing the designated group and displaying the attributes of the reproduced group.

The recording and/or reproducing apparatus for the disc-shaped recording medium also includes disc-shaped recording medium designating means for designating a desired one of the disc-shaped recording media contained in the housing unit.

BEST MODE FOR CARRYING OUT THE INVENTION

The present invention will now be explained with reference to an embodiment in which it is applied to a reproducing apparatus for an optical disc in which a sole optical disc is taken out of a disc housing unit and information signals, such as music signals, recorded on the thus taken out optical disc are reproduced. The disc housing unit is a unit housing a large number of disc-shaped recording media which herein are optical discs.

Figure 1:
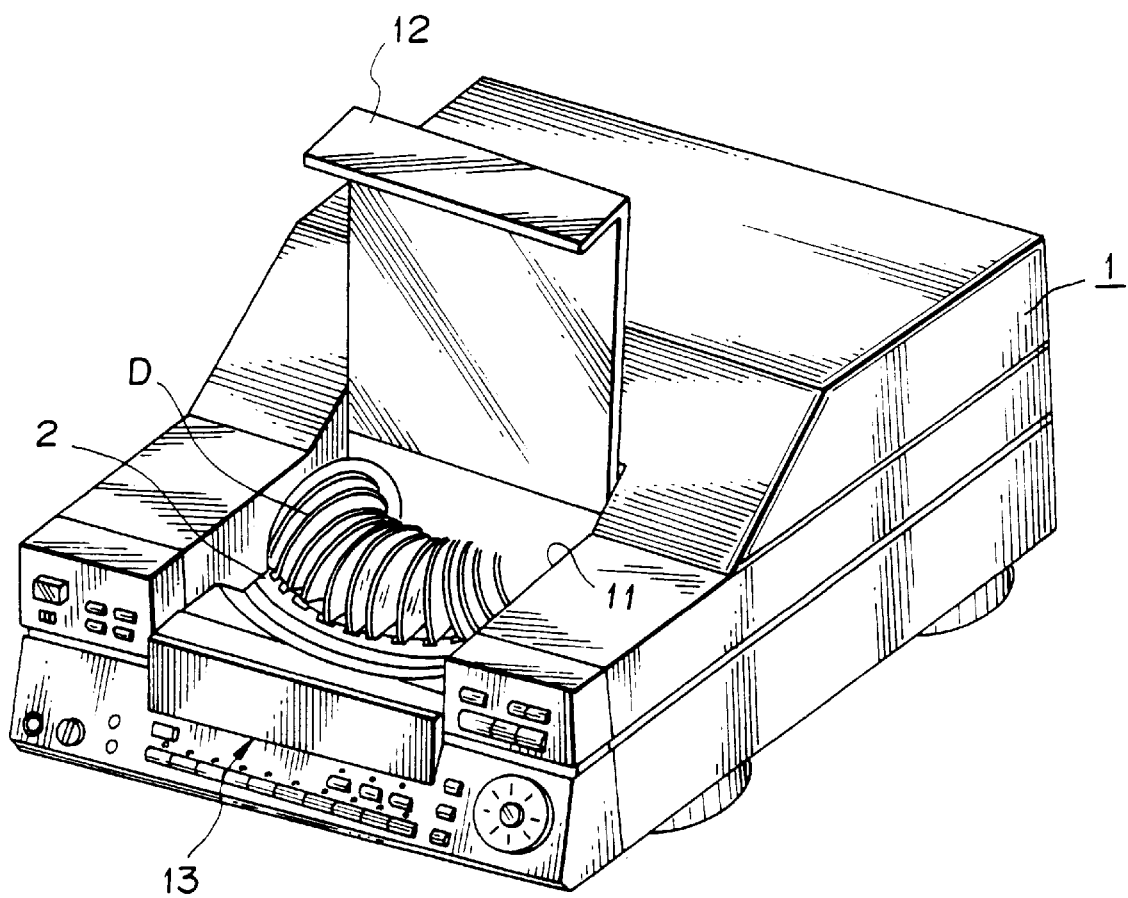
FIG. 1 is a perspective view showing an embodiment in which a recording and/or reproducing apparatus for the disc-shaped recording media according to the present invention is applied to a disc reproducing apparatus for an optical disc in which a sole optical disc is taken out from a disc housing unit housing a large number of optical discs and information signals are reproduced from the thus taken out optical disc.

The reproducing apparatus according to the present invention comprises an outer casing 1 constituting a substantially square-shaped main body of the apparatus, within which there are enclosed a disc housing unit 2 capable of housing 100 optical discs D and a disc reproducing unit 3 for reproducing a selected sole disc D taken out of the disc housing unit 2, as shown in FIG. 1.

Figure 3:
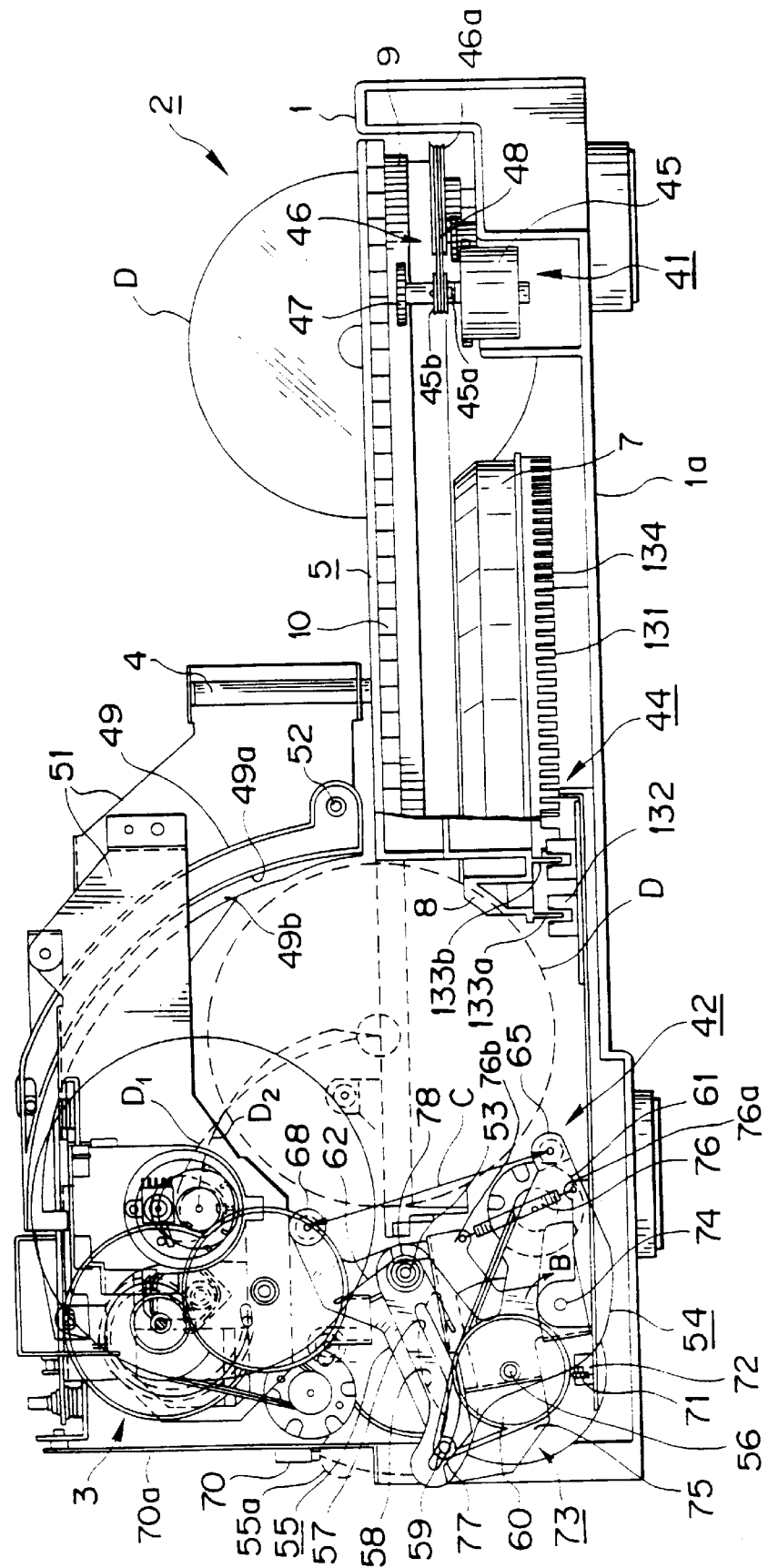
FIG. 3 is a side view showing an essential mechanical portion of the disc reproducing apparatus according to the present invention.

The disc housing unit 2 provided within the outer casing 1 has a rotary table 5 which is rotatably supported via a pivot 4 implanted on a bottom surface 1a of the outer casing 1 and which constitutes a circular housing unit main body, as shown in FIG. 3. Since the rotary table 5 is supported by the pivot 4 set upright on the bottom surface 1a of the outer casing 1, the rotary table 5 is rotated parallel to the bottom surface 1a of the outer casing 1.

Figure 4:
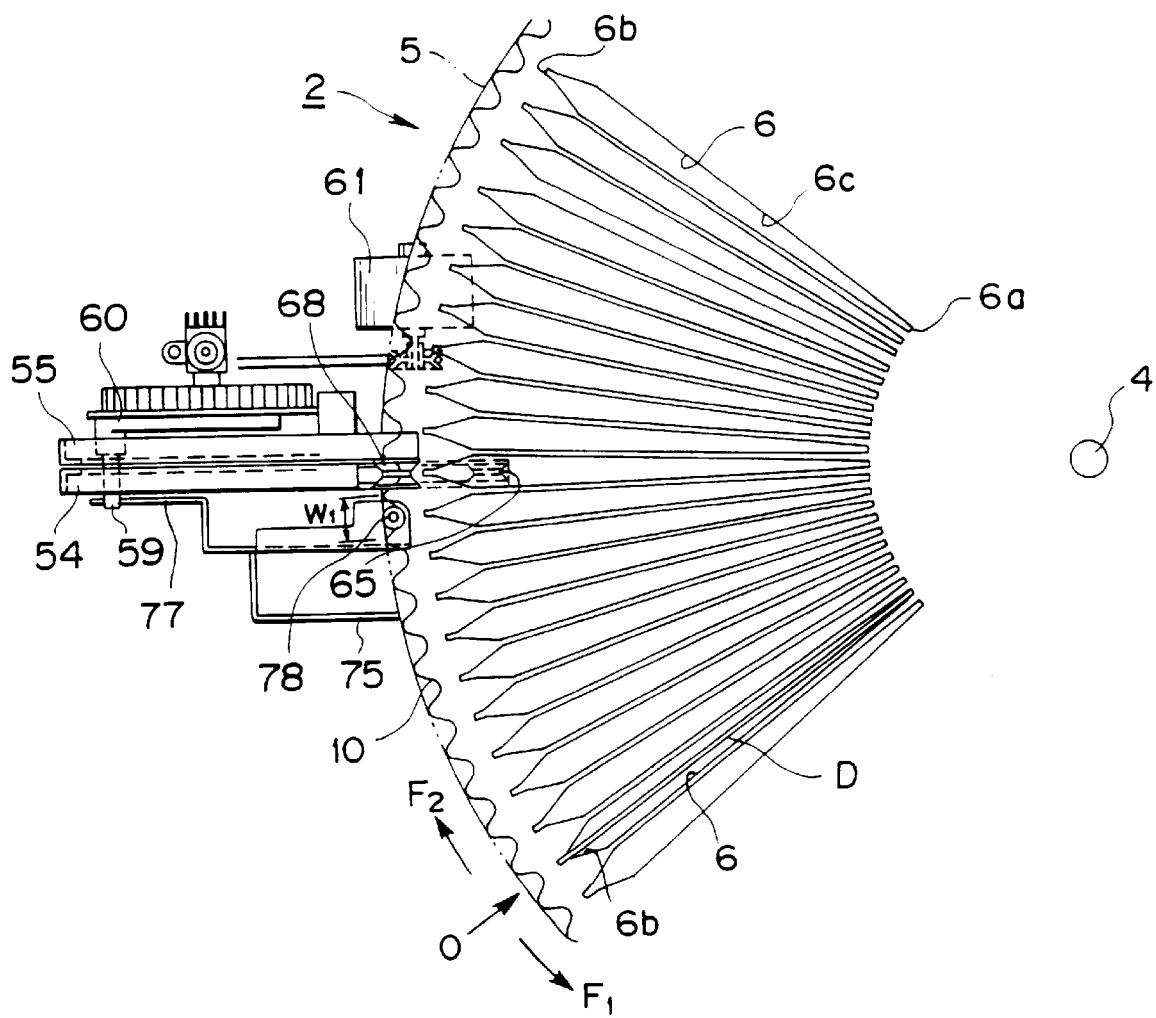
FIG. 4 is a plan view showing portions of a rotary table and a disc transporting mechanism of the disc reproducing mechanism according to the present invention.
Figure 5:
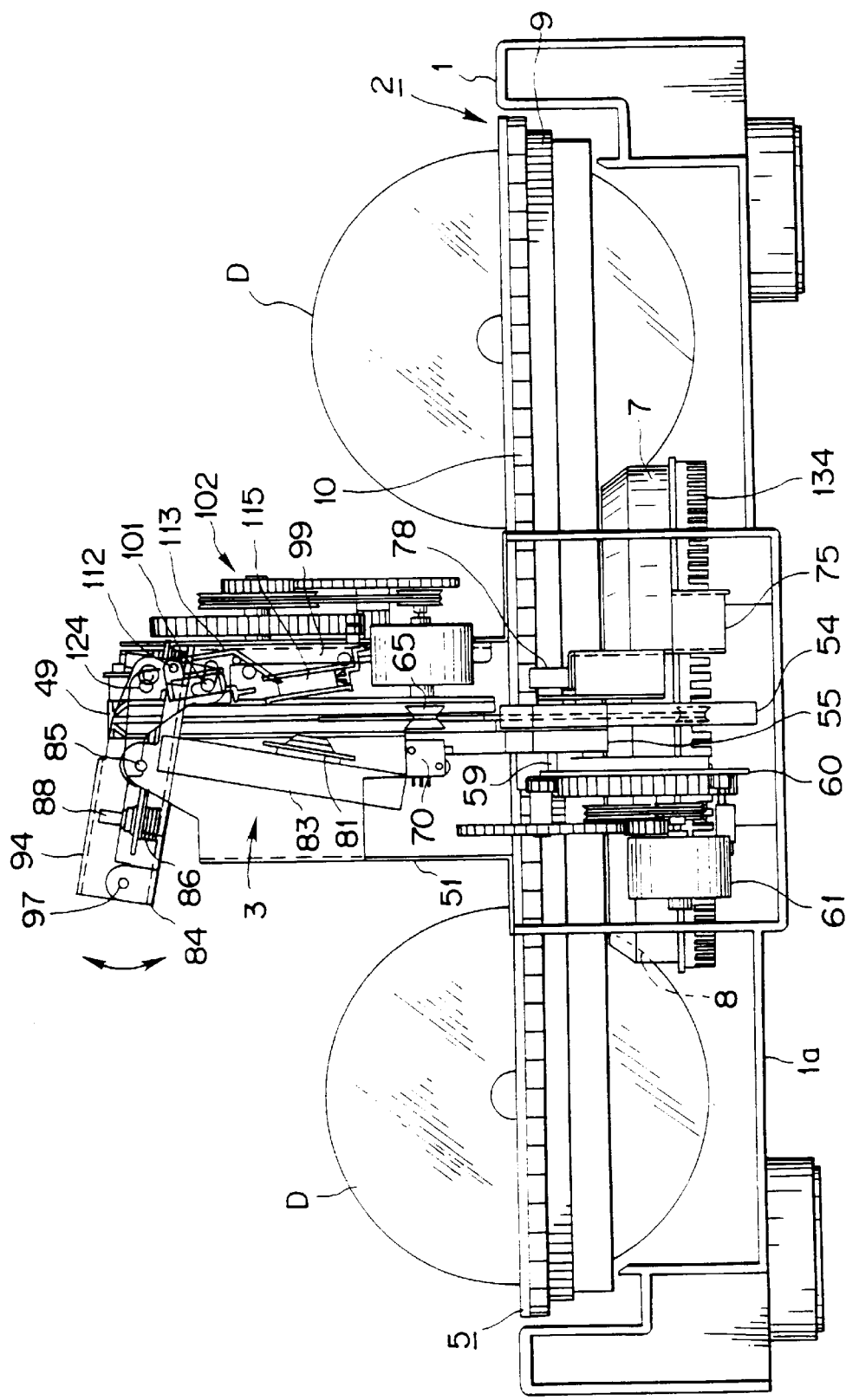
FIG. 5 is a plan view showing a rotary table and a disc transporting mechanism of the disc reproducing mechanism according to the present invention.

The rotary table 5 is formed with a large number of disc-receiving slits 6 extending radially form the center of rotation of the rotary table 5 supported by the pivot 4, as shown in FIG. 4. In the present embodiment, 100 of such slits are formed around the perimeter of the rotary table 5. A cylindrically-shaped disc support is formed on the lower side of the rotary table 5 coaxially and as one with the rotary table 5, as shown in FIG. 3. The disc support 7 has a number of disc support grooves 8, in register with the disc inserting slits 6, for supporting the outer rim portions of the optical discs D introduced through these slits 6. These disc support grooves 8 are radially formed at the outer peripheral corners on the upper surface of the disc support 7 facing the rotary table 5. These disc support grooves 8 are formed with curved surfaces corresponding to the outer periphery of the optical disc D. Thus the optical disc D inserted into the disc inserting slit 6 has its outer periphery supported in the disc support groove 8 so as to be prevented from being disengaged from the slit 6. That is, the disc inserting slit 6 and the disc support groove 8 make up a disc housing section for housing and holding a sole optical disc D.

It is noted that the disc inserting slit 6 formed in the rotary table 5 has the width of its inner rim side end 6a towards the center of rotation of the rotary table 5 and the width of its outer rim side end 6b towards the outer rim of the rotary table 6 substantially equal to the thickness of the optical disc D introduced through the slit 6. The disc inserting slit 6 also has the width of an intermediate portion 6c between the inner rim side end 6a and the outer rim side end 6b gradually broader from the inner rim towards the outer rim of the rotary table 5.

With the disc inserting slit 6 formed in this manner, the optical disc D, introduced through the disc inserting slit 6, is supported upright on the rotary table 5 by the inner rim side end 6a and the outer rim side end 6b in a manner free of wobbling. That is, the optical disc D is housed and held within the disc housing unit 2 with its major surface running parallel to the pivot 4 supporting the rotary table 5 as the center of rotation of the rotary table 5. In addition, since the optical disc D has only its non-recording region on its outer peripheral side supported by the inner rim side end 6a and the outer rim side end 6b of the disc inserting slit 6, the signal recording region formed on the inner periphery of the optical disc D may be positively prevented from being contacted with the sidewall of the disc inserting slit 6 during insertion of the disc D into the slit 6 or during rotation of the disc D. Above all, since the intermediate portion 6c of the disc inserting slit 6 is formed with a gradually increasing width from the inner rim side towards the outer rim side, the signal recording region may be positively prevented from being contacted with the sidewall of the disc inserting slit 6 during insertion of the optical disc D into the disc inserting slit 6.

On the entire outer peripheral surface of the rotary table 5, constituting the disc housing unit 2, there is formed a gear 9, as shown in FIG. 3. The rotary table 5 is rotated by the housing unit rotating driving mechanism, about the pivot 4 as the center of rotation, by the drive transmitting gear of the housing unit rotating driving mechanism constituting the first driving unit of the present apparatus meshing with the gear 9. In the upper portion of the outer peripheral surface of the rotary table 5 having the gear 9, there are formed a plurality of engagement recesses 10 in register with the disc inserting slits 6. The engagement recesses 10 are engaged by a housing unit rotation regulating mechanism, as later explained, for regulating the rotation of the rotary table 5.

The outer casing 1, having enclosed therein the disc housing unit 2 housing and holding the optical discs D and the disc reproducing unit 3 for reproducing the optical disc D selected and taken out from the disc housing unit 2, has a disc insertion/ejection opening 11 via which the optical discs D are inserted into and taken out of the disc housing unit 2, as shown in FIG. 1. The disc insertion/ejection opening 11 is provided on the upper surface of the outer casing 1 for extending from the front surface towards the back surface of the outer casing 1. The disc insertion/ejection opening 11 is dimensioned to expose a number of the disc inserting slits equal to about one-fourth of the large number of, specifically 100, disc inserting slits provided in the rotary table 5. The optical discs D introduced and held within the disc insertion/ejection opening 11 may be exchanged by introducing or ejecting the optical discs D via the disc insertion/ejection opening 11. The disc insertion/ejection opening 11 is covered with a lid 12 which may be opened and closed and which is formed of transparent synthetic resin. During reproduction of the optical disc D or when the discs are not in use, the lid 12 is closed for preventing the optical disc D housed within the disc housing unit 2 from being inadvertently contacted via the disc insertion/ejection opening 11 and for preventing impurities from intruding into the inside of the outer casing 1 for protecting the optical discs.

On the front surface of the outer casing 1, there is provided an operating panel 13 having an array of operating switches or buttons for controlling the operation of the disc reproducing apparatus. Referring to the enlarged view of FIG. 2, the principal operating switches and buttons provided on the operating panel 13 include a power switch 15 arranged on an upper left portion of the operating panel 13 and actuating keys 16, such as a playback mode selecting key, for selecting the playback operating mode or the one-track operating mode, one-track jump key, pause key or a stop key on an upper right portion of the operating panel 13. There is also provided on a lower mid portion of the operating panel 13 a disc group designating key 17 for grouping the 100 optical discs D housed within the disc housing unit 2 into units each consisting of a selected number of the optical discs depending on the contents of the recorded information or the use frequency by a plurality of users. In the present embodiment, the disc group designating keys 17 are made up of 10 keys, namely a first disc group designating key 17a to a tenth disc group designating key 17j. A disc group entry key 19 is arranged above the first disc group designating key 17a among the disc group designating keys 17, and a memo entry key 20 is arranged on the left-hand side of the group entry key 19. There are also arranged LEDs 21 for emitting red and green light above the disc group designating keys 17.

Figure 2:
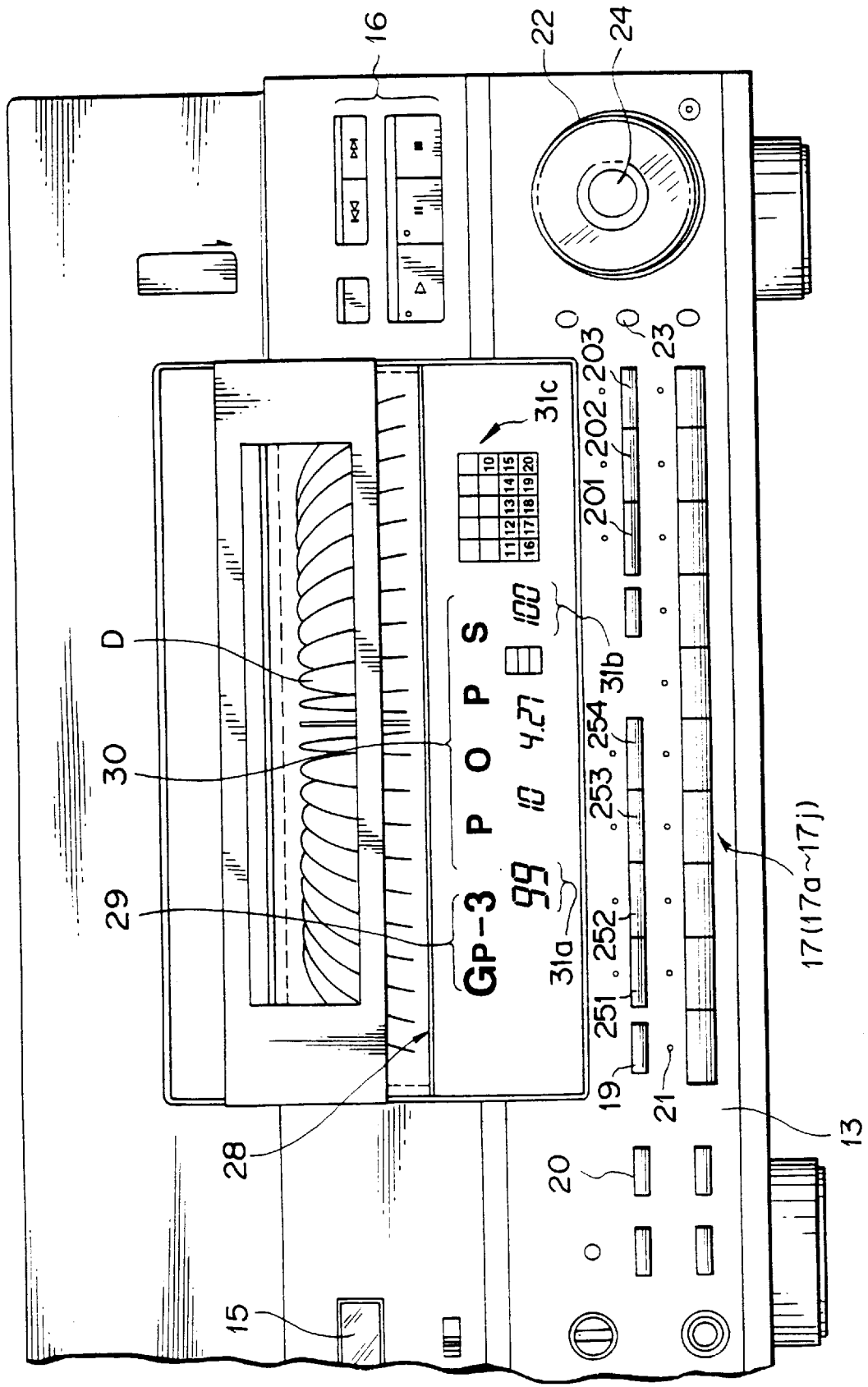
FIG. 2 is a schematic front view showing an operating panel portion of the disc reproducing apparatus according to the present invention.

In addition, with the disc reproducing apparatus according to the present invention, first to fourth music clip keys 251 to 254 for designating the formation and reproduction of a group consisting only of desired music selections on the mid to right portion of the disc group designating keys 17 in FIG. 2. There is also arranged on the right-hand side of the music clip keys 251 to 254 an erasure key for erasing the music selections clip-filed by the operation of the music clip keys 251 to 254.

With the reproducing apparatus of the present embodiment, there is provided a rotary operating key 22 on the lower right-hand portion of the operating panel 13, while a file key 23 is provided on the left-hand side of the rotary operating key 22. The rotary operating key 22 includes a data-setting pushbutton switch 24 which is stationary with respect to the operating panel 13. The rotary operating key 22 has a plurality of. for example ten, intermittent stop positions per revolution. Data is updated at each stop position. For example, the data is updated in the (+) and (−) directions when the key 22 is rotated clockwise or counterclockwise, respectively.

At a mid portion of the operating panel, there is provided a display 28 formed by a FL tube or as a liquid crystal display. The display 28 includes a disc group number designating area 29 for displaying the group number of the selected or current disc, a memo display area 30 for displaying the memo, such as a title concerning the selected or current disc number, and first and second disc number display areas 31a, 31b for displaying the disc number of the optical disc D subsequently reproduced.

The principal mechanism constituting the present disc reproducing apparatus wall be explained by referring to FIGS. 3 to 22.

The disc reproducing apparatus includes a disc housing unit rotating driving mechanism 41 for rotating the disc housing unit 2 housing a large number of optical discs D clockwise and counterclockwise, about the pivot 4 as a center of rotation, a disc transporting mechanism 42 for selectively taking out one of the optical discs D housed within the disc housing unit 2 and transporting the selected disc so that it is loaded on the disc reproducing unit 3, and a disc housing unit rotating position detecting mechanism 44 for detecting the rotational position of the disc housing unit 2, as shown in FIG. 3.

Referring first to the housing unit rotating driving mechanism 41, constituting a first driving unit of the present apparatus, the housing unit rotating driving mechanism 41 rotates the disc housing unit 2 for moving the optical disc F housed and held within one of the disc holding sections as selected by the various keys arranged on the operating panel 13 to a disc takeout enabling position by the disc transporting mechanism 42, that is a position in register with the disc transporting mechanism 2. Each disc holding section is made up of the disc inserting slit 6 and the disc support groove 8, as explained hereinabove.

The housing unit rotating driving mechanism 41 includes a driving motor 45 arranged at the corner within the outer casing 1 and a speed-reducing gearing 46 made up of a plurality of gears, as shown in FIG. 3. A driving gear 47 of the speed-reducing gearing 46 meshes with the gear 9 formed on the outer periphery of the rotary table 5 in order to transmit the driving power of the driving motor 45 to the rotary table 5. The rotary driving power of the driving motor 45 is transmitted to the speed-reducing gearing 46 via a pulley 45b mounted on an output shaft 45a of the driving motor 45 and a pulley 46a of the speed-reducing gearing 46. Thus the rotary driving power of the driving motor 45 is decelerated by the speed-reducing gearing 46 and ultimately transmitted via the driving gear 47 to the gear 9 of the rotary table 5 for rotationally driving the rotary table 1. The driving motor 45 is rotationally driven in both the forward and reverse directions for rotating the disc housing unit 2 inclusive of the rotary table 5 clockwise and counterclockwise about the pivot 4 as a center of rotation responsive to the position of the optical disc D selected by the keys arranged on the operating panel 13.

The disc transporting mechanism 42 for selectively taking out the optical disc D from the di housing unit 2 and loading it on the disc reproducing unit 3 is arranged at a corner of the outer casing 1 opposite to its corner at which the housing unit rotating driving mechanism 41 is mounted. The disc transporting mechanism 42 includes a disc feed unit 50 for supporting two points of the outer periphery of the optical disc D inserted into and held by the disc inserting slit 6 of the disc housing unit 2, taking out the optical disc D out of the disc housing unit 2 with the disc surface parallel to the axial direction of the pivot 4, and feeding the disc D as far as the disc loading position onto the disc reproducing unit 3. The disc transporting Mechanism 42 also has a disc feed guide member 49 for supporting the outer periphery of the optical disc D opposite to the disc side supported by the disc feed unit 50 for guiding the movement of the optical disc D fed by the disc feed unit.

The disc feed unit 49 of the disc transporting mechanism 42 is arranged for extending from a position facing the upper outer peripheral side of the optical disc D housed within and held by the disc housing unit 2 as far as the disc loading position of the disc reproducing unit 3 arranged at a corner of the outer casing at which the disc transporting mechanism 42 is arranged. Thus the disc feed guide member 49 is extended from the position facing the upper outer periphery of the disc towards the pivot for the optical disc D protruded from the disc housing unit a to the disc loading position of the disc reproduction unit 3 which is arranged so as to permit the optical disc D to be loaded with the disc surface parallel to the axial direction of the pivot 4, with the plane parallel to the axial direction of the pivot 4 being the rotational plane of the optical disc D, as shown in FIG. 3.

The disc feed guide member 49 has its surface facing the outer periphery of the optical disc D as a smoothly and continuously curved feed guide section 49a. Specifically, the feed guide section 49a has its portion positioned towards the pivot 4 facing the outer periphery of the optical disc D housed within the disc housing unit 2 as an acutely rising substantially arcuate curved surface and its portion beginning from the end of the arcuate curved portion and terminating at the disc reproducing unit 3 as a curved surface having a gradually increasing radius of curvature. That is, from the geometrical aspect, the feed guide section 49a follows the first quadrant of an ellipse having the transverse direction as its long axis. Both sides of the feed guide section 49a are formed as feed guide wall sections 49b for suppressing wobbling of the optical disc D guided by the feed guide member 49 for preventing the optical disc D from falling inadvertently from the disc feed guide member 49.

The disc feed guide member 49 is mounted on a disc reproducing unit mounting substrate 51 mounting the disc housing unit 2. The disc reproducing unit mounting substrate 51 is formed by a thin metal plate and fixedly implanted towards the disc reproducing unit 3 within the outer casing 1 by having its proximal side supported by the pivot 4. The disc seed guide member 49 is pivotally mounted by having its proximal end carried by a shaft 52 set on the substrate 51 so as to be rotatable about the shaft 52 as the center of rotation.

Figure 6:
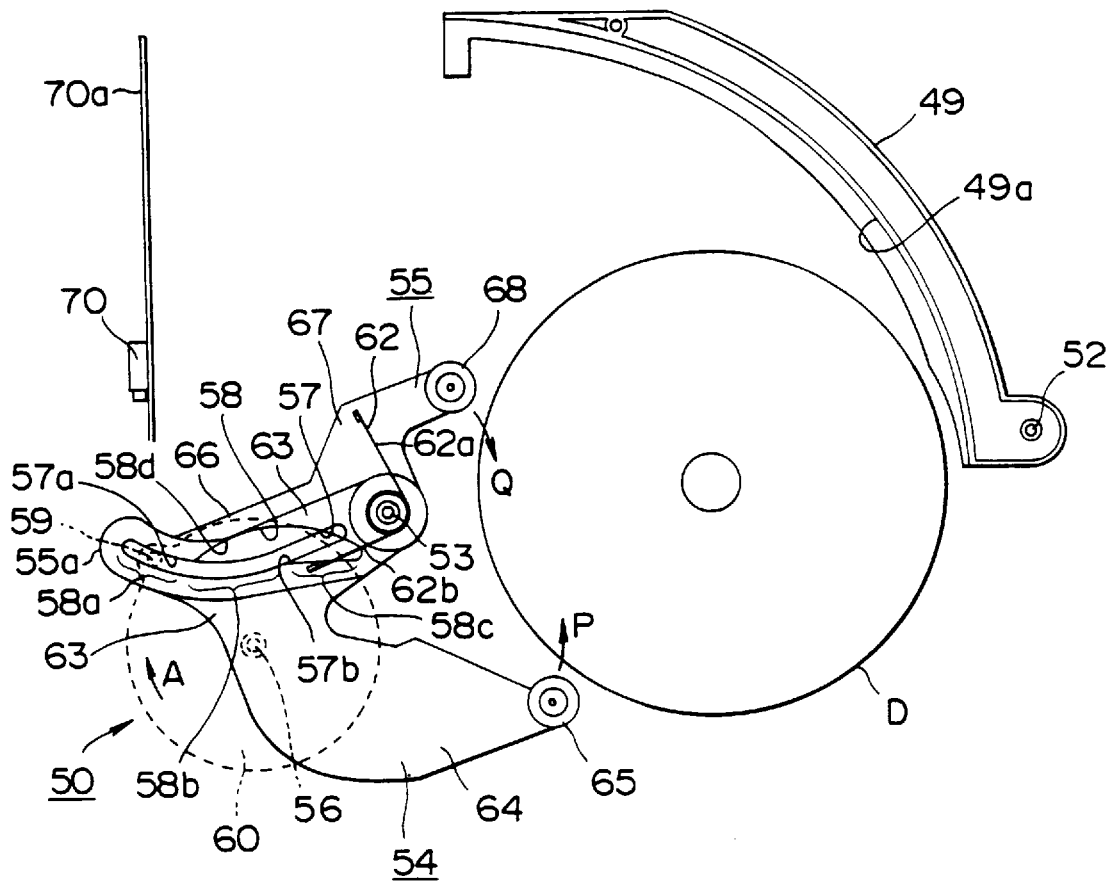
FIG. 6 shows the operation of the disc transporting mechanism of the disc reproducing apparatus according to the present invention, and shows the operating process for the initial stage.

The disc feed mechanism 50 constituting the disc transporting mechanism 50 has a first arm 54 and a second arm 55 which are pivotally mounted for opening and closing movement about a common pivot shaft 53 as a center, as shown in FIG. 6. These first and second arms 54, 55 are mounted via a pivot shaft 53 and rotationally biased by a torsion coil spring 62 having its one end 62a retained by the first arm 54 and its other end 62b retained by the second arm 55 in the directions in which the arm ends facing the outer periphery of the optical disc D approach towards each other shown by arrows P and Q in FIG. 6. In the first and second arms 54, 55, there are bored a first cam opening 57 and a second cam opening 58 which are passed through by an arm rotation control pin 59 implanted on one of the major surfaces of a rotating disc 60 which is rotated by the driving force of a driving motor 61. The arm rotation control pin 59, passed through the first and second cam openings 57, 58, is set on the rotating disc 60 at a position offset from the center of rotation of a pivot 56 about which the disc 60 is pivotally mounted. The driving motor 61, which runs the disc 0 in rotation for rotationally driving the first and second arms 54, 55 in rotation make up a second divining unit for the apparatus along with the rotating disc 60.

The first arm 54 of the disc feed unit 50 is molded of synthetic resin and has a driving member 63 having a pivotal mounting portion for the pivot 53 and a substantially L-shaped disc feed member 64 extending from one lateral side of the driving member 63, as shown in FIG. 6. The driving member 63 has the first cam opening 57 formed therein and having a first cam portion 57a and a second cam portion 57b opposing each other and having the same radius of curvature. The disc feed member 64 is extended from the lateral side of the driving member 63 so that its one end fitted with a roll 65 supporting the disc D being fed faces the lower outer periphery of the disc D housed within the disc housing unit 2.

The first arm 54 is rotated counterclockwise as indicated by arrow P in FIG. 6, about the pivot 53 as the center of rotation so that the roll 65 at its one end is made to bear against the outer periphery of the optical disc D housed within the disc housing unit 2. Additionally, the first arm 54 is further rotated counterclockwise for lifting the optical disc D obliquely upward in FIG. 6. The first arm 54 is rotated further counterclockwise for contacting the outer periphery of the optical disc D opposite to the disc portion supported by the roll 65 with the feed guide section 49a of the feed guide member 49. With the first arm 54 continuing to be rotated counterclockwise, the optical disc D is guided by the feed guide member 49a of the disc feed guide member 49 so as to be fed as far as the loading position on the disc reproducing unit 3.

The second arm 55 is molded of synthetic resin and has a driving section 66 having a pivotal mounting portion to the pivot 53 at its one end and an L-shaped disc detecting section 67 extending from the pivotal mounting portion of the driving section 66 to the pivot 53 in the direction of the optical disc D housed within the disc housing unit 2, as shown in FIG. 6. The disc detecting section 67 faces the disc feed member 64 of the first arm 54, with the optical disc D housed within the disc housing unit 2 therebetween. On one end of the disc detecting section 67 facing the disc feed member 64 is mounted a roll contacted with the outer periphery of the optical disc D.

In the driving section 66 is bored a second cam groove extending from the pivotal mounting portion towards the opposite end of the driving section. The portion of the second cam groove 58 extending towards left from its opposite end facing a pivotal mounting portion to the pivot 53 as far as the pivotal mounting portion to the pivot 53 over a length equal to one-third of the overall length of the cam groove is formed as a first cam section 58*a* having the radius of curvature equal to that of a first cam. 75 formed in the first arm 54. The mid portion intermediate between the first cam section 58*a* and the pivotal mounting portion to the pivot 53 is formed as a second cam section 58*b* which is continuous to the first cam section 58*a* and which has the same radius of curvature as that of the first cam section 58*a*. The portion extending from the second cam 58*b* to the pivotal mounting portion for the pivot 53 is formed as a linear second cam section 58*c*. The side of the second can groove 58 facing the second cam section 58*b* is formed as a clearance 58*d* cut off in the form of an indentation.

Figure 14:
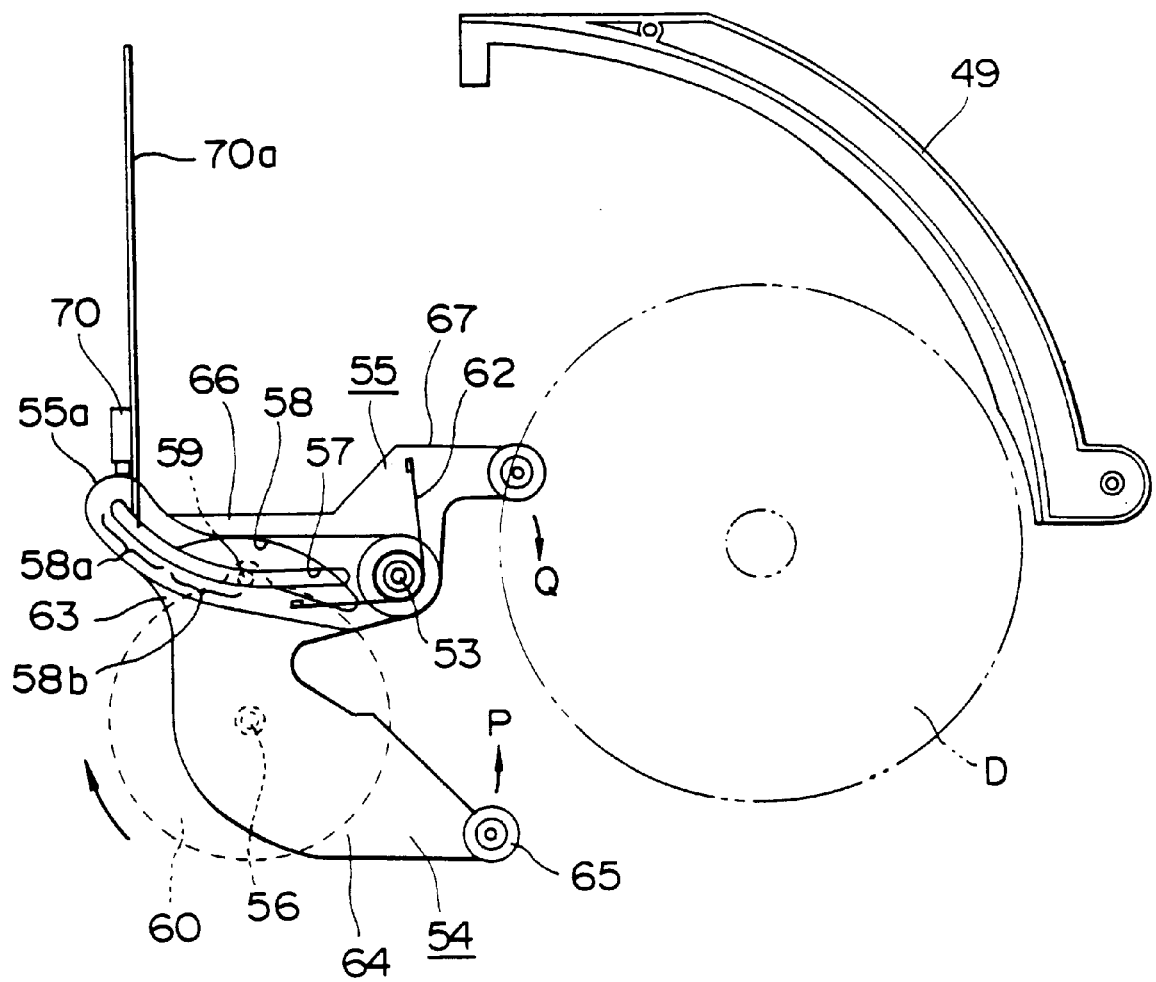
FIG. 14 shows the operation of the disc transporting mechanism of the disc reproducing apparatus according to the present invention, and shows the operation in which there is no disc at the disc takeout enabling position.

Thus the portion extending from the first cam section 58*a* of the first cam groove 58 as far as the second cam section 58*b* is arcuate-shaped and has the same radius of curvature as that of the first cam sections 57*a* and 57*b* of the cam groove 57. The curvature of the first and second cam sections 57*a* and 57*b* of the first cam groove 57 and curvature of the first and second cam sections 58*a*, 58*b* are arcuately-shaped, with the center of rotation of the rotating disc 60 having the arm rotation control pin 59 set thereon as the center of the curvature, as shown in FIG. 14.

When the arm rotation control pin 59 inserted in the second cam groove 58 is run in rotation so that the second arm 55 constituting the disc feed mechanism 50 is rotated clockwise as shown by arrow. Q in FIG. 6, the roll 68 provided on its one end is made to bear against the outer periphery of the optical disc D opposite to the portion of the outer periphery of the disc D contacted by the roll 65. The second arm 55 has its clockwise rotation as indicated by arrow Q in FIG. 6 controlled by abutment of the roll 65 on the outer periphery of the optical disc D.

If, while no optical disc D to be transported is held within the inserting slit 6 of the disc housing unit 2 in register with the disc transporting mechanism 42, the second arm 55 is rotated clockwise as indicated by arrow Q in FIG. 6, the roll 68 provided on its one end is not contacted with the optical disc D. Thus the second arm 55 is further rotated clockwise as indicated by arrow Q in FIG. 6. When the detection switch 70 for detecting the presence or absence of the optical disc D provided on the rotating trajectory of the second arm 22 is actuated by the switch operating section 55*a* on the opposite side to the roll 68, so that the detection switch 70 is turned on, it is electrically detected that there is no optical disc D to be transported in the disc inserting slit 6 of the disc housing unit 2 in resister with the disc transporting mechanism 42.

The detection switch 70 for detecting the presence or absence of the optical disc D is mounted on a mounting plate 70*a* arranged within the outer casing 1.

The operation of taking out the optical disc D from the disc housing unit 2 by the above-described disc transporting mechanism 42 and the operation of detecting the presence or absence of the optical disc D in the disc inserting slit 6 of the disc housing unit 2 are hereinafter explained.

Figure 7:
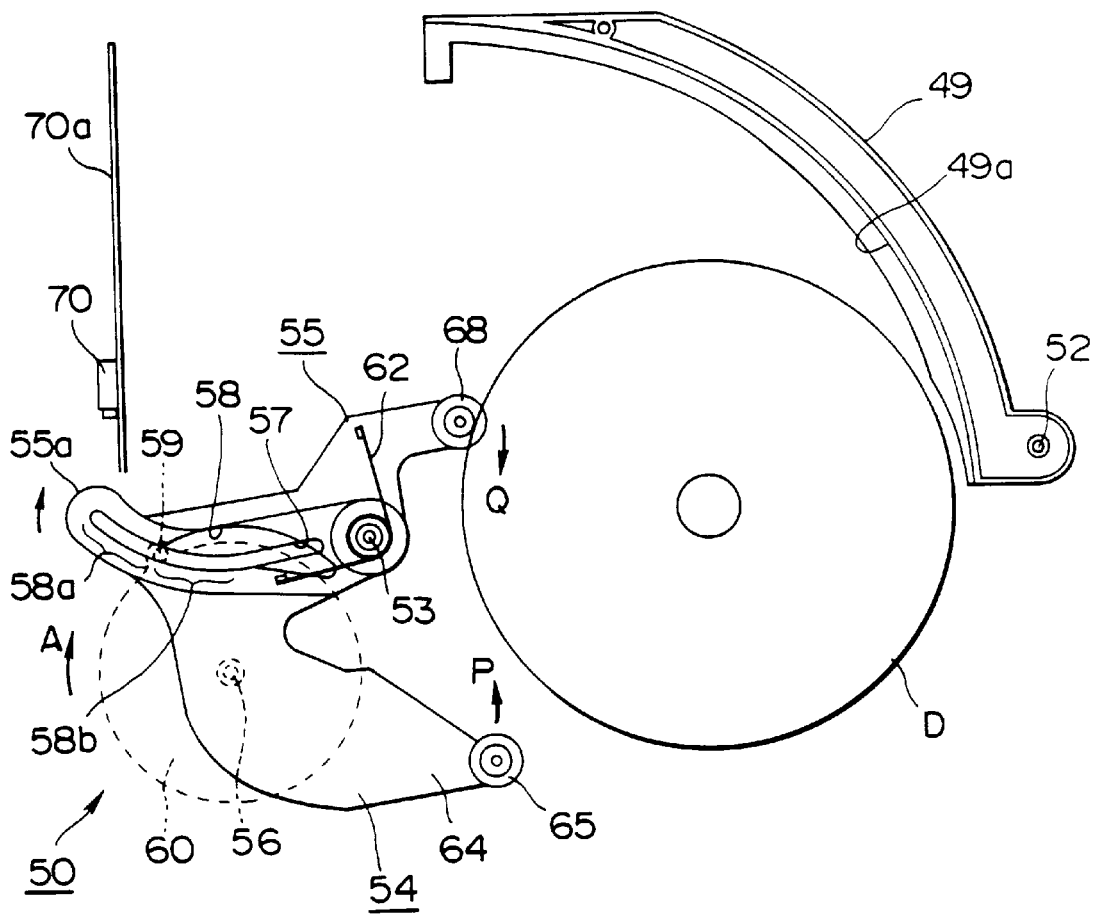
FIG. 7 shows the operation of the disc transporting mechanism of the disc reproducing apparatus according to the present invention, and shows the operating process for the state in which the distal end of the second arm is abutted against an optical disc in the disc takeout enabling position.

Before transporting the disc, the state of the disc transporting mechanism 42 is such that, as shown in FIGS. 3 and 6, the first and second arms 54, 55 are extended apart from each other, with the pivot 53 as the center of rotation, as shown in FIGS. 3 and 6. Thus the rolls 65, 68, provided on the one ends of the first and second arms 54, 55, are spaced apart from the outer periphery of the optical disc D inserted into the disc inserting slit 6 of the disc housing unit. If now the rotating disc 60, having the arm rotation control pin 59 set thereon, is run in rotation clockwise as indicated by arrow A in FIG. 6, about the pivot 56 as the center of rotation, the arm rotation control pin 59 in its initial stage is rotated from the first cam section 57*a* on the upper surface of the first cam groove 57 formed in the. first arm 54 and from the upper surface of the first cam section 58*a* of the second cm groove 58 in the second arm 55 along the upper surface of the first cam section 58*a* of the second cam groove 58 formed in the second arm 55, as shown in FIG. 7. As the arm rotation control pin 59 is rotated in the direction shown by arrow A in FIG. 6, the first and second arms 54, 55 are rotates in unison clockwise, that is, in the same direction as the direction of rotation of the arm rotation control pin 59, with the common pivot 53 as the center of rotation. As the arm rotation control pin 59 continues its rotation clockwise as indicated by arrow A in FIG. 6, the roll 68 provided at one end of the second arm 55 approaches the outer periphery of the optical disc D housed within the disc housing unit Z. When the roll 68 is brought into contact with the outer periphery of the optical disc D, as shown in FIG. 7, clockwise rotation of the second arm 55 ceases. At this time, the switch actuating section 55*a* on the opposite side of the second arm 55 is sufficiently spaced apart from the detection switch 70 adapted for detecting the presence or absence of the optical disc D. Thus the optical disc D to be transported being present in the disc housing unit 2 is detected by the roll 68 provided at one end of the second arm 55.

Figure 8:
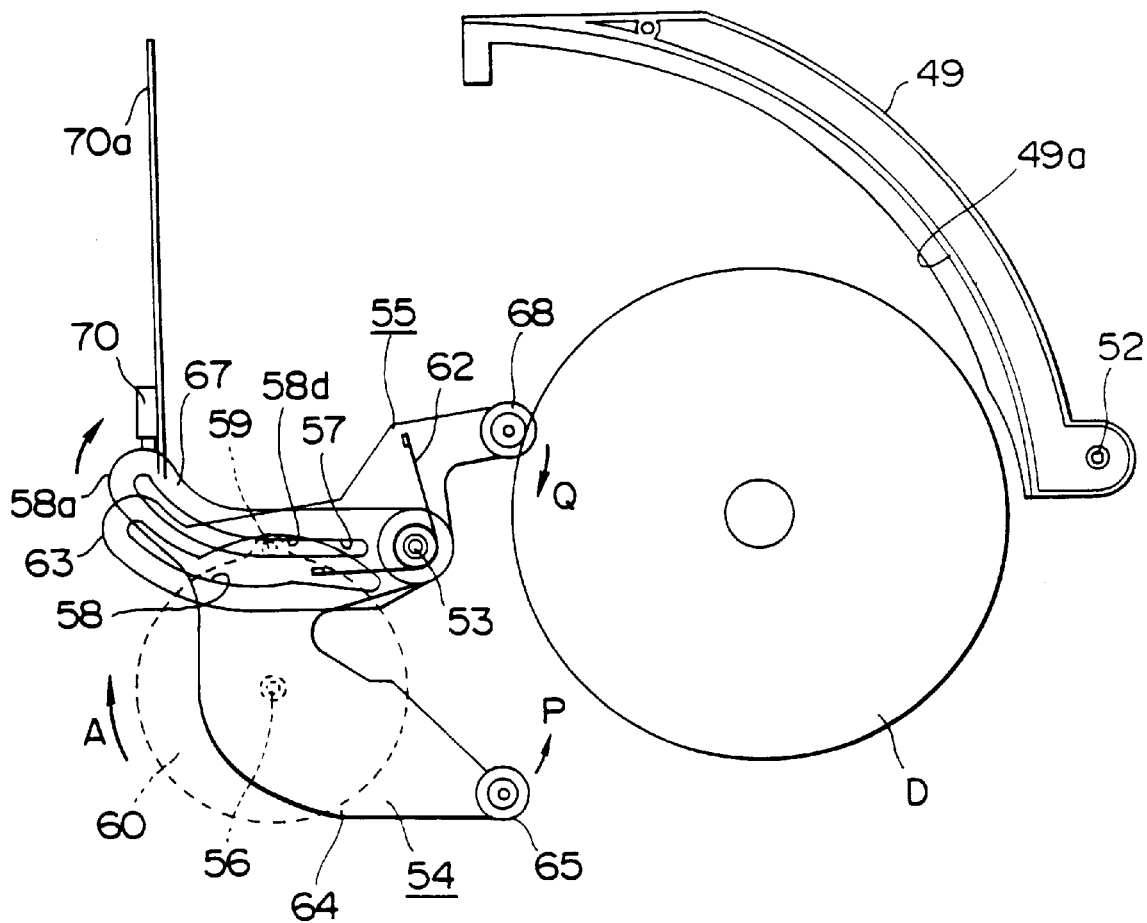
FIG. 8 shows the operation of the disc transporting mechanism of the disc reproducing apparatus according to the present invention, and shows the operating process for the state in which the first arm is rotated clockwise with clockwise rotation of a rotary disc beginning from the position in which the distal end of the second arm is abutted against the optical disc which is in the disc takeout enabling position.

If the rotating disc 60 is further run in rotation clockwise as indicated by arrow A in FIG. 7, the arm rotation control pin 59 is rotated along the first cam section 57*a* on the upper surface of the first cam groove 57 in the first arm 54, as shown in FIG. 8, for rotating the first arm 54 clockwise as indicated by arrow P in FIG. 7, about the pivot 53 as the center of rotation. On the other hand, since the roll 68 is abutted against the outer periphery of the optical disc D and the arm rotation control pin 59 is separated from the second call section 58*b* so as to be rotated within the clearance 58*d* opposite to the second. cam 58*b*, the second arm 55 has its rotation suppressed by the optical disc D and thereby is halted. That is, only the first arm 54 is rotated clockwise as indicated by arrow P in FIG. 7, about the pivot 53 as the center of rotation.

If there is no optical disc D inserted into the disc inserting slit 6 of the disc housing unit 2 faced by the first and second arms 54, 55, there is no obstacle impeding rotation of the second arm 55, as shown in FIG. 14. As a result, the second arm 55 is rotated clockwise under the bias of the torsion coil spring 62, as indicated by arrow Q in FIG. 14, about the pivot 53 as the center of rotation, for approaching the one end side roll 68 towards the first arm 54. The second arm 55 is rotated clockwise as indicated by arrow Q in FIG. 14, until the arm rotation control pin 60 is made to bear against the second cam section 58*b* of the second cam 58. With the rotation of the second arm 55, the switch actuating section 55*a* provided at the opposite end of the second arm 55 is rotated towards the detection switch 70 for the presence or absence of the optical disc D for actuating and turning on the selection switch 70.

Figure 9:
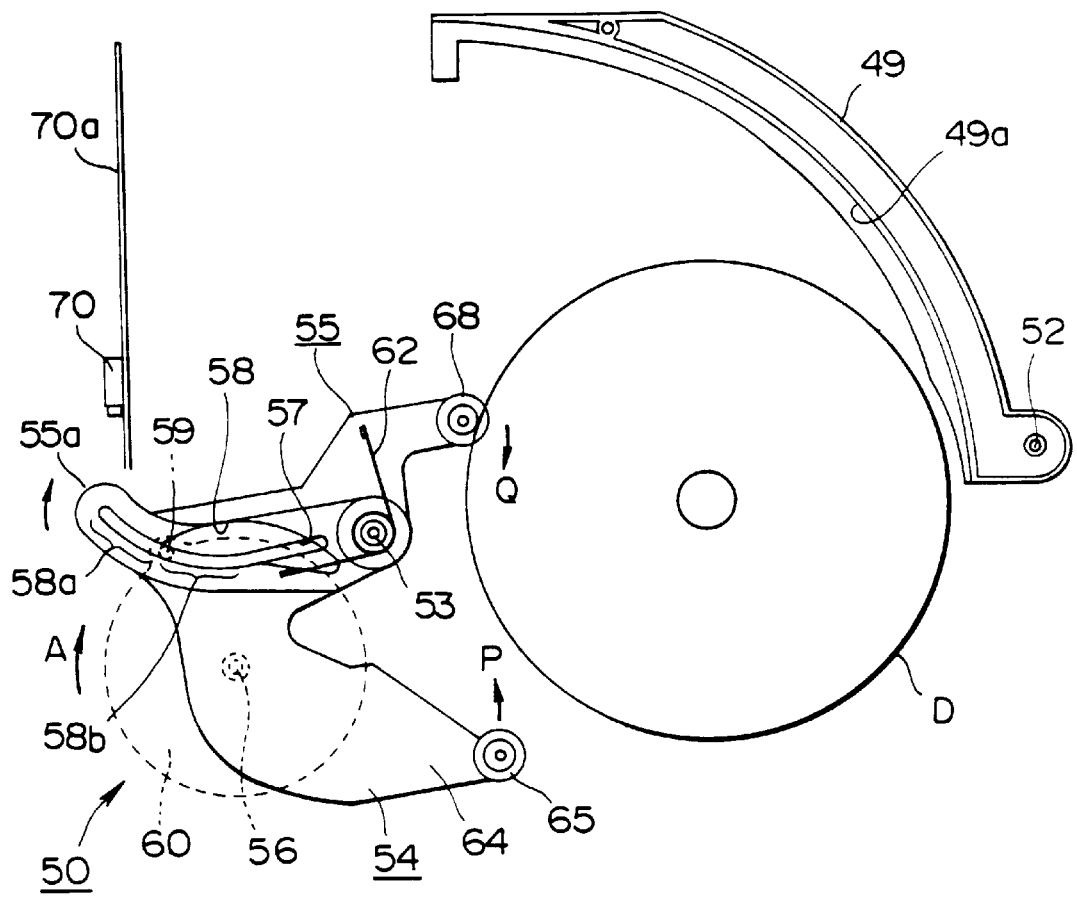
FIG. 9 shows the operation of the disc transporting mechanism of the disc reproducing apparatus according to the present invention, and shows the operating process for the state in which the first arm is switched from the clockwise rotation to the counterclockwise rotation.

If the rotating disc 60 is further rotated from the state shown in FIG. 8 as indicated by arrow A in FIG. 8, the arm rotation control pin 59 reaches the end of the pivot 53 of the first cam groove 57 in the first arm 54, as shown in FIG. 9. With further rotation of the rotating disc 60 in the direction shown by arrow A in FIG. 9, the arm rotation control pin 59 is rotated along the side of the second cam section 57*b* of the first cam groove 57. If the rotating disc 60 is further rotated from such state in the direction indicated by arrow A in FIG. 9, the arm rotation control pin 59 is rotated as it thrusts the second cam section 57b of the first cam groove 57, for rotating the first arm 54 about the pivot 53 counterclockwise as indicated by arrow P in FIG. 10. The roll 65 provided at one end of the first arm 54 approaches the outer periphery of the optical disc D housed within the disc housing unit 2.

The second arm 55 has its one side roll 68 abutted against the optical disc D, with the arm control pin 60 being rotationally moved within the clearance 58d of the second cam groove 58. Thus the second arm 55 is maintained in its halted position.

Figure 10:
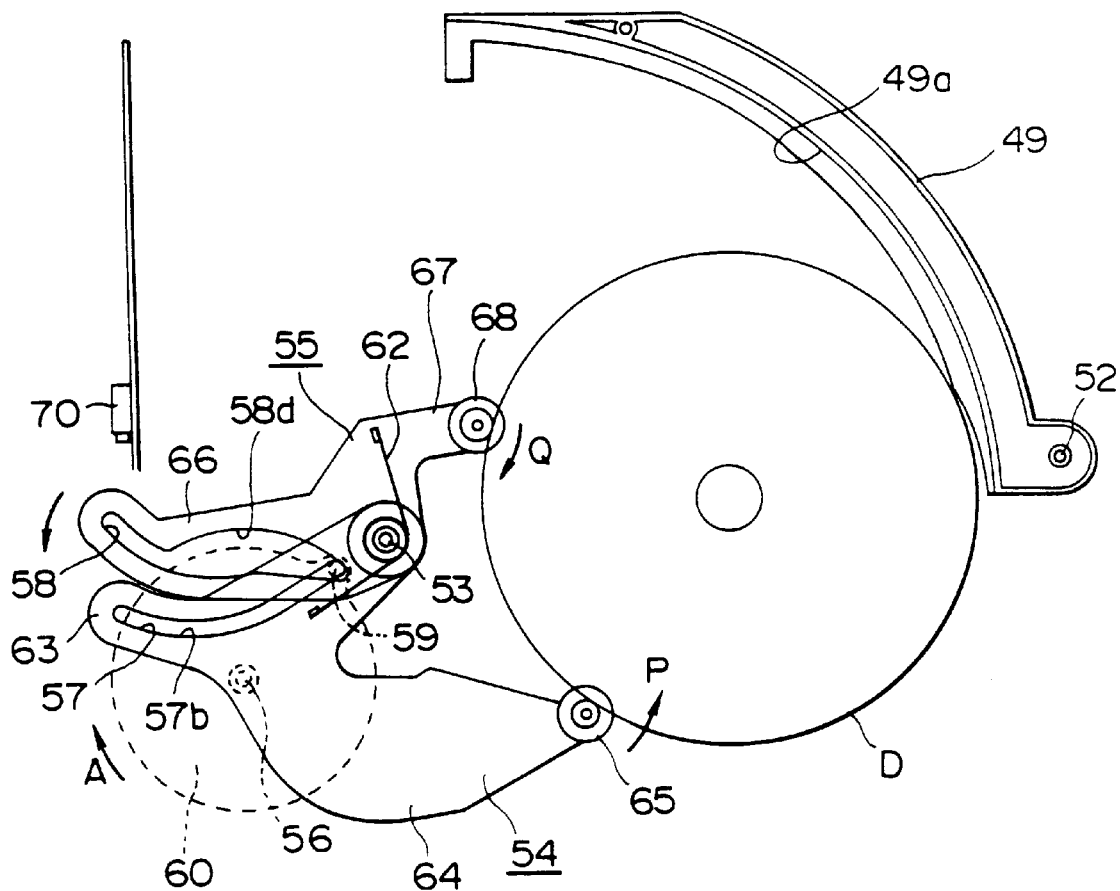
FIG. 10 shows the operation of the disc transporting mechanism of the disc reproducing apparatus according to the present invention, and shows a moment in the operating state in which the distal end of the first arm is abutted against the optical disc which is in the disc takeout enabling position for lifting the optical disc.

If the rotating disc 60 is further rotated clockwise as indicated by arrow A in FIG. 10, the arm rotation control pin 59 is rotated as it thrusts the second cam section 57b of the cam groove 57 of the first arm 54, as shown in FIG. 10, until the roll 65 provided at one end of the first arm 54 is caused to bear against the outer periphery of the optical disc D. As the rotation of the rotating disc 60 in the direction indicated by arrow A in FIG. 10 proceeds, the first arm 54 uplifts the optical disc D supported by the end roll 65 towards the feed guide section 49a of the feed guide member 49. The arm rotation. control pin 59 is caused at this time to bear against he second cam section 58b of the second cam groove 58 of the second arm 55 and is rotated as it thrusts the second cam section 58b. Since the second cam section 58b of the cam section 58 has the same radius of curvature as the second cam section 57b of the first cam groove 57, the second cam section is thrust be the arm rotation control pin 59 simultaneously with the second cam section 57b of the first cam groove 57. Thus the second arm 55 is rotated counterclockwise as indicated by arrow P FIG. 10, in unison with the first arm 54, with the end roll 68 in proximity to the outer periphery of the optical disc D, with the pivot 53 as the center of rotation.

Figure 11:
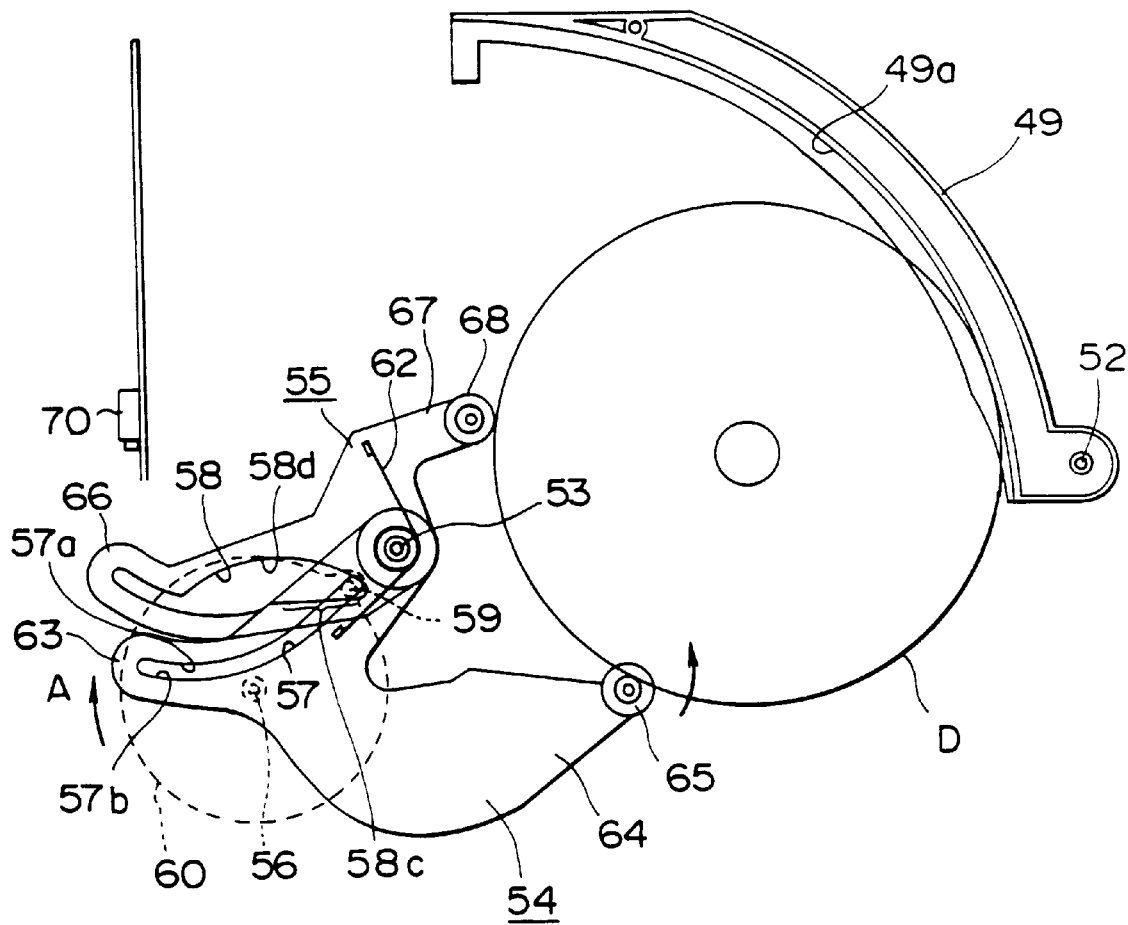
FIG. 11 shows the operation of the disc transporting mechanism of the disc reproducing apparatus according to the present invention, and shows the operating state in which the optical disc is lifted obliquely upward and contacted with a disc feed guide member with counterclockwise rotation of the first arm.
Figure 12:
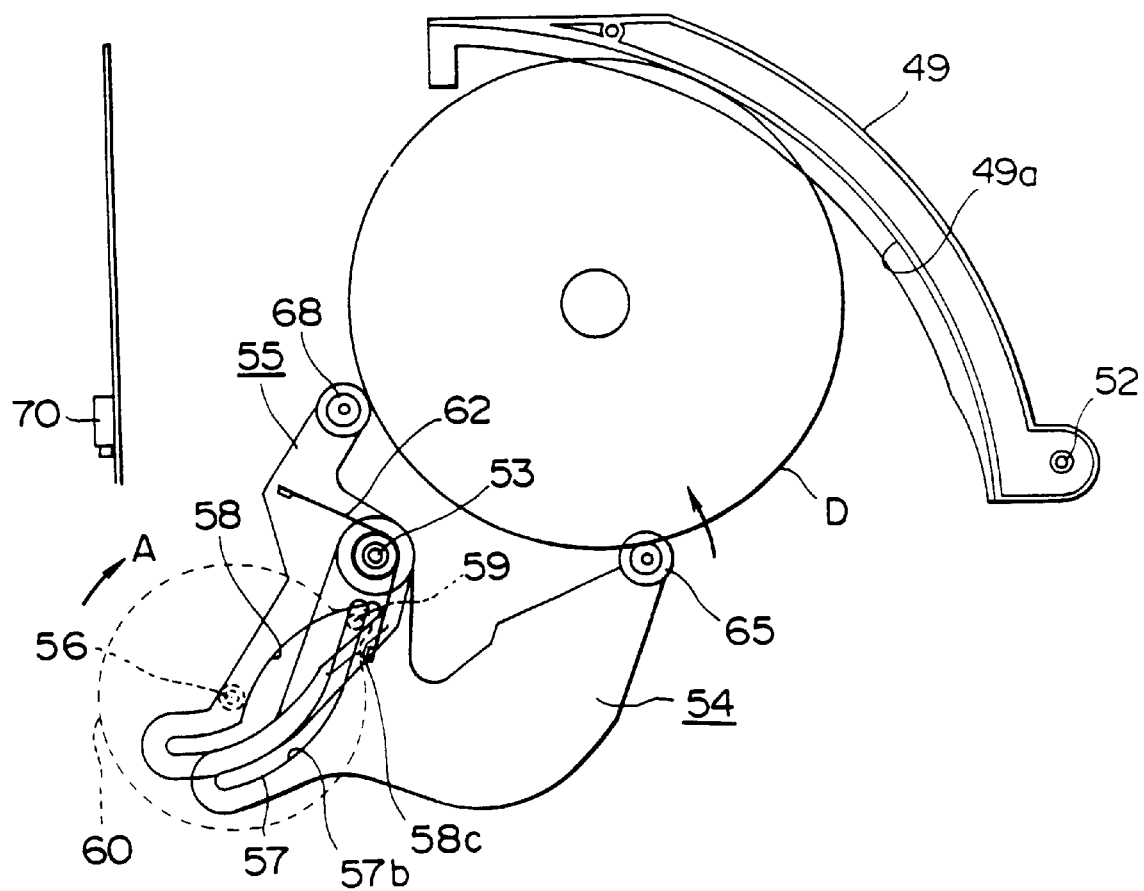
FIG. 12 shows the operation of the disc transporting mechanism of the disc reproducing apparatus according to the present invention, and shows the state in which the optical disc is fed towards a disc loading position on the disc reproducing unit under guidance by a disc feed guide member with counterclockwise rotation of the first arm.

If the rotating disc 60 is further rotated clockwise as indicated by arrow A in FIG. 10, the arm rotation control pin 59 is rotated, as the arm rotation control pin thrusts the second cam section 57b of the first cam groove 57 provided in the first arm 54 and the second cam section 58b of the second cam groove 58 in the second cam 55, as shown in FIGS. 11 and 12. With rotation of the first arm 54 in the direction shown by arrow P in FIG. 11, the optical disc D supported by the end roll 65 of the first arm 54 has its outer periphery contacted with the feed guide section 49a of the disc feed guide member 49. If the rotating disc 60 continues further to be rotated clockwise as indicated by arrow A in FIG. 10, the first arm 54 is rotated counterclockwise as indicated by arrow P in FIG. 12 by the arm rotation control pin 59. Thus the optical disc D is fed towards the disc feed guide unit 2, as it is guided along the feed guide section 49a of the disc feed guide member 49 by the first arm 54.

Meanwhile, if the first arm 54 is rotated in the direction shown by arrow P in FIG. 12, for feeding the optical disc D towards the disc reproducing unit 2, the arm rotation control pin 59 of the rotating disc 60 is rotated as it is thrust against the linear third cam section 58c of the second cam groove 58 of the second arm 55. With rotation of the arm rotation control pin 59, the second arm 55 is rotated up to the position slightly spaced apart from the outer periphery of the optical disc D. This position is such a position in which the optical disc D is not loaded by the end roll 68. That is, the second arm 55 is rotated counterclockwise as indicated by arrow Q in FIG. 11, against the bias of the torsion coil spring 62 rotationally biasing the second arm 55 towards the first arm 54. Since no thrusting force is exerted on the optical disc D under the bias of the torsion coil spring 62, the optical disc D is smoothly fed towards the loading position on the disc reproducing unit 2 by the first arm 54, as the disc is guided by the disc feed guide member 49.

Figure 13:
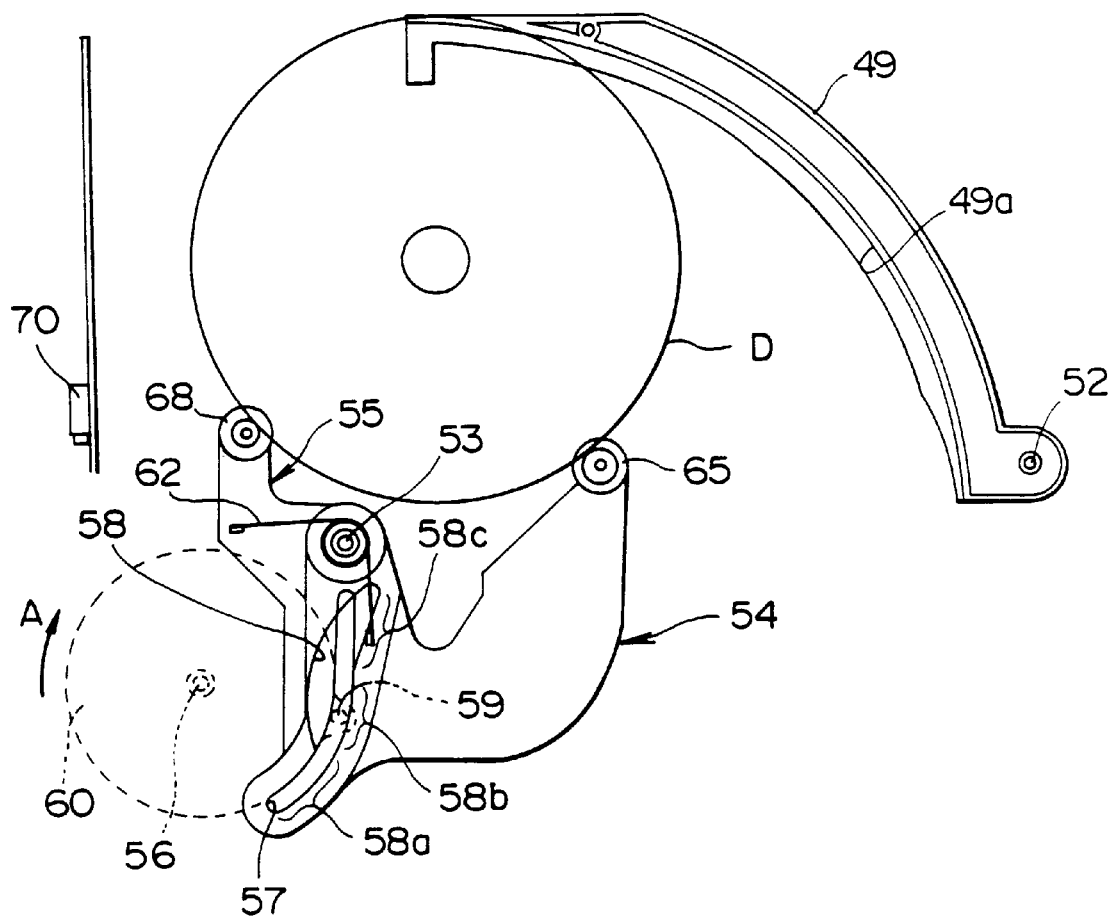
FIG. 13 shows the operation of the disc transporting mechanism of the disc reproducing apparatus according to the present invention, and shows the state in which the optical disc is fed as far as the disc loading position on the disc reproducing unit.

If then the rotating disc 60 is further rotated clockwise as indicated by arrow A in FIG. 12, the arm rotation control pin 59 is made to bear against the third cam section 58c of the second cam groove 58 provided in the second arm 55 and is rotated as it thrusts the third cam section 58c, as shown in FIG. 13. As the rotating disc 60 is further rotated in the direction indicated by arrow A in FIG. 13, the arm rotation control pin 59 is rotationally moved from the third cam section 53c towards the second cam section 58b. When the arm rotation control pin 59 just reaches the boundary between the third cam section 58c and the second cam section 58b, the optical disc D reaches the disc loading position within the disc reproducing unit 2. At this time, the optical disc D is supported by the end rolls 65, 68 of the first and second arms 54 and 55, as shown in FIG. 13

At this time, the first cam groove 57 formed in the first arm 54 is coincident with the first and second cams 58a, 58b of the second cam groove 58 formed in the second arm 55. Since the first cam 57 and the first and second cam sections 58a, 58b of the second cam 58 are formed as curved portions having the same curvature, and have the center of curvature coincident with the pivot 56 as the center of rotation of the rotating disc 60. Consequently, since the arm rotation control pin 59 is halted at some position within the range of the coincident curvature of the first cam section 57 and the second cam section 58, the optical disc D is maintained in such state in which the optical disc D is halted at the disc loading position of the disc reproducing unit 2.

With the above-described disc transporting mechanism, in which the arm rotation control pin 59 is provided at an offset position of the rotating disc 60 which is rotated by the rotational driving of the driving motor 61, and the pin 59 is passed through the first and second cam grooves 57 and 58 formed in the first and second arms 54, 55, the first and second arms 54, 55 may be rotated simultaneously by the rotation of the rotating disc 60. Additionally, the distance C between the end rolls 5 and 68 provided at one ends of the first arm 54 and the second arm 55, respectively, can be changed during rotation of these arms 54, 55 by changes in profile of the first and second cam grooves 57, 58, especially changes in profile from the first cam section 58a towards the third cams section 58c of the second cam groove 58 in the second arm 55.

By changing the distance C between the end rolls 65, 68 of the first and second arms 54, 55 during rotation of these arms 54, 55, the end rolls 65, 68 of the first and second arms 54, 55 may be made to follow the trajectory of the optical disc D when the optical disc D contained and held within the disc housing unit 2 is taken upwardly of the disc housing unit 2 by clockwise rotation of the rotating disc 60 in the direction indicated by arrow A in FIG. 6 and the optical disc D thus taken out is transported as far as the disc loading position of the disc reproducing unit 43 under control by the end rolls 65, 68 at one ends of the first and second arms 54, 55 and the curved feed guide section 49a of the disc feed guide member 49. That is, the feed trajectory of the optical disc D may be freely changed by setting the curvature of the curved feed guide section 49a provided in the disc feed guide section 49a.

Thus it becomes possible to provide an elliptical disc movement trajectory D having a low height relative to a completely arcuate disc movement trajectory D which is provided in case the distance C between the end rolls 65 and 68 of the first and second arms 54, 55 is fixed, so that it becomes possible to realize the disc transporting mechanism 42 having a small movement space for the optical disc D.

It may be seen from the operation shown in FIGS. 6 to 14 that, due to the profile of the first cam groove 57 in the first arm 54, the direction of rotation in the initial stage of the first and second arms 54, 55 is clockwise until the arm rotation control pin 59 provided at an offset position of the rotating disc 60 is perpendicular to the pivot 56 which pivotally mounts the disc 60 and which serves as the center of rotation of the disc 60. At this time, the end roll 68 provided at one end of the second arm 55 is contacted with the outer periphery of the optical disc D housed within the disc housing unit 2. However, if there is no optical disc D housed within the disc inserting slit 6 of the unit 2 which is to be selected, the second arm is rotated further in the clockwise direction. The detection switch 70 for the presence or absence of the optical disc D is thrust by the switch operating section 55 at the other end, as shown in FIG. 14, and is thereby turned on.

In short, due to the profile of the first to third cam sections 58a to 58c formed in the second can groove 58 formed in the second arm 55, the possible presence of the optical disc D to be taken out may be detected at an earlier time point in the initial stage since the start of the rotation of the first and second arms 54, 55. In addition, by setting the center of curvature of the arc up to the first and second cam sections 57a, 57b in the first cam groove 57 in the first arm 54 and the first and second cam sections 58a, 58b in the second cam groove 58 in the second arm 55 so as to be coincident with the center of the pivot 56 which is the center of rotation of the rotating disc 60, a certain allowance may be provided in the stop angle of the rotating disc 60 at the loading position of the optical disc D relative to the disc reproducing unit 2.

Even if the arm rotation control pin 59 should be halted at some position in which the first and second cam sections 57a, 57b formed in the first cam groove 57 in the first arm 54 are overlapped with the portions from the first cam section 58a to the second cam section 58b formed in the second cam 58 in the second arm 55, there is no change produced in the position of the optical disc D transported to the disc loading position of the disc reproducing unit 2, such that a feed operation of the optical disc D may be realized with high reliability.

In the disc reproducing apparatus of the present embodiment, a housing unit rotation control mechanism 73 is provided in the vicinity of the disc transporting mechanism 42. The housing unit rotation control mechanism 73 has a stop member 75 rotatably mounted about a pivot 74 set upright on the lower end of the disc reproducing unit mounting substrate 51 mounted within the outer casing 1 as the center of rotation, as shown in FIG. 3. The stop member 75 is rotationally biased clockwise at all times as indicated by arrow B in FIG. 3 by a tension spring 76 mounted under tension between a spring retainer 76a formed by segmenting and bending a portion of the lower end portion of the disc reproducing unit mounting substrate 51 and another spring retainer 76b provided at one end of the stop member 75.

The stop member 75 is formed with a rotation suppressing section 77 at the other end thereof extended towards the corder of the outer casing 1. The rotation suppressing section 77 is caused to bear against the arm rotation control pin 59 provided on the rotating disc 60 adapted for rotating the first and second arms 54, 55 of the disc transporting mechanism 42, as shown in FIG. 3, for suppressing clockwise rotation of the stop member 75 under the bias of the tension spring 76. On one end of the stop member 75 is set a stop pin 78 which is protruded towards the engagement recess 10 formed in the outer peripheral surface of the rotary table 5.

If, with the disc transporting operation by the disc transporting mechanism 42, the arm rotation control pin 59 provided on the rotating disc 60 is rotated clockwise in FIG. 3, with the pivot 56 as the center of rotation, the stop member 75 is rotated clockwise as indicated by arrow S in FIG. 2, with the pivot 74 as the center of rotation. At this time, the stop pin 78 set on one end of the stop member 75 is engaged in one of the engagement recesses 10 in register with the disc inserting slits 6 formed in the outer periphery the rotary table 5 which is associated with the disc inserting slit 6 engaged by the designated optical disc D transported by the disc transporting mechanism 42. By the stop pin 78 being engaged in the engagement recess 8, rotation of the disc housing unit 2 inclusive of the rotary table 5 may be controlled. Thus the housing unit rotation suppressing mechanism 73 provides a protection mechanism in the course of the reproduction and transport of the optical disc D.

In the present embodiment, an opening width w of each recess 8 is set so as to be slightly larger than the diameter of the stop pin 78. Consequently, if a small error is produced in the stop angle of the rotary table 5, the disc inserting slit 6 of the rotary table 5, in which the optical disc D as designated to be transported to and reproduced by the disc reproducing unit 2 is inserted, may be corrected so as to be accurately positioned in register with the disc transporting mechanism 42.

The disc reproducing unit 3, constituting the disc reproducing apparatus according to the present invention, will now be explained.

Figure 15:
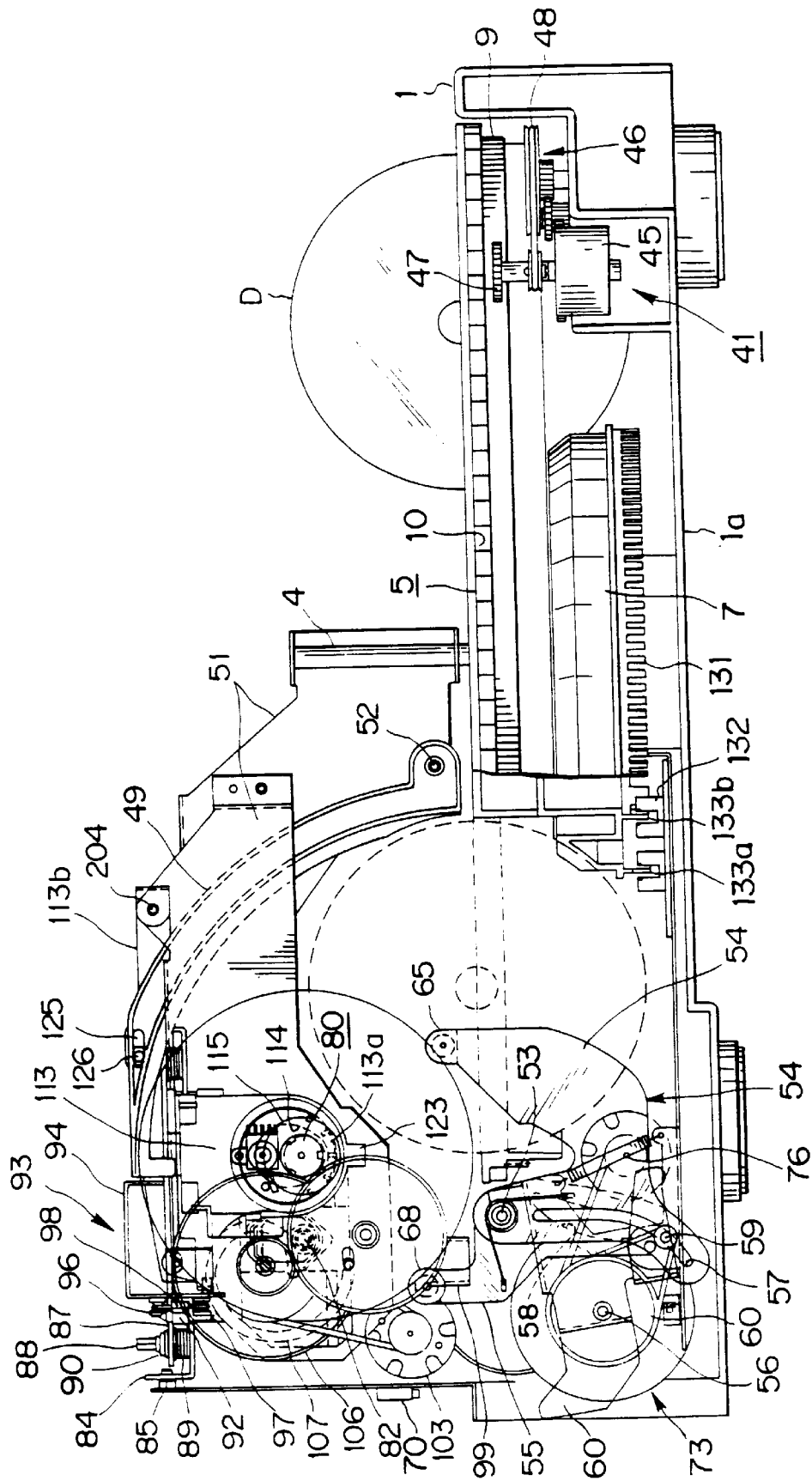
FIG. 15 is a schematic view showing the disc reproducing unit of the disc reproducing apparatus according to the present invention.
Figure 17:
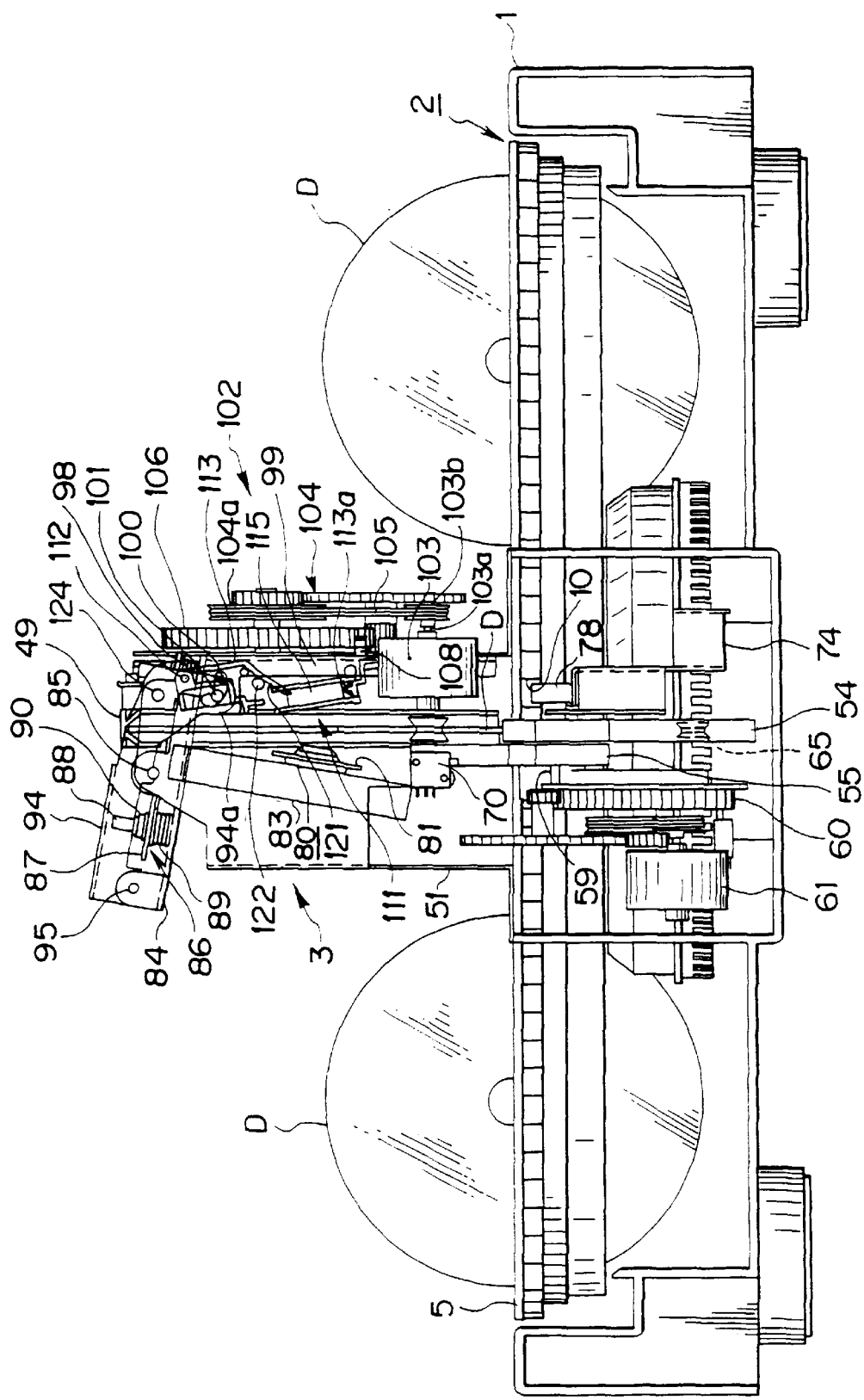
FIG. 17 is a front view showing the disc reproducing unit of the disc reproducing apparatus according to the present invention.

The disc reproducing unit 3 is mounted on the disc reproducing unit mounting substrate 51 arranged within the outer casing 1. The disc reproducing unit 3 includes, as shown in FIGS. 3, 15 and 17, a disc rotating driving mechanism 80, provided with a disc table 81 for loading the optical disc D transported by the disc transporting mechanism 42, and an optical pickup unit 82 as reproducing means for radiating a light beam onto the signal recording surface of the optical disc D loaded and rotated on the disc rotating driving mechanism 80 for reproducing information signals, such as music signals, recorded on the optical disc D. The optical pickup unit 82 includes an optical pickup having an objective lens for converging and radiating the light beam outgoing from a light source, such as a semiconductor Laser, onto the signal recording surface of the optical disc D. The optical pickup is supported by a slide guide shaft and fed by a pickup feed driving mechanism in the radial direction of the optical disc D loaded on the disc rotating driving mechanism 80 for scanning the signal recording surface of the optical disc D across its inner and outer rims.

The disc reproducing unit 3 is mounted so that the rotary axis of the disc rotating driving mechanism 80 is at right angles to the pivot 4 which is the center of rotation of the disc housing unit 2. Thus the optical disc D loaded on the disc rotational driving mechanism 80 and there rotated has its plane of rotation parallel to the axis of the pivot 4 of the disc housing unit 2, as shown in FIGS. 3, 15 and 17. By arranging the disc housing unit 2 in this manner, the optical disc D, which is contained and held within the disc housing unit 2, with its major surface extending substantially parallel to the pivot 4, is transported by the disc transporting mechanism 42 and loaded on the disc reproducing unit 3 without changing the direction of insertion into the disc housing unit 2.

The concrete construction of the disc reproduction unit 3 is hereinafter explained. The disc rotating and driving mechanism and the optical pickup 82 are mounted on a pickup chassis, not shown, on a substantially box-shaped pickup chassis supporting substrate 83, in order to constitute a unitary disc reproducing block.

The disc reproducing unit mounting substrate 51 is mounted parallel to the axial direction of the pivot of the disc housing unit 2, that is, in a direction substantially normal to the bottom surface of the outer casing 1, as shown in FIGS. 3, 15 and 17. Thus the plane of rotation of the optical disc D, loaded and rotated on the disc rotating driving mechanism 80, is parallel to the axis of the pivot 4 of the disc housing unit 2. With the disc housing unit 2, arranged in this manner, the optical disc D, contained and held in the disc housing unit 2 with its major surface substantially parallel to the pivot 4, is transported by the disc transporting unit 42 and loaded on the disc reproducing unit 3 without changing the direction of insertion into the disc housing unit 2.

Turning to the concrete constitution of the disc reproducing unit 3, the disc rotating driving mechanist 80 and the optical pickup unit 82 are mounted on a substantially box-shaped pickup chassis supporting substrate 83, on a pickup chassis, not shown, for constituting a unitary disc reproducing block.

The disc reproducing unit mounting substrate 51 is mounted parallel to the axis of the pivot 4 of the disc housing unit 2, that is, substantially upright on the bottom surface of the outer casing 1, as shown in FIGS. 3, 15 and 17. On the disc reproducing unit mounting substrate 51, a disc driving supporting substrate 84 is rotatably mounted on a pivot 85 mounted on the upper end of the mounting substrate 84, as shown in FIGS. 15 and 17. The pickup chassis supporting substrate 83 is mounted depending from an oscillatable plate 87 resiliently supported by the disc driving unit supporting substrate 84 is a floating mechanism 86. The pickup chassis supporting substrate 83 carrying the disc rotating driving mechanism 80 and the optical pickup unit 82 and the oscillatable plate 87 mounting the pickup chassis supporting substrate 83 make up first supporting means for the disc reproducing unit 3. That is, the first supporting means constitutes disc driving unit supporting means for the disc reproducing unit 3.

The disc driving unit supporting substrate 84, rotatably supporting the pickup chassis supporting substrate 83 by means of the oscillatable plate 87 on the disc reproducing unit mounting substrate 51 fixedly mounted on the outer casing 1 constituting the main body of the apparatus, constitutes second supporting means for the disc reproducing unit 3. The second supporting means is used as disc driving unit rotating and supporting means.

In the oscillatable plate 87, there are bored three through-holes, in which is engaged a supporting pin 88 set on the disc driving unit supporting substrate 84. The floating unit 86 is arranged between the oscillatable plate 87 and the disc driving unit supporting substrate 84, and is made up of a coil spring 89, passed through by the supporting pin 88, and a damper 90 mounted surrounding a through-hole bored in the oscillatable plate 87. Three of such floating units 86 are provided in association with supporting pins 88.

A plurality of lock pin inserting through-holes 91 are bored in the oscillatable plate 87 in the vicinity of the floating units 86. The disc driving unit supporting substrate 84 is formed with a lock pin 92 selectively introduced through the lock pin inserting through-holes 91. The lock pin 92 has a tapered distal end. The lock pin inserting through-holes 91, bored through the oscillatable plate 87, is of a diameter substantially equal to the diameter of the proximal end opposite to the tapered distal end of the lock pin 92. Consequently, when the tapered distal end. of the lock pin 92 is inserted into the lock pin inserting through-holes 91, the enlarged proximal end of the lock pin 92 is retained in the lock pin inserting through-holes 91 for suppressing the movement of the oscillating plate 87.

With the present disc reproducing apparatus, there is provided a floating lock mechanism 93 for suppressing a resilient force afforded by the floating unit 86. The floating lock mechanism 93 has a lock lever overlying and extending laterally of the oscillatable plate 87. The lock lever 94 has its one end rotatably mounted by a pivot 95 on the lateral end face of the disc driving unit supporting substrate 84.

On the left-hand side of the lock lever 94 in FIG. 15, there is mounted a first spring mounting member 96. On the lower surface of the disc driving unit supporting substrate 84, there is mounted a second spring retention member 97 in register with the first spring retention member 96 provided on the oscillatable plate 87. Between these first and second spring retention members 96 and 97, there is mounted a tension spring 98. Thus the lock lever 94 is rotationally biased by the tension spring 98 in the direction shown by arrow T in FIG. 17 about the pivot 95 as the center of rotation. Thus the lock lever 87 biases the oscillatable plate 87 downwards. That the oscillatable plate 87 is thrust against the bias of the damper 90 and the spring 89 in a direction of approaching the disc driving unit supporting substrate 84. By the oscillatable plate 87 being thrust towards the disc driving unit supporting substrate 84, the tapered distal end of the lock pin 92 is introduced into the lock pin inserting through-holes 91 for retaining the enlarged proximal end in the lock pin inserting through-holes 91. The result is that the oscillatable plate 87 and the disc driving unit supporting substrate 84 are connected to each other and immobilized with a pre-set distance therebetween.

On the opposite side of the lock lever 94, opposite to its supporting side by the pivot 95, there is mounted a tongue piece 94a for depending from the outer casing 1 into a region of extension of the pickup chassis supporting substrate 83. On the tongue piece 94a is set an engagement pin 101 introduced into a guide opening 100 bored in a slider 99 as later explained. The slider 99 is movable vertically of the outer casing 1 by a vertical movement mechanism 102 with respect to the disc reproducing unit mounting substrate 51.

The vertical movement mechanism 102 for moving the slider 99 is mounted on the opposite surface of the disc reproducing unit mounting substrate 51 to that mounting the disc reproducing unit 3, as shown in FIG. 17. The vertical movement mechanism 102 is made up of a driving motor 103 mounted on the other surface of the disc reproducing unit mounting substrate 51 and a speed-reducing gear 104 made up of a plurality of gears. The gears making up the speed-reducing gear 104 are rotatably mounted by pivot mounted on the disc reproducing unit mounting substrate 51. That is, the vertical movement mechanism 102 constitutes a third driving unit of the present reproducing apparatus along with the driving motor 103.

Figure 18:
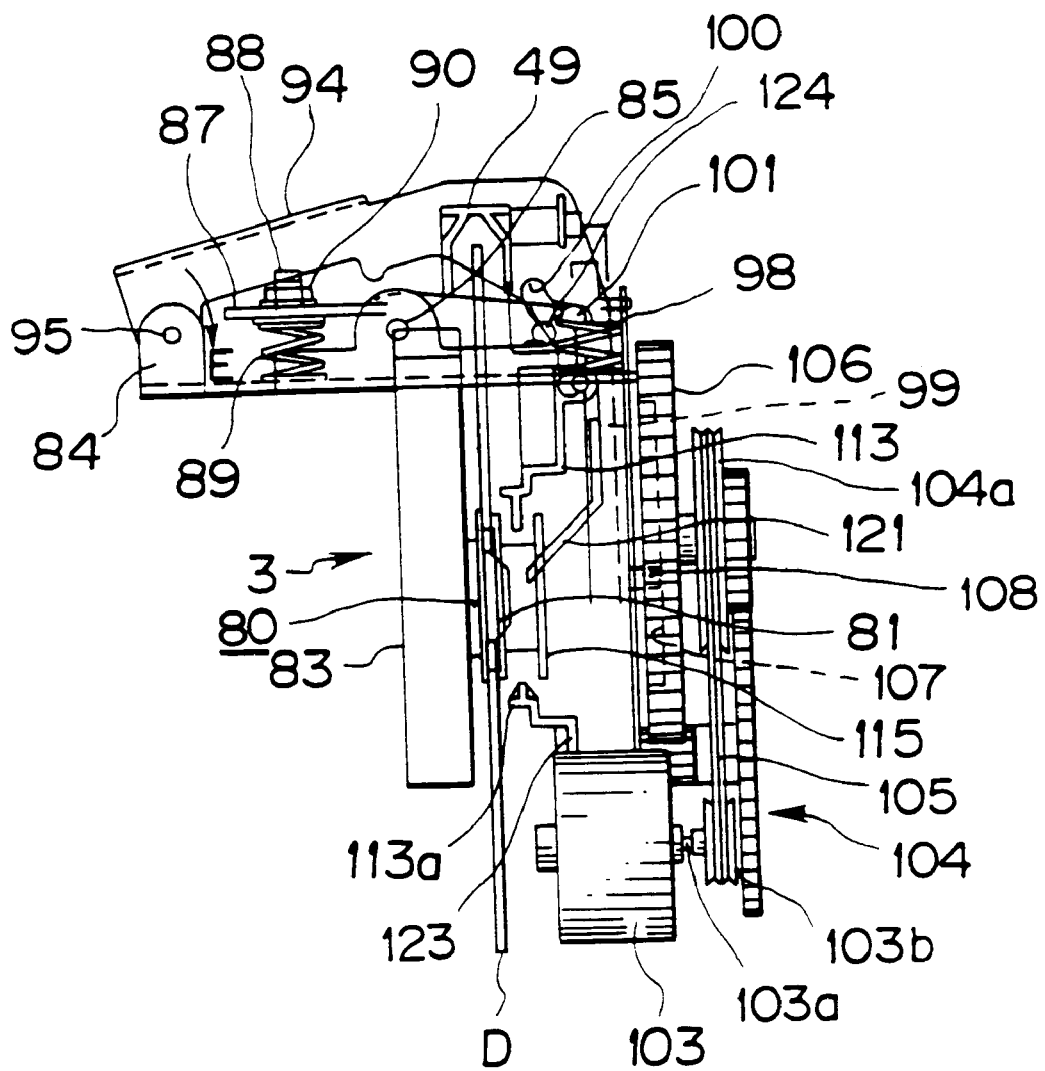
FIG. 18 is a front view showing the state in which the optical disc has been loaded on the disc reproducing unit of the disc reproducing apparatus according to the present invention.

The rotational driving power of the driving motor 103 is transmitted to the speed-reducing gear 104 by means of a driving power transmitting belt 105 placed around a pulley 103b mounted on an output shaft 103a of the driving motor 103 and a pulley 104a constituting the speed-reducing gear 104, as shown in FIGS. 17 and 18. The driving motor 103 is rotationally driven in either direction, that is, in a forward direction and in a reverse direction. The final stage of the speed-reducing gear 104, to which the rotational driving power of the driving rotor 103 is transmitted, has a main gear 106 which is driven in both the forward and reverse directions, depending on the direction of rotation of the driving motor 103.

The major surface of the main gear 106 facing the disc reproducing unit mounting substrate 51 is formed with a spirally extending groove 107 engaged by an engagement pin 107 set on the slider 99. When the driving motor 103 and hence the speed-reducing gear 104 are run in rotation, so that the main gear 106 is rotated, the slider 99 is moved vertically with the rotation in the forward and reverse directions of the main gear 106 about the pivot 106a as the center of rotation.

Figure 16:
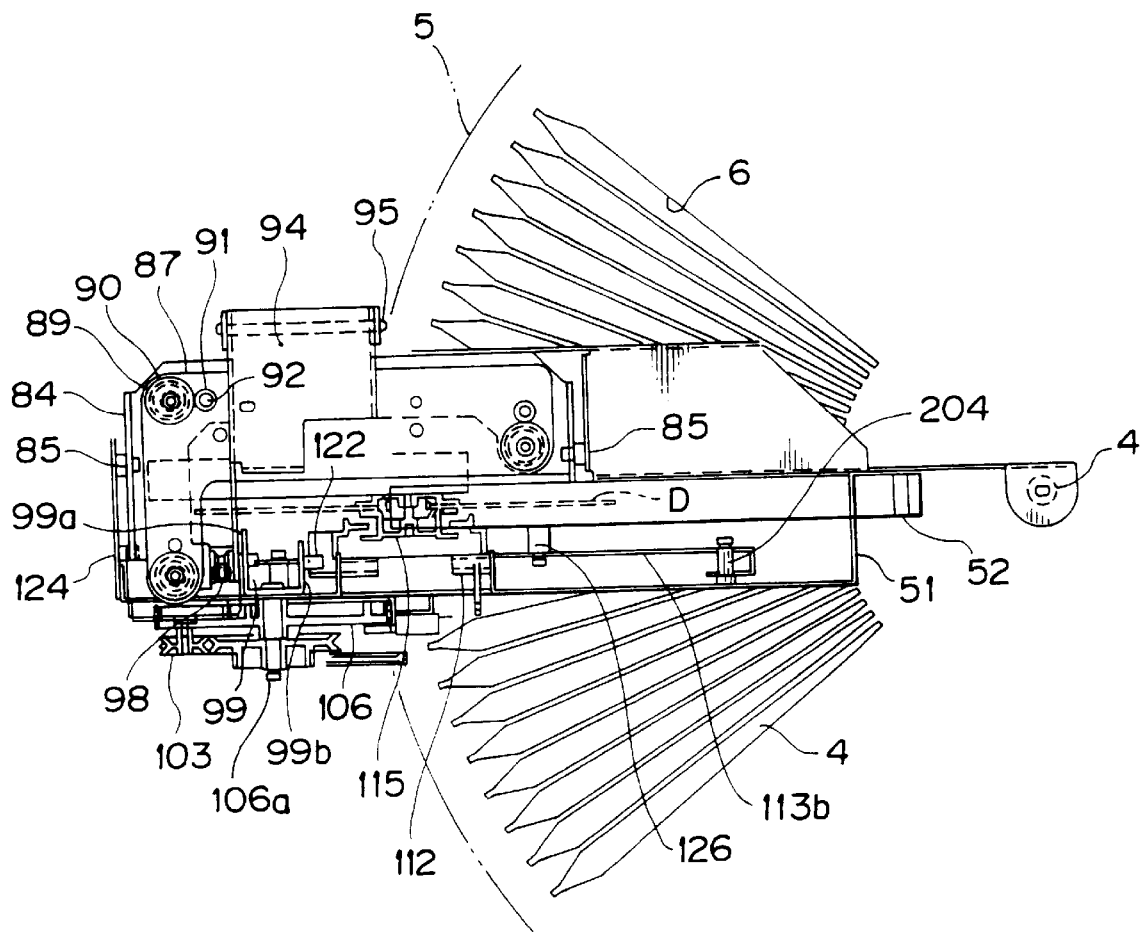
FIG. 16 is a plan view showing the disc reproducing unit of the disc reproducing apparatus according to the present invention.

The slider 99 is formed by a metal plate which is bent in the cross-sectional form of a letter, as shown in FIG. 16. The upper end of the slider 99 is formed with a pair of lugs 99a, 99b protruded towards the disc reproducing unit 3. The lug 99a has the arcuate guide opening 100 passed through by the engagement pin 101 sat on the lock lever 94, as shown in FIG. 17.

The disc driving unit supporting substrate 84, rotatably supported by means of the pivot 85 mounted on the upper end of the disc reproducing unit mounting substrate 51 is rotated in a direction indicated by arrow E in FIG. 18, about the pivot 95 as the center of rotation, by the slider 99 being moved downward towards the bottom of the outer casing 1 by the driving of the vertical movement mechanism 102. That is, the lock lever 94 is rotated so that its supporting side with respect to the slider 99 is moved towards bottom side of the outer casing 1. By such rotation of the lock lever 94, the lock lever 94 thrusts the oscillatable plate 94 downwards for joining the oscillatable plate 87 with the disc driving unit supporting substrate 84. On the other hand, with rotation of the lock lever 94 in a direction E in FIG. 18, the disc driving unit supporting substrate 84 is rotated in the same direction as the end of the vertical movement mechanism 102, about the pivot 85 as the center of rotation.

When the engagement pin 108 set on the slider 99 reaches the lower dead point of the spiral groove 107 formed in the main gear 106, downward movement of the slider 99 ceases. The oscillatable plate 87 is joined with the disc driving unit supporting substrate 84 and inclined an angle Θ with respect to the horizontal, as shown in FIG. 17. Consequently, the pickup chassis. supporting substrate 83, depending from the oscillatable plate 87, and mounting the disc rotating driving mechanism 80 and the optical pickup unit 82, is also inclined by the angle 8 with respect to a plumb line. The disc table 81 of the disc rotating driving mechanism 80, mounted on the pickup chassis supporting substrate 83, is held at a position spaced apart from the optical disc D transported within the disc reproducing unit 3.

When the slider 99 is moved by the vertical movement mechanism 102 towards an upper part of the outer easing 1, the lock lever 94 is rotated in a direction opposite to the direction of arrow E in FIG. 18. With the rotation of the lock lever 94, downward thrusting of the oscillatable plate 87 is released. The oscillatable plate 87 is resiliently supported by means of the floating unit 86 by the disc driving unit supporting substrate 84. With rotation of the lock lever 94, the disc driving unit supporting substrate 84 is rotated in the same direction as the lock lever 94 about the pivot 85 as the center of rotation. That is, the disc driving unit supporting substrate 84 is rotated so that its supporting side with respect to the vertical movement mechanism 102 is directed towards the upper side of the outer casing 1.

When the engagement pin 108 set on the slider 99 reaches the upper dead point of the spiral groove 107 formed in the main gear 106, upward movement of the slider 99 towards an upper side of the outer casing 1 ceases. The result is that the oscillatable plate 87 is resiliently supported by the disc driving unit supporting substrate 84 by means of the floating mechanism 86 with the plate surface lying horizontally. The pickup chassis supporting substrate 83 provided on the oscillatable plate 87 depends at this time along the plumb line as shown in FIG. 18. The disc table 81 of the disc rotating driving mechanism 80 mounted on the pickup chassis supporting substrate 83 approaches the optical disc D transported within the disc reproducing unit 3. The optical disc D is loaded in position on the disc table 81.

On the disc reproducing unit mounting substrate 51 is mounted a chuck mechanism 111 for chucking the optical disc D loaded on the disc table 81 along with the disc table 81. The chuck mechanism 111 has a chuck member supporting arm 113 carrying a chuck member 115 having an end magnet. The chuck member supporting arm 113 is rotatably supported by a pivot 112 by having its proximal end disposed above the outer casing 1 pivotally mounted by a pivot 112 mounted on the disc reproducing unit mounting substrate 51. The chucking member 115 is supported by the distal end of the chucking member supporting arm 113 in opposition to the disc table 81 of the disc rotating driving mechanism 80.

The chuck member 115 is made up of a cylindrical bobbin having end flanges and a ring-shaped magnet fitted within the bobbin. The chuck member 115 is rotatably mounted on the chuck member supporting arm 113 by having the bobbin fitted in an engaging hole 114 formed at the distal end of the supporting arm 113. Besides, the chuck member 115 is safeguarded against extrication by a flange, not shown, on both ends of the bobbin.

The chuck member supporting arm 113 has an elliptically-shaped engagement opening 114 having an opening width continuously decreasing towards the distal end of the chuck member supporting arm 113. The engagement opening 114 towards the distal end of the chuck member support arm 113 has a thickened portion 113a having a height substantially equal to the distance between the bobbin flanges, as shown in FIG. 17. The thickened portion 113a is engaged in a space between the flanges when the chuck member 115 is spaced apart from the disc table 81 for suppressing free movement of the chuck member 115.

The chuck member supporting arm 113 has a guide 121 for guiding the movement of the chuck member 115 loosely fitted in the engagement opening 114 towards the center of the disc table 81 as the chuck member supporting arm 113 is rotated towards the disc table 81. The guide 121 is inclined towards the inner periphery of the engagement opening 114, as shown in FIG. 18.

The lug 99b positioned towards the chuck mechanism 111 provided on the slide 99 has a chuck mechanism rotation pin 122. thereon. The chuck member supporting arm 113 is rotationally biased by a tension spring, not shown, in a direction in which the chuck member 115 approaches the disc table 81. BV the chuck member supporting arm 113 being rotationally biased by the tension spring, the guide 121 is made to bear perpetually against the chuck mechanism rotation pin 122 provided on the slider 99.

Consequently, when the slide 99 is positioned at the lower dead point, the chuck mechanism rotation pin 122 thrusts the guide 121 of the chuck member supporting arm 113 in a direction away from the disc table 81 against the bias of a tension spring, not shown. Thus the chuck member supporting arm 113 is spaced apart from the disc table 81 inclined relative to the plumb line, as shown in FIG. 17. When the slide 99 is moved towards the upper side of the outer casing 1 by the vertical movement mechanism 102, the thrust exerted by the chuck mechanism rotation pin 122 is gradually released, so that the chuck member supporting arm 113 is rotated towards the disc table 81 under the bias of a tension spring, not shown. The chuck mechanism rotation pin 122 is moved towards the upper side of the outer casing as it is contacted with the guide 121.

The distal end of the chuck member supporting arm 113 carries a retainer 123. The disc reproducing unit mounting substrate 51 has a stop, not shown, facing the retainer 123. As the slide 99 is moved towards the upper side of the outer casing 1, the thrust of the chuck mechanism rotation pin 122 on the guide 121 is gradually released, so that, when the chuck member supporting arm 113 approaches the disc table 81 under the force of the tension spring, the retainer 123 is abutted against the stop, thus controlling the rotationally biased position of the chuck member supporting arm 113 by the tension spring.

When the chuck member supporting arm 113 is rotated towards the disc table 81, the optical disc D, transported within the disc reproducing unit 3, is loaded in position on the disc table 81, by having its center opening engaged by a centering member provided on the disc table 81. That is, the optical disc D, loaded on the disc table 81, is thrust and supported by the chuck member 115 attracted by the magnet so that the disc D is enabled to be rotated in unison with the disc table 81.

The lock lever 94 continues to be rotated with the upward movement of the slide towards the upper side of the outer casing During such rotation, the disc driving unit supporting substrate 84 is abutted at its distal end against a retention pin 124 provided on the disc reproducing unit mounting substrate 51, as shown in FIG. 18. Thus the disc driving unit supporting substrate 84 is maintained with its plate surface lying horizontally. At this time, the oscillatable plate 87 is lifted under the force of the coil spring 89 of the floating unit 86. That is, the disc reproducing unit 3 is raised towards the upper side of the outer casing 1, under the bias of the coil spring 89 of the floating unit 86, as the optical disc D is chucked with the major disc surface lying vertically parallel to the pivot 4 of the disc housing unit 2. The pickup chassis supporting substrate 83, carrying the disc rotating driving mechanism 80 and the optical pickup unit 82, is resiliently floatingly supported by the disc driving unit supporting substrate 84.

On the proximal side of the chuck member supporting arm 113, there is mounted a lever 113b extending horizontally towards the center of the rotary table 1, as shown in FIG. 16. The lever 113b has its distal end pivotally mounted by a pivot 204 set on the disc reproducing unit mounting substrate 51 so as to be rotated about the pivot 204 as the center of rotation. The lever 113 has at its mid portion an elongated opening 125 having its long axis extending in the longitudinal direction. The elongated opening 125 is engaged by an engagement pin 126 provided on an upper portion of the disc guide member 49 for being protruded towards the chuck member supporting arm 113. Consequently, as the chuck member supporting arm 113 reaches the state of depending vertically downward as a result of the upward travel of the slide 99 towards the upper side of the outer casing 1, the disc feed guide member 49 is rotated about the pivot 52 as the enter of rotation so that the disc feed guide 49a is spaced apart from the outer periphery of the optical disc D.

That is, with the travel of the slide 99 towards the upper side of the outer casing 1, the chuck member 115 and the optical disc D are moved towards the upper side of the outer casing 1. During such process, the disc feed guide member 49 clears towards the upper side of the outer casing 1, as it maintains a predetermined distance from the optical disc D being raised in its position. Thus the optical disc D may be prevented from being collided against the disc feed guide member 49.

As the slide 99 is further moved to above the outer casing 1, the lock lever 94 is separated from the oscillatable plate 87. This completely releases the regulation of the resilient force exerted by the lock lever 94 on the floating unit 86, so that the optical disc D is chucked by the disc table 81 of the disc rotation mechanism 80 and enabled to be rotated in unison with the disc table 81 to complete disc loading on the disc reproducing unit 43.

As the disc rotation mechanism 80 of the disc reproducing unit 3 is driven for running the optical disc D in rotation, the optical pickup unit 82 is fed along the radius of the disc D for reproducing information signals, such as music signals, recorded on the optical disc D.

Since the lock mechanism 93 is provided in the present embodiment for selectively controlling the resilient force of the floating unit 86, the following advantages may be produced.

The floating unit 86 includes a structure of interrupting the route of vibrations with an elastic member, such as rubber, or a spring, such as a coil spring, for preventing wasteful vibrations from outside the apparatus from being transmitted to the optical pickup unit 82 for reading information signals recorded on the optical disc D in a contact-free manner with respect to the disc rotation mechanism 81 rotationally driving the optical disc D.

On the other hand, with the disc reproducing unit 3 supported by the floating unit 86, there is a risk of the disc rotation mechanism 80 being changed in its position relative to the optical disc D being transported. Thus there may be occasions wherein the optical disc D transported within the disc reproducing unit 3 is unable to be loaded in position on the disc table 81 of the disc rotation mechanism 80. That is, there is a risk that it becomes impossible to perform a centering operation of engaging the center opening of the optical disc D by the centering member provided on the disc table 80.

However, with the disc reproducing apparatus according to the present invention, the resilient deviation of the floating unit 86 is immobilized by the floating unit 86 until such tine as the optical disc D is taken out of the disc housing unit 2 and transported to the disc loading position on the disc reproducing unit 3 so as to be loaded on the disc table 81. Thus the center opening of the optical disc D may be correctly coincided with the centering member of the disc table 81 for assuring positive loading of the optical disc D on the disc table 81.

For returning the optical disc D loaded on the disc reproducing unit 3 back into the disc housing unit 2, the vertical movement mechanism 102 is actuated for moving the slide 99 towards the lower side of the outer casing 1. Such movement of the slide 99 causes the chuck supporting arm 113 to be rotated under the bias of the tension spring and separates the chuck member 115 from the optical disc D on the disc table 81 for releasing the chuck of the optical disc D relative to the disc table 81. The optical disc D, thus released from chucking, is now supported on the end rolls 65, 68 on the first and second arms 54, 55 of the disc transporting mechanism 42. The driving motor 61 of the disc transporting mechanism 42 is rotated in reverse for rotating the disc 60 counterclockwise in FIG. 15. This causes the optical disc to be returned into the disc housing unit 2, with the disc having two points on its outer peripheral surface being supported by the end rolls 65, 68 of the first and second arms 54, 55. Thus the optical disc D is inserted into the disc inserting slit 6 in the rotary table 5.

The rotary table 5 has its rotation controlled by the housing unit rotation control mechanism 73 until the selected optical disc D is taken out by the disc transporting mechanism 42 and loaded for playback so as to be again returned into the disc housing unit 2. Thus the optical disc D, which is returned into the disc housing unit 2 after completion of replay, is accurately returned into the disc inserting slit 6 allocated thereto.

The housing unit rotational position detection mechanism 44, for detecting whether the sole optical disc D selected from a large number of the optical discs D contained in the disc housing unit 2 is in a state of having been moved by the disc transporting mechanism 42 to a position ready to be taken out c the disc housing unit 2, is hereinafter explained.

The housing unit rotational position detection mechanism 44 is made up of a rotation detection member 131 mounted on the lower outer periphery of the tubular disc support 7 provided on the lower side of the rotary table 5 and a photodetector 132 arranged at a takeout enabling position by the disc transporting mechanism 42, as shown in FIG. 3.

The rotation detection member 131 is made up of a first annular detection plate 133a and a second annular detection plate 133b provided at different diameter positions of the disc support member 7. The first detection member 133a is larger in diameter than the second detection member 133b and has a series of protrusions and recesses formed circumferentially at a predetermined pitch on its lower end face. That is, in the present embodiment, the protrusions and recesses are formed at a pitch equal to that of the 100 disc inserting slits 6 formed in the rotary table 1. Consequently, 100 of the protrusions 134 are formed in the present embodiment.

The second detection plate 133b is positioned inwardly of the first detection plate 133a, and has a series of protrusions and recesses arranged at a different pitch along its circumference on its lower end face. In the present embodiment, the disc inserting slit 6 corresponding to a point shown by arrow O in FIG. 4, that is, a home position, is defined as the first disc inserting slit, with the disc number of the optical disc D inserted into the disc inserting slit 6 being defined as "1" The disc number is incremented in the plus direction in the direction indicate by arrow F, with the disc number immediatly ahead of the disc number "1" being "100".

The second detection plate 133b has no protrusion at a position registering with the disc number "1", and has a protrusion having a position registering with the disc number "11" and a position registering with the disc number "12" as its one end face and its other end face, respectively. Thus the protrusion has a width corresponding to one pitch in the arraying pitch of the disc inserting slits 6. The second detection plate 133b has a protrusion having a position registering with the disc number "21" and a position registering with the disc number "23" as its one end face and its other end face, respectively. Thus the protrusion has a width corresponding to two pitches in the array pitch of the disc inserting slits 6. The second detection plate also has a protrusion having a position registering with the disc number "31" and a position registering with the disc number "34" as its one end face and its other end face, respectively. The protrusion has a width corresponding to three pitches in the array pitch of the disc inserting slits 6. Thus the second detection plate 133b has protrusions the widths of which are set so as to be longer than the arraying pitch of the disc inserting slits 6 at an interval of 10 disc numbers. In general, the protrusions of the second detection plate have positions corresponding to the disc numbers "10n−1" (n=1, 2, 3, 9) and positions corresponding to the disc numbers "11n+1" as one end faces and the other end faces, respectively, that is, the protrusions have the widths equal to the pitch of n in the arraying pitch of the disc inserting sit The photodetector 132 has three photosensors each of which is made up of a light emitting element and a light receiving element. The first and second photosensors, arranged at a predetermined interval, are associated with the first detection plate 133a, and the third photosensor is provided for the second detection plate 133b. These first to third photosensors are designed to emit high-level detection signals, for example, or detection of the protrusions of the associated detection plates 133a and 133b.

Figure 19:
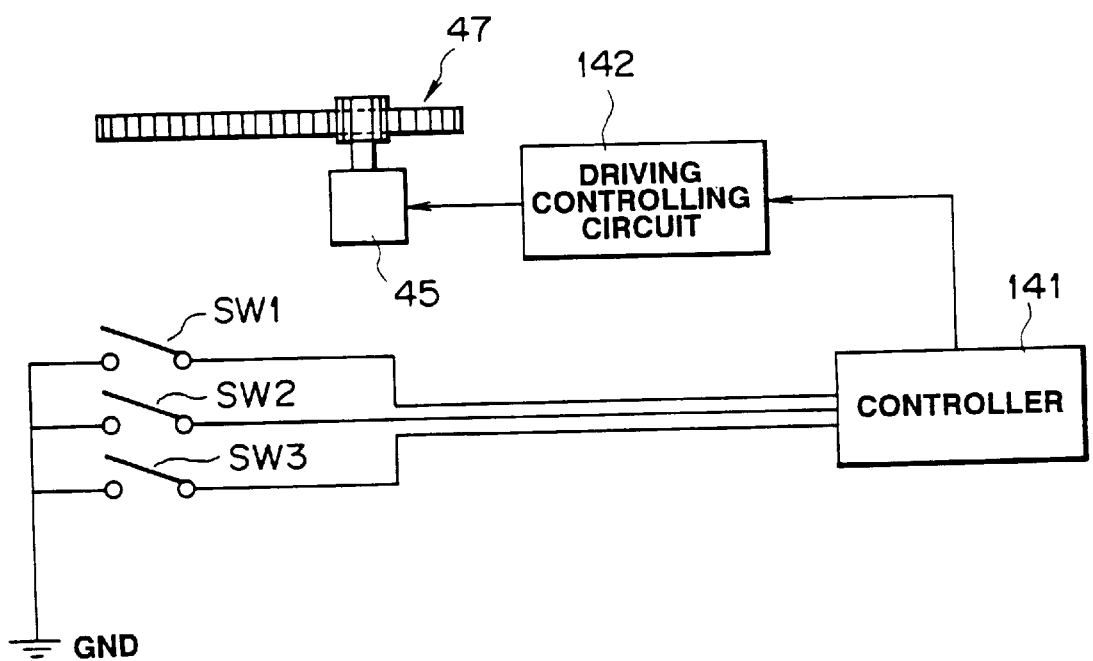
FIG. 19 is a block diagram showing a signal transmission system of a rotating position detecting mechanism of the disc reproducing apparatus according to the present invention.

These photosensors constitute first, second and third detection switches SW1, SW2 and SW3 inserted between the ground GND and a controller 141 which performs various arithmetic-logical operations and control operations based upon various signals, as shown in FIG. 19. These detection switches SW1 to SW3 are turned on each time the protrusion is detected, and the controller 141 is fed with detection signals in the form of current changes derived from the turning on of the switches SW1 to SW3.

The controller 141 supplies driving signals and deceleration demand signals to a driving control circuit 142 based upon the demand for rotation of the rotary table 51. The demand for rotation of the rotary table 51 is a command for moving the disc inserting slit 6 having the selected disc number to a position registering with the disc transporting mechanism 42. If the rotary table 5 is to be rotated a certain angle of rotation, for example, 40 pitches, in terms of the arraying pitch of the disc inserting slits 6, the driving signal supplied to the driving control circuit 142 is such a pulse signal which rises based upon the demand for rotation and which decays when 40 pulses have been counted based upon the detection signals from the photosensors. On the other hand, the deceleration signal is such a pulse signal which rises at a time point when there are 40 remaining pitches and which decays when 40 pitches have been counted as in the case of the above-mentioned driving signals.

During the time only the driving signals are supplied to the driving control circuit, the driving control circuit 142 transmits the driving current of a predetermined level to the driving motor 45 of the housing unit rotating driving mechanism 41. When the deceleration demand signal is fed, the driving current supplied to the driving motor 45 is continuously decreased in level. The circuit arrangement is so made that the driving current is lowered to a zero level when the 40 pitches have been counted. If the rotational angle is less than 10 pitches, the driving signal and the deceleration demand signal rise simultaneously.

Figure 20:
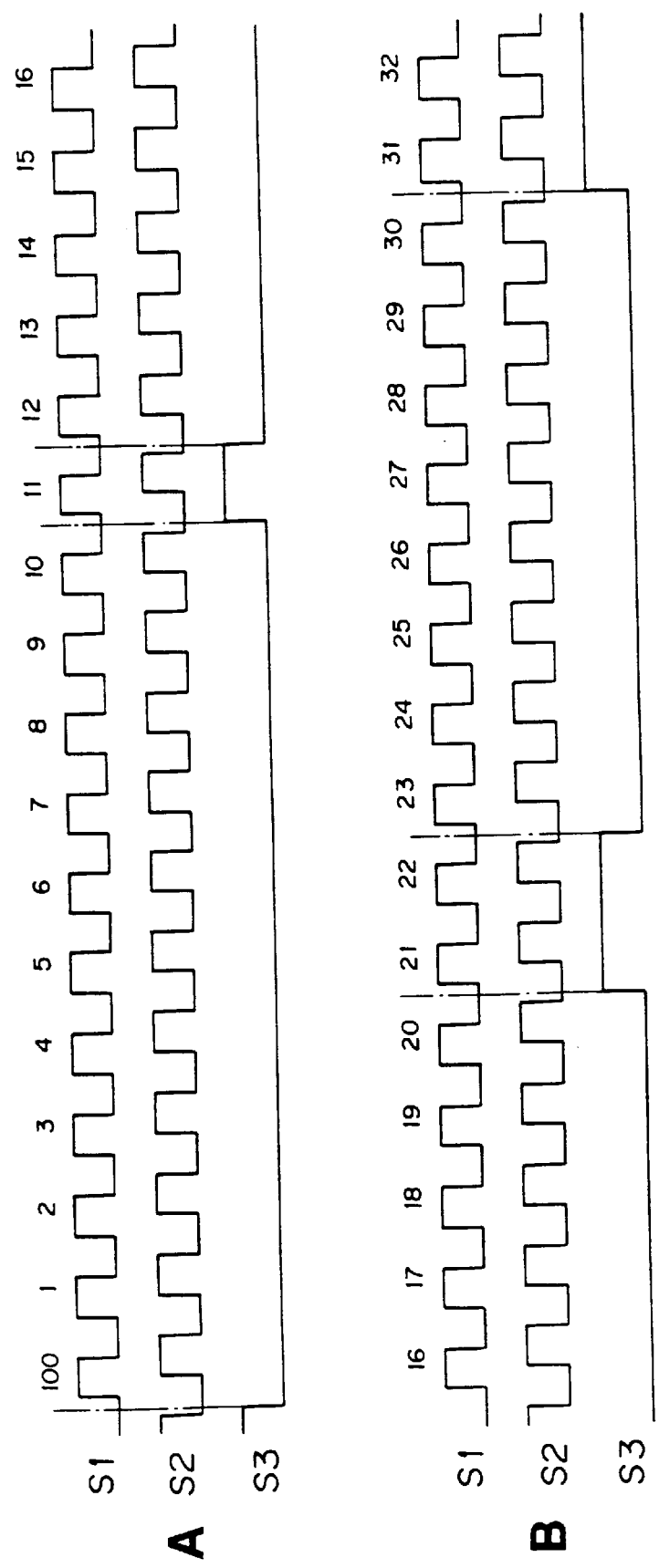
FIG. 20 is a signal waveform diagram showing detection signals output from the optical sensors in the rotary position detection mechanism of the disc reproducing apparatus according to the present invention, and shows in particular the signal waveform of detection signals for disc numbers "1" to "32".
Figure 21:
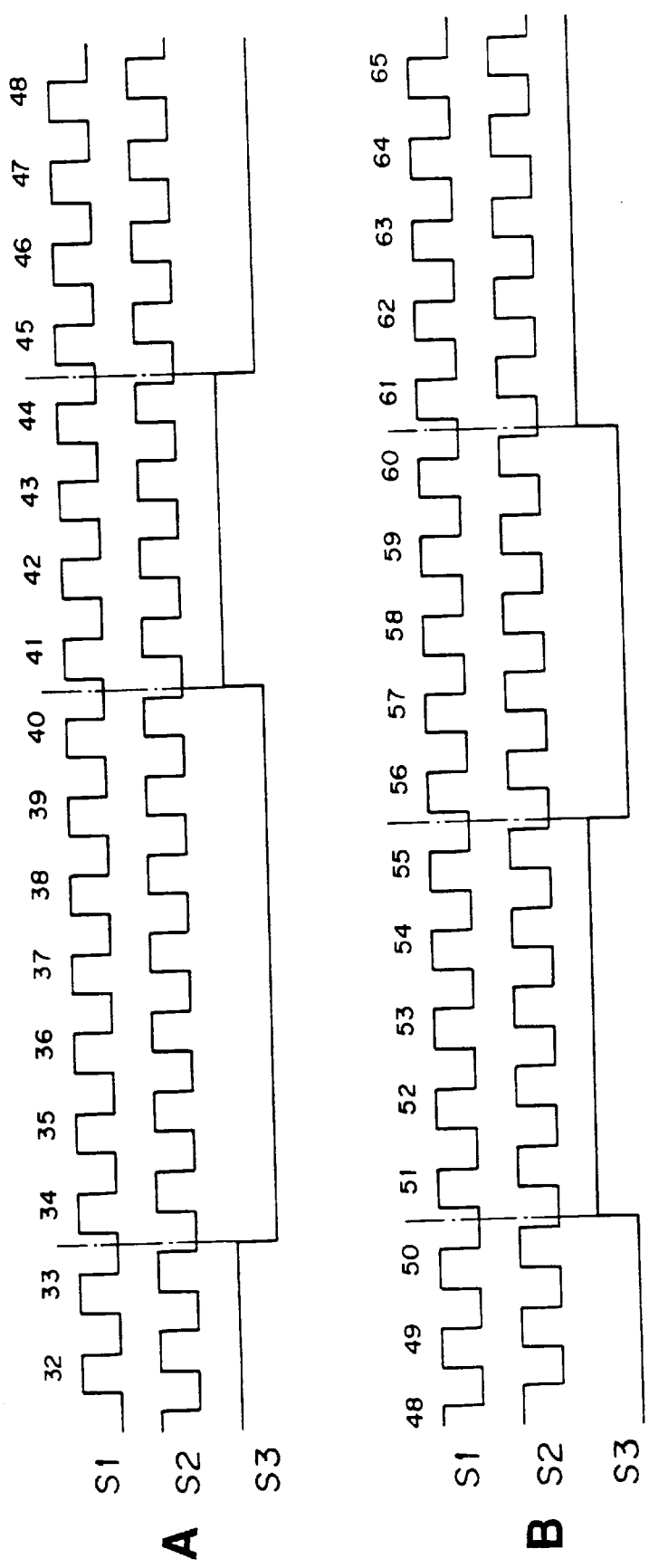
FIG. 21 is a signal waveform diagram showing detection signals output from the optical sensors in the rotary position detection mechanism of the disc reproducing apparatus according to the present invention, and shows in particular the signal waveform of detection signals for disc numbers "32" to "65".
Figure 22:
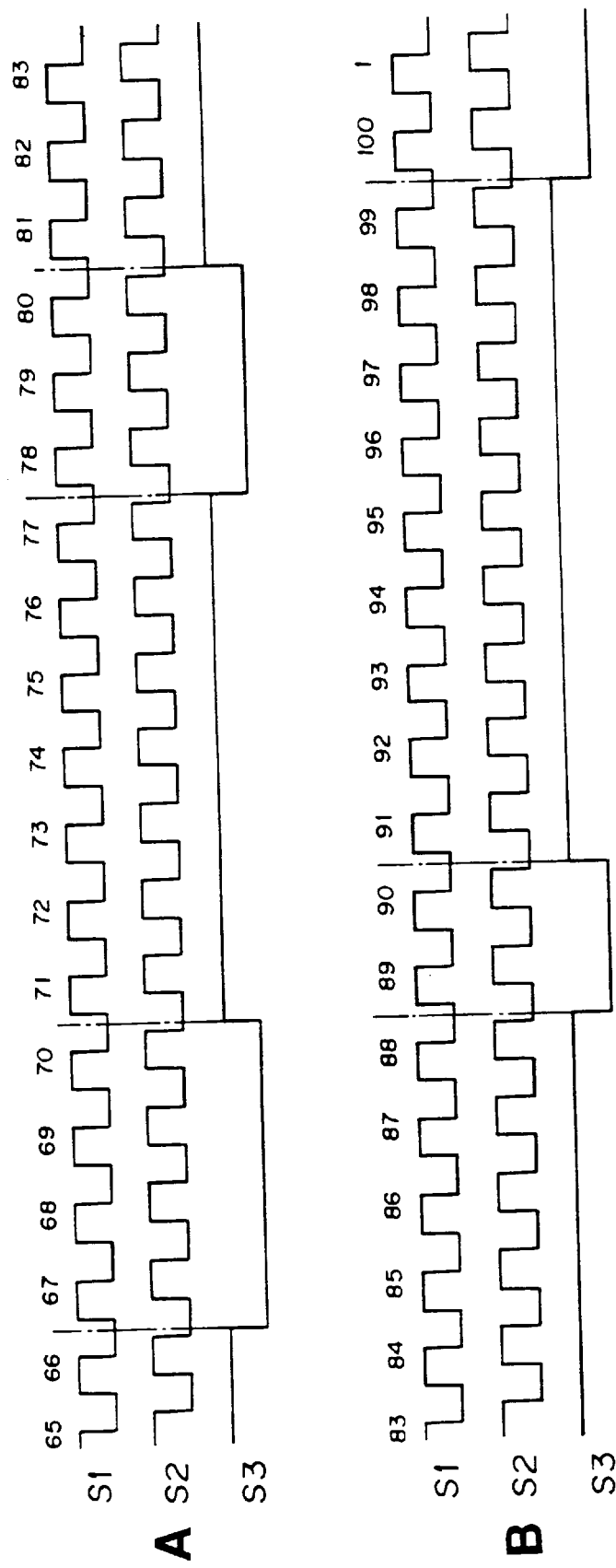
FIG. 22 is a signal waveform diagram showing detection signals output from the optical sensors in the rotary position detection mechanism of the disc reproducing apparatus according to the present invention, and shows in particular the signal waveform of detection signals for disc numbers "66" to "100".

An example of stop control for the rotary table 5 based upon the detection signals from the first to third photosensors is explained by referring to the signal waveform diagrams of FIGS. 20 to 22.

If the rotary table 5 is rotated in a direction shown by arrow F in FIG. 4, by the rotational driving of the driving gear 47 by the driving motor 45 of the housing unit rotating driving mechanism 41, detection signal waveforms shown in FIGS. 20 to 22 are output from the respective photosensors. The waveform of the detection signal S1 from the first photosensor has a phase. difference from that of the detection signal S2 from the second photosensor equal to the distance between the respective photosensors.

In the present embodiment, the time periods during which both the detection signals S1 and S2 are at high levels indicate the stop position for the optical disc D. For example, if it is desired to stop the optical disc D having the disc number "7" at the takeout enabling position by the disc transporting mechanism 42, the rotary table 5 is halted on detention of the seventh protrusion by both of the first and second photosensors. Consequently, with the present example, the spacing width between the sensors is set so that the detection signals S1 and S2 from the first and second photosensors, such as their high-level periods, are partially overlapped with each other.

If, during the period when the detection signal S3 from the third photosensor is at high level, the number of the pulse signal formed by ANDing the detection signals S1 and S2 from the first and second photosensors is one, the optical disc D corresponding to the disc number "12" is positioned at the loading position A at a time point when the decay of the detection signal S3 is detected. Similarly, if, during the high-level period of the detection signal S3, the number of the pulse signal generated by ANDing the detection signals S1 and S2 from the first and second photosensors is two, the optical disc having the disc number "23" is positioned at a takeout enabling position by the disc transporting mechanism 42 at a time point when the decay of the detection signal S3 is detected.

Thus, if the rotary table 5 is rotated in the direction indicated by arrow F in FIG. 4, and the number of the pulse signals formed by ANDing the detection signals S1 and S2 from the first and second photosensors during the high-level period of the detection signal S3 is m (m=1, 2, 3, 9), the optical disc D having the disc number "11m+1" is present at the takeout enabling position by the disc transporting mechanism 42 at a time point when the decay of the detection signal S3 is detected.

On the other hand, if the rotary table 5 is rotated in the direction indicated by arrow F in FIG. 4, and the number of the pulse signals formed by ANDing the detection signals S1 and S2 from the first and second photosensors during the low-level period of the detection signal S3 is 9, the optical disc D having the disc number "21" is present at the takeout enabling position by the disc transporting mechanism 42 at a time point when the decay of the detection signal S3 is detected. Additionally, if the number of the pulse signals formed by ANDing the detection signals S1 and S2 from the first and second photosensors during the low-level period of the detection signal S3 is 8, the optical disc D having the disc number "31" is present at the takeout enabling position by the disc transporting mechanism 42 at a time point when the decay of the detection signal S1 is detected.

Thus, if the rotary table 5 is rotated in the direction indicated by arrow F in FIG. 4, and the number of the pulse signals formed by ANDing the detection signals S1 and S2 from the first and second photosensors during the low-level period of the detection signal S3 is m (m=9, 8, 7, 2), the optical disc D having the disc number "10(11−m)−1" is present at the takeout enabling position O at a time point the rise of the detection signal S3 is detected.

It is noted that, during the exceptional period when the detection signal S3 is at a low level, it cannot be that the number of pulse signals formed by ANDing the detection signals S1 and S2 from the first and second photosensors is equal to 10. However, it may occur that the number of such pulse signals is equal to 11, in which case the optical disc D having the disc number "11" is present at the takeout enabling position O at the time point of detection of rise of the detection signal S3.

Conversely, if the rotary table 5 is rotated in the direction indicated by arrow F in FIG. 4, and the number of the pulse signals formed by ANDing the detection signals S1 and S2 from the first and second photosensors during the high-level period of the detection signal S3 is 9, the optical disc D having the disc number "91" is present at the takeout enabling position by the disc transporting mechanism 42 at a time point when the decay of the detection signal S3 is detected. Additionally, if the number of the pulse signals formed by ANDing the detection signals S1 and S2 from the first and second photosensors during the high-level period of the detection signal S3 is 8, the optical disc D having the disc number "81" is present at the takeout enabling position by the disc transporting mechanism 42 at a time point when the decay of the detection signal S3 is detected.

Thus, if the rotary table 5 Is rotated in the direction indicated by arrow F in FIG. 4, and the number of the pulse signals formed by ANDing the detection signals S1 and S2 from the first and second photosensors during the high-level period of the detection signal S3 is m (m=9, 8, 7, 1), the optical disc having the disc number "10m−1" is present at the takeout enabling position at a time point when the decay of the detection signal S3 is detected.

On the other hand, if the rotary table 5 is rotated in the direction indicated by arrow F in FIG. 4, and the number of the pulse signals formed by ANDing the detection signals S1 and S2 from the first and second photosensors during the low-level period of the detection signal S3 is 2, the optical disc D having the disc number "89" is present at the takeout enabling position 0 by the disc transporting mechanism 42 at a time point when the decay of the detection signal S3 is detected. Additionally, if the number of the pulse signals formed by ANDing the detection signals S1 and S2 from the first and second photosensors during the low-level period of the detection signal S3 is 3, the optical disc D having the disc number "78" is present at the takeout enabling position O by the disc transporting mechanism 42 at a time point when the decay of the detection signal S3 is detected.

Thus, if the rotary table 5 is rotated in the direction indicated by arrow F in FIG. 4, and the number of the pulse signals formed by ANDing the detection signals S1 and S2 from the first and second photosensors during the low-level period of the detection signal S3 is m (m=2, 3, 4, 9), the optical disc D having the disc number "10(11−m)+1−m" is present at the takeout enabling position O at a time point when the rise of the detection signal S3 is detected.

It is noted that, during the exceptional period when the detection signal S3 is at a low level, it cannot be that the number of pulse signals formed by ANDing the detection signals S1 and S2 from the first and second photosensors is equal to 10. However, it may occur that the number of such pulse signals is equal to 11, in which case the optical disc D having the disc number "11" is present at the takeout enabling position O at the time point of when detection of rise of the detection signal S3.

It is seen from above that the detection signal S3 from the third photosensor is a signal indicating the range of the protrusions and recesses having the different pitches in the second detection plate 133b, referred to hereinafter as the range signal. At a time point when the rise and decay of the range signal is detected, the optical disc D having the particular disc number has been rotated to the takeout enabling position by the disc transporting mechanism 42.

It is now assumed that the rotary table 5 is halted when the optical disc D having the particular disc number has been moved to the takeout enabling position 0. If such halt position is shown conceptually as being an address employed in a memory, the halt position at the time point of detection of the rise and decay of the range signal (detection signal) may be conceived as being an absolute address of the optical disc D having the particular disc number.

On the other hand, the pulse signal formed by ANDing the detection signals S1 and S2 from the first and second photosensors indicates the relative address as contrasted with the absolute address indicated by the range signal.

Specifically, if, from the state in which the rotary table 5 is halted with the optical disc D having the disc number "7" being at the takeout enabling position, the rotary table 5 is to be halted with the optical disc D having the disc number "13" being at the takeout enabling position, that is, if the rotary table is to be moved from the absolute address "7" to the absolute address "13", the address is changed towards the right in the drawing as from the absolute address "7" in FIG. 20, for the direction of rotation indicated by arrow F in FIG. 4. If attention is directed to the waveform of the detection signal S3 from the third photosensor, the high level appears only at the absolute address "11". It may be seen that, by calculating the relative address for the period during which the detection signal S3 is at a high level, the absolute address for a time point when the detection signal S3 from the third photosensor S3 falls from the high level to the low level is "12". Thus it may be seen that the halt position corresponding to the relative address higher than "1" corresponds to the absolute address "13".

When the address is moved from the absolute address "13" to the absolute address "22", it is seen before the start of the movement that the number of the relative address for which the detection signal S3 from the third photosensor is at a low level is "2". When movement is started, the relative address is incremented one by one. When counting the sequentially updated relative addresses, since the number of the relative address at a time point when the detection signal S3 from the third photosensor is changed from the low level to the high level is "9", the absolute address at the time point of change is "21". Thus the stop position for the relative address incremented bone is the absolute address "22". The same may be said of the. rotational movement in the direction of decreasing the relative address, indicated by arrow F in FIG. 4.

Although the absolute address is not known at the time of power on, the absolute address can be known at an early time by counting the number of the addresses for the domain for which the detection signal S3 from the third photosensor is at a high level or at a low level, without it being necessary to make one complete rotation of the rotary table 5.

Thus, with the housing unit position detection mechanism 44 according to the present embodiment, if it is desired to stop the rotary table 5 with the optical disc D of the desired disc number contained in the disc housing unit 2 being at a takeout enabling position by the disc transporting mechanism 42, the optical disc D having the desired disc number can be moved to and stopped at a predetermined takeout enabling position O easily and accurately. In addition, it can be known promptly at the time of power on which disc number is at the takeout enabling position O by the disc transporting mechanism 42 without the necessity of making one complete revolution of the rotary table 5. Although one of 100 optical discs D is moved to the takeout enabling position O, the number of the optical discs D contained in the disc housing unit may be larger or smaller than 100.

A modified embodiment of the disc reproducing apparatus according to the present invention is hereinafter explained.

The disc reproducing apparatus has the concrete constitution of the disc transporting mechanism for selectively taking out one of a large number of optical discs D container in the disc housing unit and transporting it as far as the loading position on the disc reproducing unit, the floating unit and the floating lock mechanism different from that of the previous embodiment. The floating unit is used for elastically supporting the disc reproducing unit for reproducing the optical disc transported thereto by the disc transporting mechanism on an outer casing constituting the main body of the apparatus, while the floating lock mechanism is used for controlling the resilient power exerted by the floating unit for securing the disc reproducing unit within the outer casing.

The parts or components which are the same as those used in the previous embodiment are correspondingly numbered and detailed description is omitted.

Figure 23:
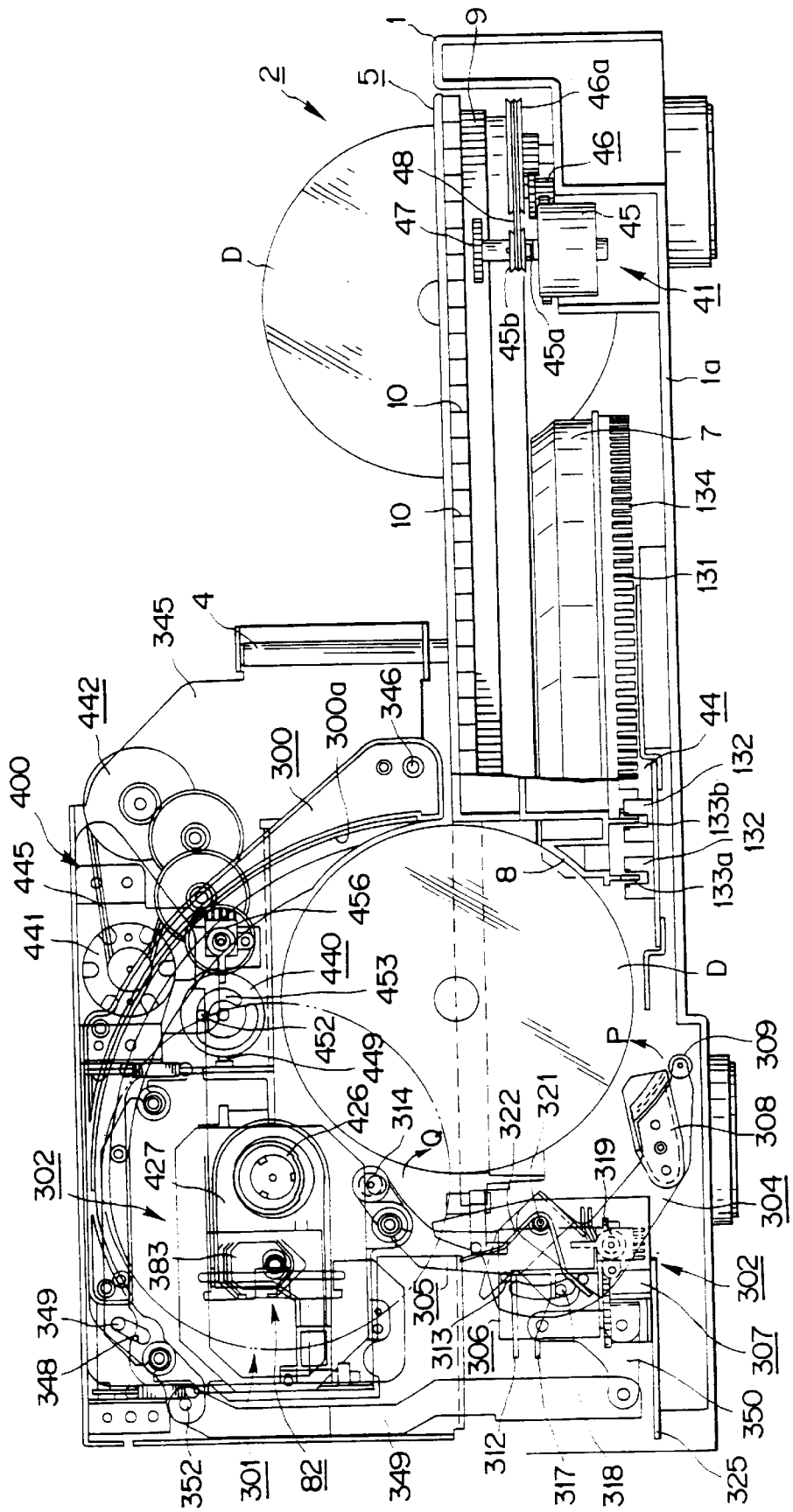
FIG. 23 is a side view showing an essential mechanism of a disc reproducing apparatus according to a modification of the present invention.
Figure 24:
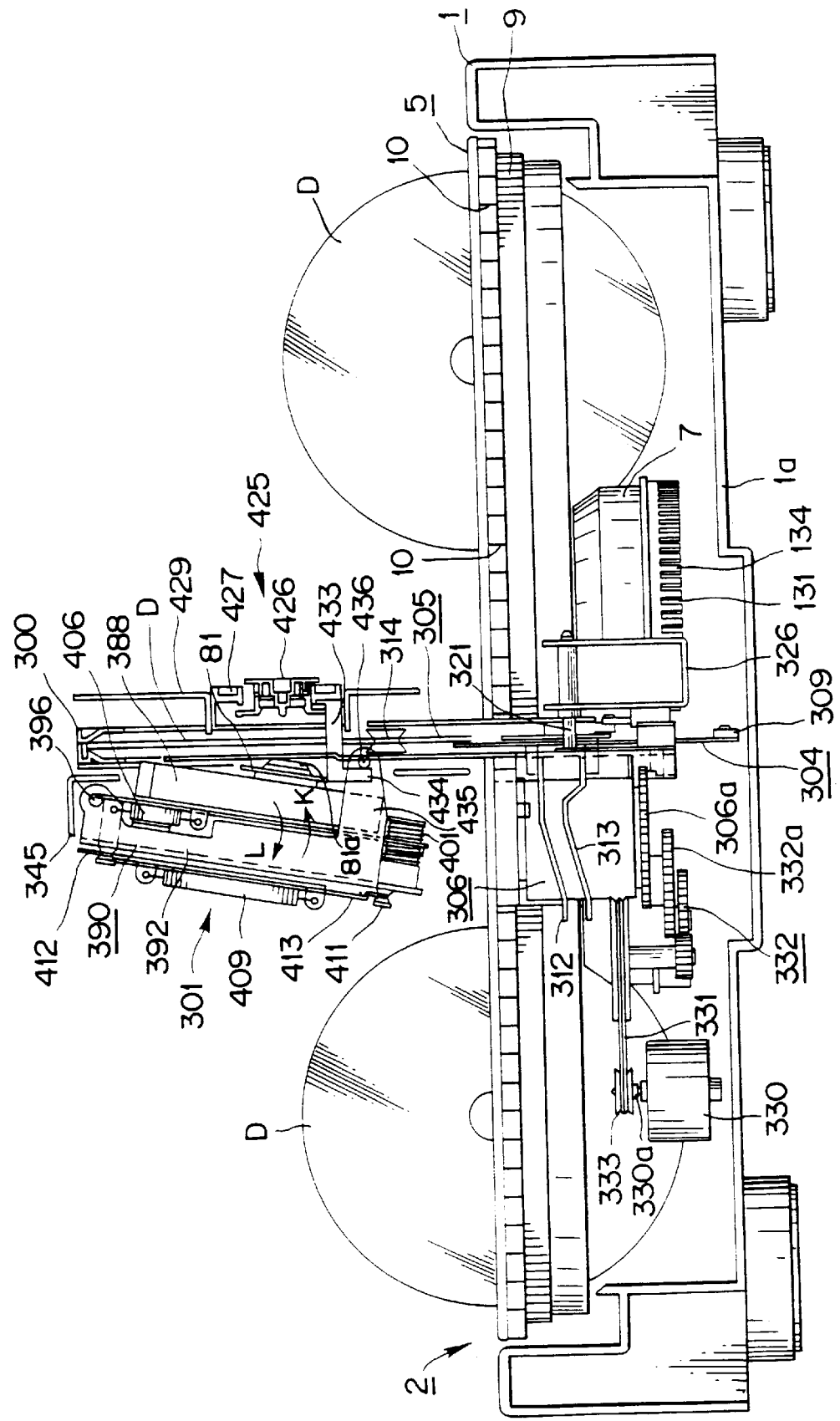
FIG. 24 is a plan view showing portions of the rotary table and the disc transporting mechanism of the disc reproducing apparatus according to the modification.
Figure 25:
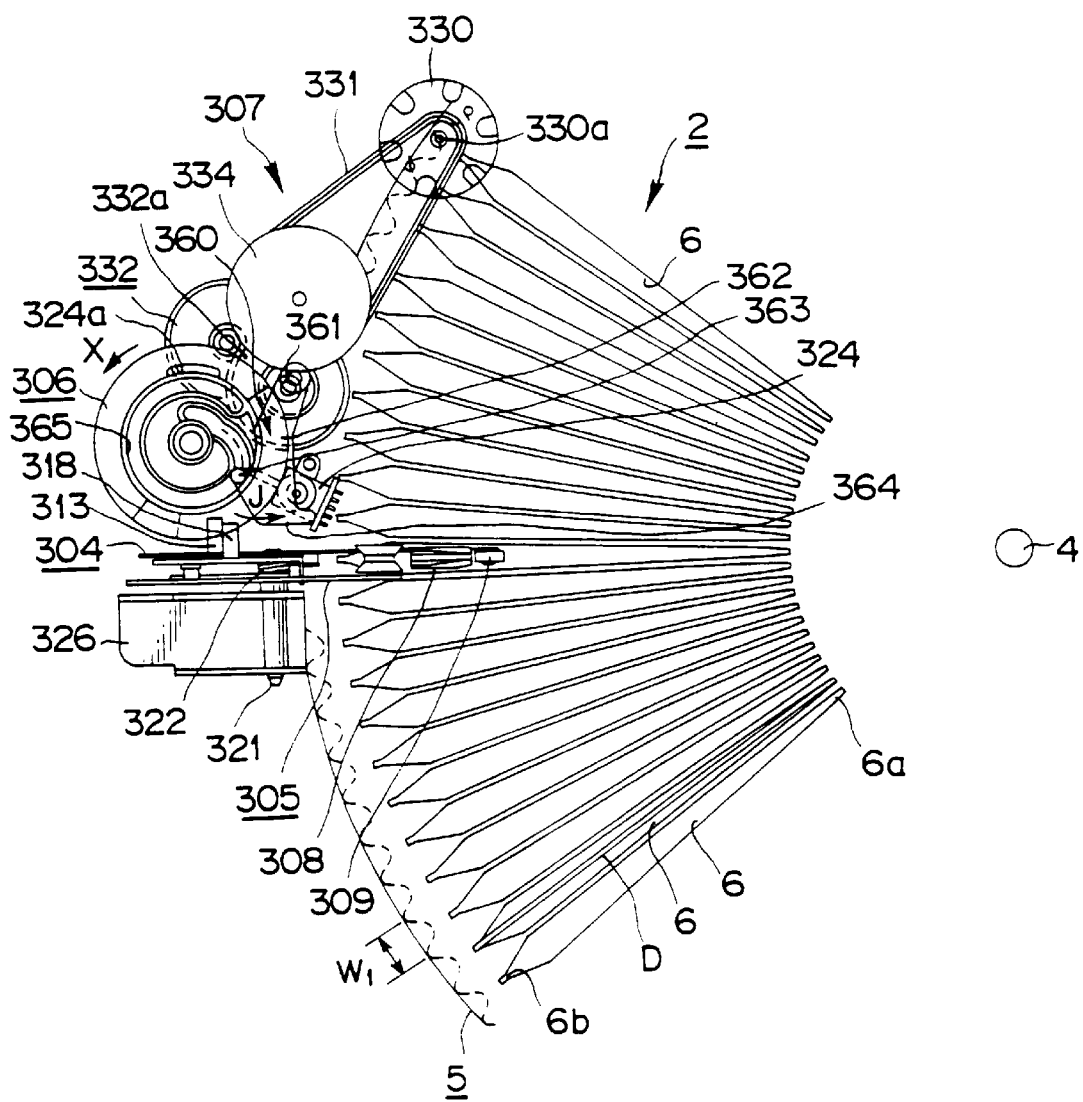
FIG. 25 is a front view showing the rotary table and the disc transporting mechanism of the disc reproducing apparatus according to the modification.

Similarly to the disc reproducing apparatus of the previous embodiment, the disc reproducing apparatus of the present embodiment has a disc housing unit 2 containing a large number of optical discs D within an outer casing 1 constituting the main body of the apparatus, as shown in FIGS. 23 to 25. As already explained in the previous embodiment, the disc housing unit 2 is rotated clockwise and counterclockwise, about the pivot 4 as the center of rotation, by means of a housing unit rotating and driving unit 41. The disc reproducing apparatus of the present embodiment also includes a disc housing unit rotational position detection mechanism 44 for detecting the rotational position of the disc housing unit 2 similar to that provided in the previous embodiment.

Figure 26:
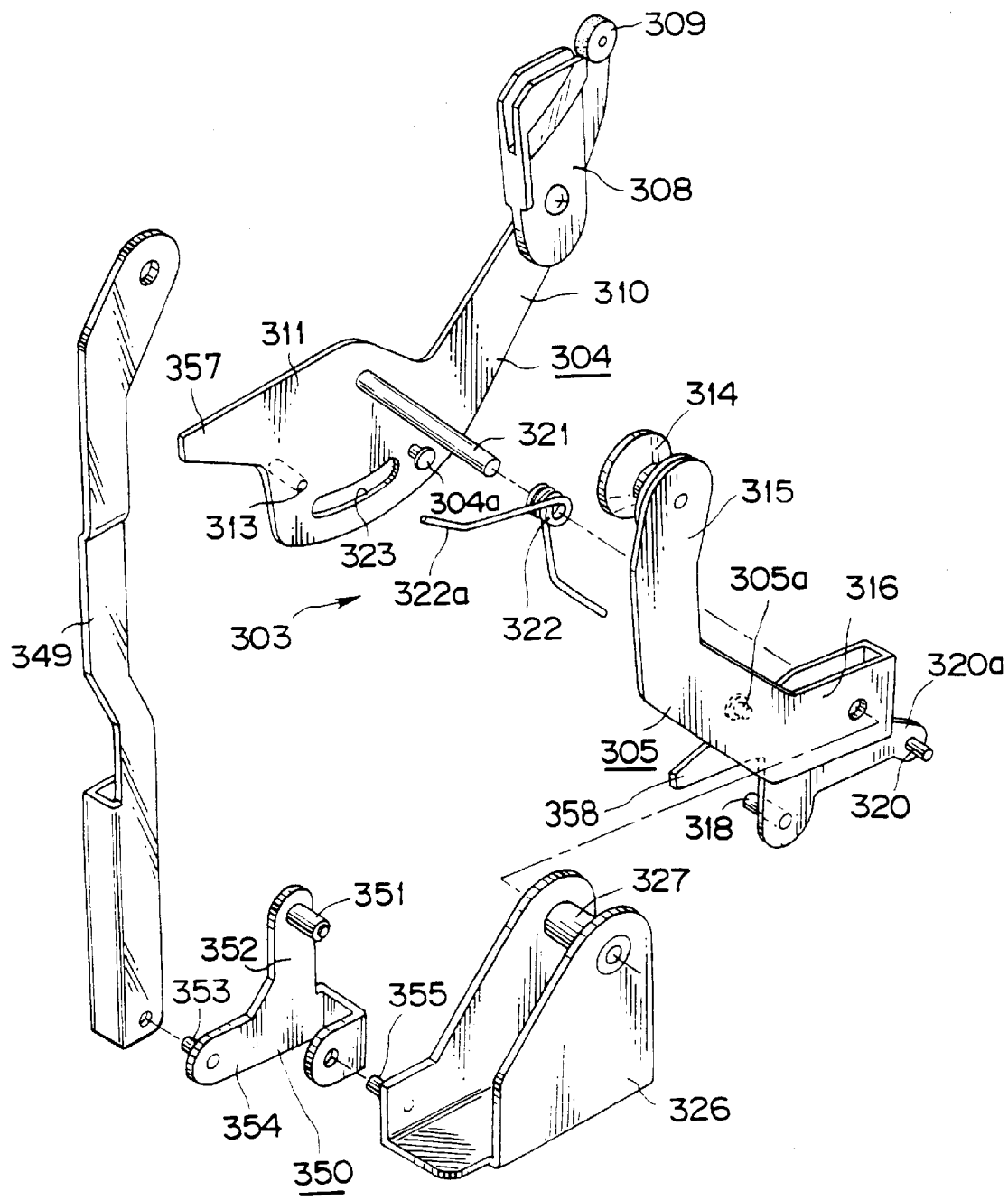
FIG. 26 is an exploded perspective view of a disc feed mechanism of a disc transporting mechanism employed in the disc reproducing apparatus shown in FIG. 23.
Figure 27:
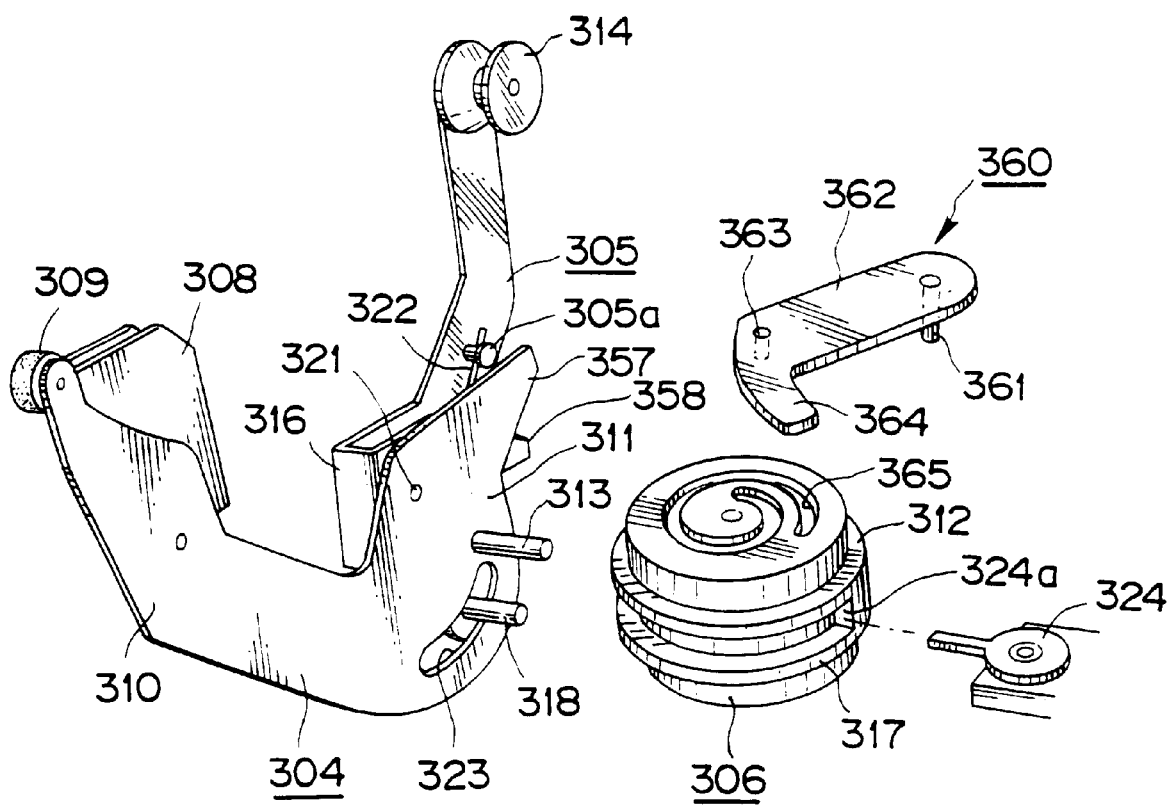
FIG. 27 is an exploded perspective view of a disc feed mechanism shown in FIG. 26 as viewed from another direction.

With the disc reproducing apparatus of the present embodiment, a disc transporting mechanism 302 for selectively taking out one of the optical discs D out of the disc housing, unit 2 for transporting the disc to and loading on a disc reproducing unit 301 includes a first arm 304 and a second arm 305 making up a disc feed unit 303, a first rotatable cam 306 for rotating the first and second arms 304, 305, and a cam rotating driving unit 307 for rotating the first rotatable cam 306, as shown in FIGS. 23, 26 and 27. The cam rotating and driving unit 307 constitutes a second driving unit of the present apparatus along with the first rotatable cam 306.

The disc transporting mechanism 302 includes a disc feed guide member 300 for guiding the optical disc D taken out of the disc housing unit 2 by the first and second arms 304, 305 constituting the disc feed unit 303.

The first arm 304 constituting the disc feed unit 303 includes a disc feed arm 310 for feeding the optical disc D taken out of the disc housing unit 2, as shown in FIGS. 26 and 27. One end of the disc feed arm 310 carries a disc support piece of synthetic resin engaged by the outer periphery of the optical disc D being fed and an end roll 309 slidingly contacted with the outer periphery of the optical disc D for assuring smooth rotation of the first arm 304. From the proximal end of the disc feed arm 310 is extended a rotating section 311 adapted for rotating the arm 310. On the rotating member 311 is set a first rotating pin 313 adapted to have a pressure contact with a first cam 312 formed on the outer periphery of the first rotatable cam 306.

The second arm 305 has a disc detection arm 315 for detecting the presence or absence of the optical disc D in the disc inserting slit 6 in the disc housing unit 2 and for supporting the outer periphery of the optical disc D being fed, as shown in FIGS. 26 and 27. The disc detection arm 315 has its one end fitted with a flanged roll 314 abutted against the outer periphery of the optical disc D. The proximal end of the disc detection arm 315 is formed with a rotating section 316 for rotating the disc detection arm 315. The rotating section 316 is formed by bending the proximal end of the disc detection are. 315 over the disc detection arm 315 in the form of a letter U. On the distal end of the rotating section 316 is set a second rotating pin 318 adapted for having pressure contact with a second cam 317 formed on the outer periphery of the second rotatable cam 306. A switch actuating pin 320 for thrusting a disc detection switch 319 provided within the outer casing 1 is set as shown in FIG. 23 on a pin setting piece 320a protruded from one side of the rotating section 316.

A pivot shaft 321 is set on a connecting portion of the rotating section 311 to the disc feed arm 310. The vicinity of the connecting portion between the rotating section 316 and the disc detection arm 315 is pivotally mounted by the pivot shaft 321. The first and second arms 304, 305 are rotatable relative to one another with the pivot shaft 321 as the center of rotation. By the first and second arms 304, 305 being rotated about the pivot shaft 321 as the center of rotation, the end roll 209 on the disc feed arm 310 and the end roll 314 on the disc feed arm 315 approach or are separated from each other.

The first and second arms 304, 305 are rotationally biased for rotation in unison about the pivot shaft 321 by a torsion coil spring 322 wound about the pivot shaft 321 in a direction shown by arrows P and Q in FIG. 23, that is, in a direction in which the end roll 309 on the disc feed arm 310 and the end roll 314 on the disc detection arm 315 approach each other. The torsion coil spring 322 has its first arm 322a and its other arm 311b retained by a spring retainer 304a protruded from the first arm 304 and by a spring retainer 305a protruded from the second arm 305 for rotationally biasing the first arm 304 and the second arm 305 in the directions shown by arrows P and Q in FIG. 23.

The second rotating pin 318 set on the second arm 305 is passed through an arcuate rotation limiting opening 323 formed in the rotating member 311 of the first arm 304 for limiting the relative rotational position of the first and second arms 304, 305 rotationally biased by the torsion coil spring 322. That is, the first and second arms 304, 305 are controlled in their relative rotational positions in an opened state such that the end rolls 309, 314 on the first and second arms 304, 305 support two points on the outer periphery of the optical disc D which are spaced apart a distance large enough to prevent descent of the optical disc D.

The first and second arms 304, 305, rotationally biased by the torsion coil spring 322 for rotation in unison, are rotatably mounted about a tubular support 327 as a center of rotation, by having the pivot shaft 321 passed through the support 327 mounted on the distal end of a U-shaped bracket 326 mounted on a chassis base plate 325 arranged within the outer casing 1. The first arm 304 at this time is extended so that the disc support 308 and the end roll 309 mounted on one end of the disc feed arm 310 face the lower outer peripheral portion of the optical disc D housed within the disc housing unit 2, as shown in FIG. 23. The second arm 305 is extended so that the end roll 314 mounted on one end of the disc detection arm 315 faces the upper outer peripheral portion of the optical disc D contained in the disc housing unit 2, as shown in FIG. 23. Thus the first and second arms 304, 305 are arranged within the outer casing 1 so that two outer peripheral points of the optical disc D perpendicularly housed within the disc housing unit 2 will be sandwiched between and supported by the end rolls 309, 314.

The first and second arms 304, 305 have their first and second rotating pins 313, 318 kept in pressure contact with the first and second cams 312, 317 provided on the circumference of the first rotatable cam 306 rotatably mounted on the chassis base plate 325, as shown in FIG. 23. That is, the first and second cams 312, 317 are clamped between the first and second rotating pins 312, 317. The first and second arms 304, 305 are rotated about the pivot shaft 321 as the center of rotation by the first rotatable cam 306 being rotated by the cam rotating and driving unit 307.

The cam rotating and driving unit 307 for rotating the first rotatable cam 306 is made up of a driving motor 330 rotatable in both the forward and reverse directions and a speed-reducing gearing 332 which is made up of a plurality of gears and to which the rotational driving force of the driving motor 330 is transmitted by means of a transmission belt 331, as shown in FIGS. 24 and 25. The transmission belt 331 is placed between a pulley 333 mounted on an output shaft 330a of the driving motor 330 and a pulley gear 334 disposed at the initial stage of the speed-reducing gear 332 for transmitting the driving power of the driving motor 330 to the speed-reducing gearing 332. The speed-reducing gearing 332 is connected to the first rotatable cam 306 by engaging a gear 332a at the last stage with a follower gear 306a at the lower end of the first rotatable cam 306.

The first and second cams 32, 317 provided on the first rotatable cam 306 control the rotation of the first and second arms 304, 305, respectively, by the rotation of the first rotatable cam 306, while causing the first and second arms 304, 305 to be rotated in unison after taking the optical disc D out of the disc housing unit 2 for feeding the optical disc D.

The concrete constitution of the first and second cams 312, 313, provided on the first rotatable cam 306 is hereinafter explained by referring to FIG. 28 which is a developed plan view of these cams 312, 317.

Figure 28:
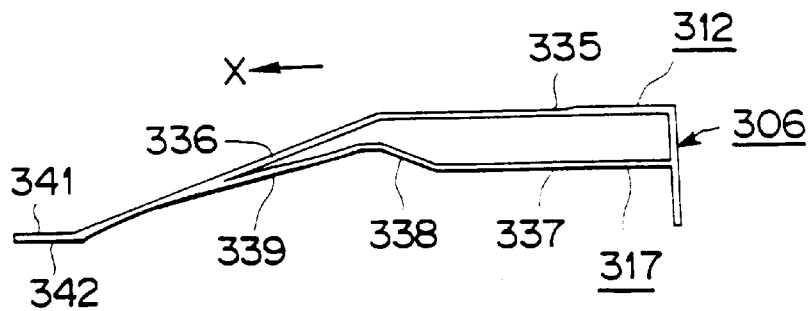
FIG. 28 is a developed view showing first and second cam sections of a second rotary cam member.

The first cam 312, rotationally controlling the first arm 304 with the rotation of the first rotatable cam 306, has a first horizontal cam section 335 which, within the range of initial rotation of the first rotatable cam 306 in the forward direction indicated by arrow X in FIGS. 25 and 28, maintains the first arm 304 in a state of having been rotated in the direction opposite to that shown by arrow P in FIG. 23, about the pivot 321 as the center of rotation, against the bias of the torsion coil spring 322, to a position in which the disc supports 308 and the end roll 309 mounted on the first arm 304 are spaced apart downwardly from the outer periphery of the optical disc D contained in the disc housing unit 2. That is, by maintaining the abutting height position of the first rotating pin 313 relative to the first cam 312, the first horizontal cam section 335 holds the first arm 304 at a predetermined position in which the first arm 304 has been rotated against the bias of the torsion coil spring 322.

The first cam 312 is formed with an inclined cam section 336 which is inclined downward towards a lower part of the first rotatable cam 306 in continuation to the first cam section 335. The inclined cam section 336 is operative with rotation of the first rotatable cam 306 to rotate the first arm 304 in a direction indicated by arrow P in FIG. 23 about the pivot 321 as the center of rotation. As the first arm 304 is rotated in a direction indicated by arrow P in FIG. 23, with forward rotation of the first rotatable cam 306 in a forward direction indicated by arrow X in FIGS. 25 and 28, the disc support 308 and the roll 309 at the one end of the first arm are caused to bear against the outer periphery of the optical disc D housed within the disc housing unit 2 in order to take out the optical disc D upwards out of the housing unit 2 and in order to feed the optical disc thus taken out to the disc loading position on the disc reproducing unit 301.

The second cam 317, controlling the rotation of the second arm 305 with rotation of the first rotatable cam 306, has a first horizontal cam section 337 adapted for maintaining the state of the first arm 305 in which, at the initial rotational position of the first rotatable cam 306, the second arm 305 has been rotated by the end roll 309 in the direction opposite to that indicated by arrow Q in FIG. 23 about the pivot 321 as the center of rotation against the force of the torsion coil spring 322 to a position spaced apart above the outer periphery of the optical disc D housed within the disc housing unit 2. That is, by maintaining the abutting height position of the second rotating pin 318 provided on the second arm 305 relative to the second cam 317, the first horizontal cam section 337 holds the second arm. 305 at a predetermine position in which the second arm has been rotated against the bias of the torsion coil spring 322.

Figure 29:
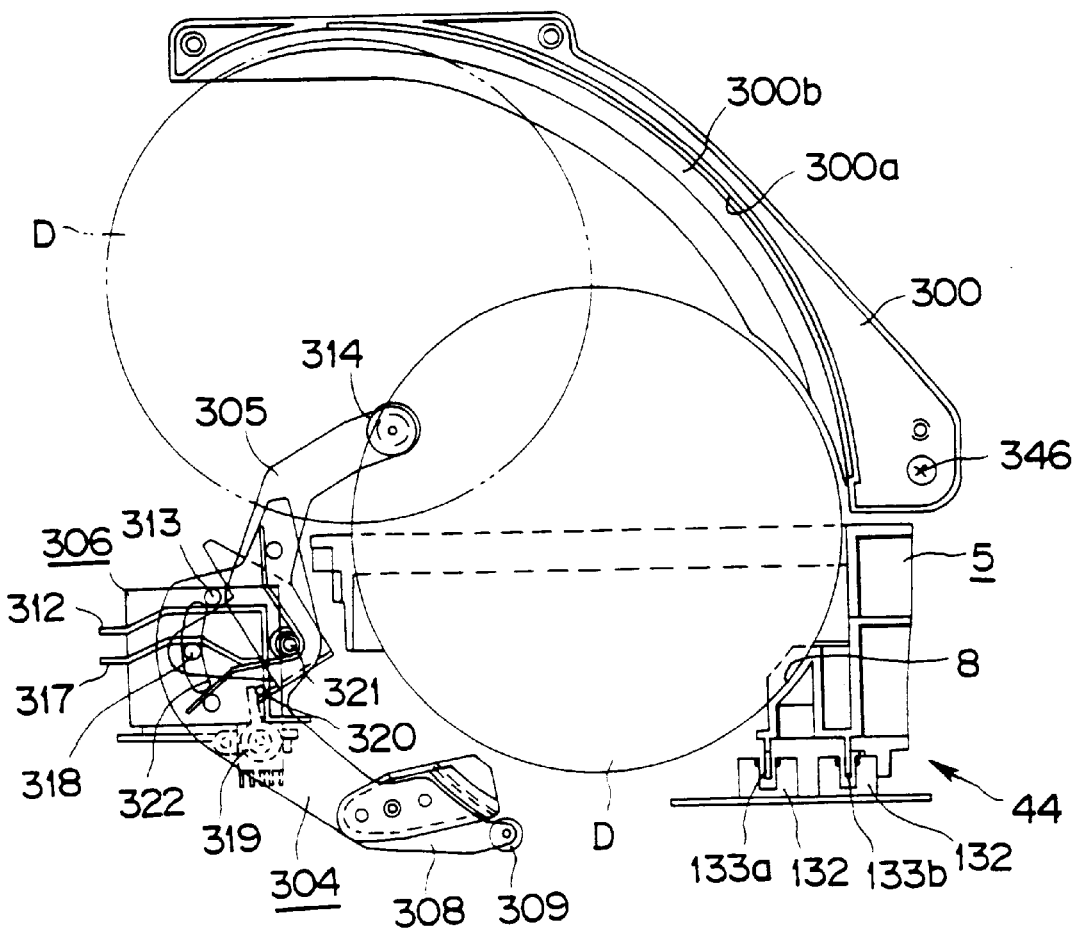
FIG. 29 shows the operation of modification of the disc transporting mechanism of the disc reproducing apparatus according to the present invention, and shows the operating process for the initial stage.

The second cam 317 is formed with a first inclined cam section 338 which is inclined towards an upper portion of the first rotatable cam 306 in continuation to the first horizontal cam 337 for rotating the second arm 305 in a direction indicated by arrow Q in FIG. 29 about the pivot 321 as the center of rotation with rotation of the first rotatable cam 306 in the forward direction indicated by arrow X in FIGS. 25 and 28. That is, when the second rotating pin 318 is abutted against the first inclined cam section 338, the second arm 305 is rotated in a direction indicated by arrow Q in FIG. 29 under the bias of the torsion coil spring 322. With rotation of the second arm 305 in the direction indicated by arrow Q in FIG. 29, the end roll 314 provided at its one end is caused to bear against the outer periphery of the optical disc D contained in the disc housing unit 2 for controlling rotation of the second arm 305 in the direction indicated by arrow Q in FIG. 29.

The first inclined cam section 338 provided on the second cam 317 adapted for rotating the second arm 305 in the direction of arrow Q in FIG. 29 under the bias of the torsion coil spring 322 is provided on the side of the first cam 317 continuing to the inclined cam section 336 of the first horizontal cam section 335 provided on the first cam 312. Consequently, during the initial rotational state in which the first rotatable cam 306 is rotated in the forward direction indicated by arrow X in FIGS. 25 and 28, the first arm 304 is rotated against the bias of the torsion clip spring 322 for maintaining the end roll 309 and the disc support 308 in the spaced apart position from the outer periphery of the optical disc D housed within the disc housing unit 2. On the other hand, when the first rotatable cam 306 is rotated in the forward direction indicated by arrow X in FIGS. 25 and 28, the second rotating pin 318 thrusts the first inclined cam section 338, so that the second arm 305 is rotated in the direction indicated by arrow Q in FIG. 29, under the bias of the torsion coil spring 322. If the optical disc D to be transported is inserted in the disc inserting slit 6 of the disc housing unit 2 which is positioned in register with the disc transporting mechanism 302, the end roll 314 is made to bear against the outer periphery of the optical disc D for suppressing rotation of the second arm 305 in the direction of arrow Q in FIG. 29.

If, while the optical disc D to be transported is not held in the disc inserting slit 6 of the optical disc housing unit 2 in register with the disc transporting mechanism 302, the first rotatable cam 306 is rotated in the forward direction indicated by arrow X in FIGS. 25 and 28, and the second arm 305 is rotated in the direction indicated by arrow Q in FIG. 29, under the bias of the tension coil spring 322, as the first arm causes the second rotating pin 318 to be thrust against the first inclined cam section 338, the end roll 314 is not contacted with the optical disc D. Thus the second arm 305 is further rotated clockwise as indicated by arrow Q in FIG. 29, without being controlled as to its rotation by the optical disc D. The disc. detection switch 319 for detecting the presence or absence of the optical disc D, provided on the rotational trajectory of the second arm 302, is thrust by the switch actuating pin 320 set on the rotating section 316. By such actuation of the detection switch 319, it is electrically detected that there is no optical disc D to be transported in the disc inserting slit 6 of the disc housing unit 2 in register with the disc transporting mechanism 302. On such actuation of the detection switch 319 by the second arm 305, the operation of the driving motor 330 of the cam rotating driving mechanism 307 rotationally driving the first rotatable cam 306 ceases for terminating the takeout operation of the optical disc D out of the disc housing unit 2. Following the cessation of the takeout operation, the driving motor 330 is driven in reverse for rotating the first rotatable cam 306 in reverse for restoring the first and second arms 304, 305 to the initial positions shown in FIG. 23.

Thus the second arm 305, the rotation of which is controlled by the first rotatable cam 306, has the function of detecting whether there is the optical disc D to be transported in the disc inserting slit 6 of the disc housing unit 2.

The second can 317 also has a second incline cam, section 339 which is inclined towards the lower side of the first rotatable cam 306 in continuation to the first inclined cam section 338 for causing rotation of the second arm 305 in the direction indicated by arrow Q in FIG. 29 about the pivot 321 as the center of rotation as the first rotatable cam 306 continues its forward rotation in the direction indicated by arrow X in FIGS. 25 and 28. The second inclined cam section 339 formed on the second cam 317 has the beginning end in the forward direction of the list rotatable cam 306 substantially coincident with that of the inclined cam section 312, as shown in FIG. 28. Consequently, as the first rotatable cam 306 is rotated in the forward direction, the second arm 305 is rotated in the direction shown by arrow P in FIG. 29 about the pivot 321 as the center of rotation.

The first cam 312 and the second cam 317 are joined with each other at the terminal end of the first rotatable cam 306 in the direction of forward rotation indicated by arrow X in FIGS. 25 and 28, as shown in FIG. 28. Consequently, if, after the first rotating pin 313 reaches the inclined cam section 336 provided on the first cam 312 and the second rotating pin 318 reaches the second inclined cam section 339 of the second cam 317, the first rotatable cam 306 continues its rotation in the forward direction indicated by arrow X in FIGS. 25 and 28, the first arm 304 and the second arm 305 are rotated in unison in the direction indicated by arrow P in FIG. 29, about the pivot 321 as the center of rotation, while a predetermined constant distance is maintained between the arm ends fitted with the end rolls 309, 314.

Figure 31:
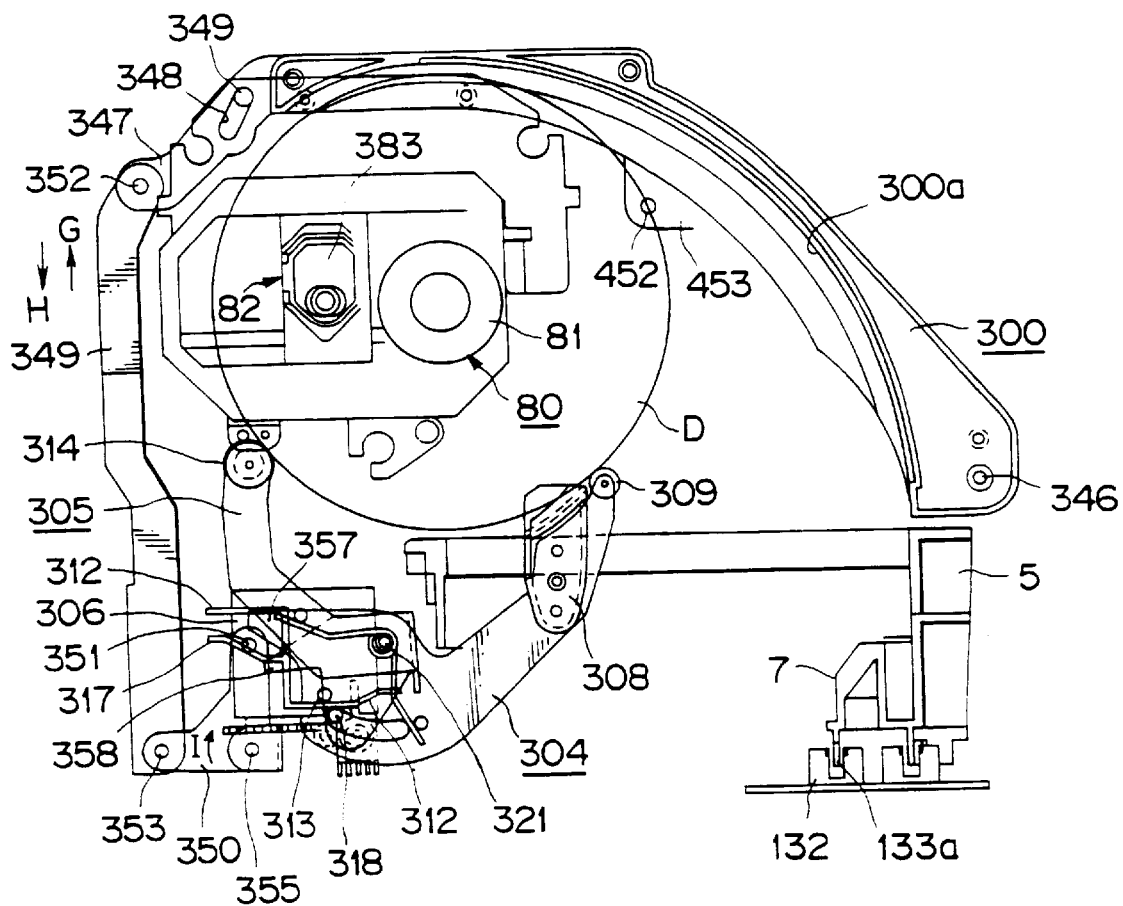
FIG. 31 is a side view showing the operating state of the disc transporting mechanism shown in FIG. 29 and showing the state in which the optical disc has been transported to the loading position on the disc reproducing unit.

At the terminal ends of the first rotatable cam 306 in the direction of forward rotation thereof indicated by arrow X in FIGS. 25 and 28 where the first cam 312 is joined with the second cam 317, first and second cam sections 341, 342 are formed in continuation to the inclined cam sections 336, 339, respectively. As the first rotatable cam 306 is rotated in the forward direction of rotation as indicated by arrow X in FIGS. 25 and 28, so that the first and second rotating pins 313, 318 reach the second horizontal cam sections 341, 342, the first and second arms 304, 305 are set substantially upright on the bottom surface of the outer casing 1, as shown in FIG. 31.

A switch actuator 324a actuating the control switch 324 controlling the driving motor 330 of the cam rotating driving mechanism 307 is provided between the first cam 312 and the second cam 317 formed on the outer peripheral surface of the first rotatable cam 306, as shown in FIGS. 25 and 27. When the first rotatable cam 306 is rotated in the direction indicated by arrow X in FIG. 25, and the first arm 304 and the second arm 305 are erected substantially upright on the bottom surface of the outer casing 1 as shown in FIG. 31 and the optical disc D fed by these first and second arms 304, 305 has been transported as far as a position in register with the disc loading position on the disc reproducing unit 301, the control switch 324 causes the driving motor 330 of the cam rotating and driving mechanism 307 to be halted. If, from the state in which the first and second arms 304, 305 are set substantially upright on the bottom surface of the outer casing 1, as shown in FIG. 31, after having transported the optical disc D to a position in register with the disc loading position on the disc reproducing unit 301, the first rotatable cam 306 is rotated in the direction opposite to arrow X in FIG. 25 and the first and second arms 304, 305 have been rotated as far as the initial position shown in FIG. 23, the control switch 324 is thrust by the switch actuator 324a for halting the driving motor 330 of the cam rotating and driving mechanism 307. Thus the first rotatable cam 306, rotated through substantially 360 degrees, rotates the first and second arms 304, 305 from the initial position shown in FIG. 23 to a transporting position at which the optical disc D shown in FIG. 31 has been transported to a position registering with the disc loading position on the disc reproducing unit 301.

The disc feed guide member 300, rotated about the pivot 321 by rotation of the first rotatable cam 306 for guiding the movement of the optical disc D taken out of the disc housing unit 2, is mounted on a lateral surface of a disc reproducing unit mounting substrate 345 supporting the disc reproducing unit 301 as later explained. The disc feed guide member 300 is arranged. facing the outer periphery of the optical disc D fed by the first and second arms 304, 305, as shown in FIG. 23, and is arranged over a range beginning from the upper outer periphery of the optical disc D housed within the disc housing unit 2 and reaching the disc loading position on the disc reproducing unit 303. Thus the disc feed guide member 300 is arranged at a position facing one ends of the first and second arms 304, 305 along the movement trajectory of the outer periphery of the optical disc D fed by the first and second arms 304, 305. The surface of the disc feed guide member 300 facing the optical disc D is formed as a feed guide section 300a which is smoothly and continuously curved along the movement trajectory of the optical disc D. On both sides of the guide section 300a is mounted a control wall 300b supporting both sides of the outer periphery of the optical disc D for controlling the wobbling of the optical disc D fed and guided by the guide section 300a.

Specifically, the disc feed guide section 300a of the disc feed guide member 300 is arranged within a vertical plane including a radial line centered at the pivot 4 which is the center of rotation of the disc housing unit 2.

Figure 30:
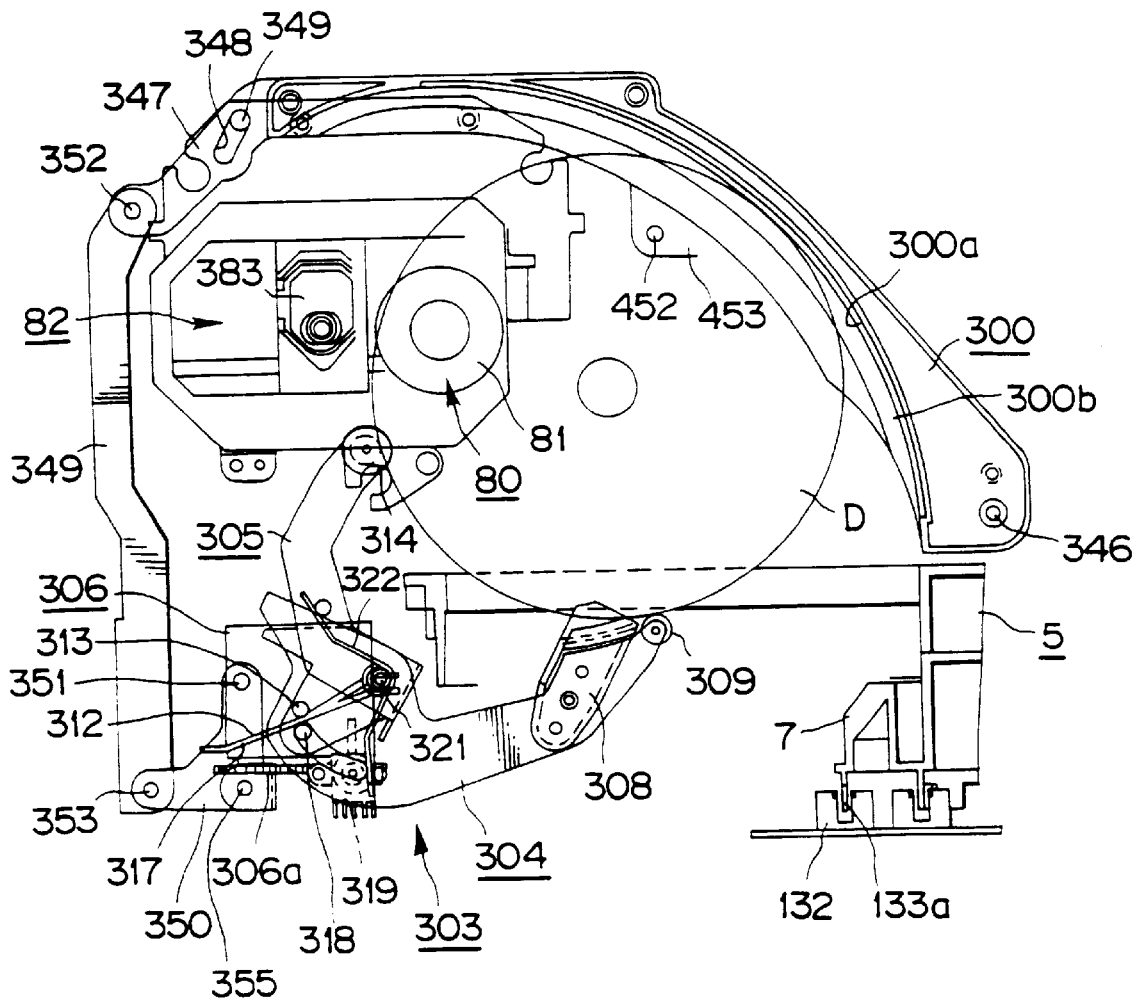
FIG. 30 shows the operation of the disc transporting mechanism of the disc reproducing apparatus shown in FIG. 29, and shows the operating process for the state in which the distal end of the second arm is abutted against an optical disc in the disc takeout enabling position.

The disc feed guide member 300 has its proximal end towards the disc housing unit 2 pivotally mounted on a pivot 346 set on the disc reproducing unit mounting substrate 345 and is rotatable mounted about the pivot 346 in a direction towards and away from the first and second arms 304, 305. The free end of the disc feed member 300 is formed with a rotary guide lug 347, as shown in FIG. 30. In the rotary guide lug 347 is bored a rotary guide opening 348 having the rotational direction of the feed guide member 300 about the pivot 346 as its long axis. The rotary guide opening 348 is engaged by a rotary guide pin 349 set on the mounting substrate 345 for restricting the rotational range of the disc feed guide member 300. The rotational control of the disc feed guide member 300 is taken charge of by a disc reproducing unit rotation control mechanism which controls the rotation of the disc reproducing unit 301 supported by a floating unit on the mounting substrate 345 and which controls a floating lock mechanism locking the floating unit.

At the distal end of the rotary guide lug 347, an actuating lever 349 for rotating an arm rotating member 350 is pivotally mounted on a pivot 352. The arm rotating lever 349 causes rotation of the first and second arms 304, 305 about the pivot 321 against the bias of the torsion coil spring 322 after the arms 304, 305 have fed the optical disc D to the loading position on the disc reproducing unit 301 and thus rotated to the position shown in FIG. 31. The rotary guide lug 347 of the disc feed guide member and the arm rotating member 350 are interconnected by a link mechanism which employs the actuating lever 349.

The arm rotating member 350 has a rotating piece 352 having set on its one end a rotating pin 351 causing rotation of the first and second arms 304, 305 and a connecting piece 354 having set thereon a pivot 354 pivotally supporting the other end of the actuating lever 349, with the rotating piece 352 and the connecting piece 354 being interconnected at right angles to each other in the form of a letter L, as shown in FIGS. 26 and 30. The arm rotating member 350 has its proximal end towards the connecting portion for the rotating piece 352 and the connecting piece 354 pivotally mounted by a pivot 355 set on one end of a bracket 316 pivotally mounting the first and second arms 304, 305. The arm rotating member 350 is connected to the disc feed guide member 300 through the actuating lever 349 by having the other end of the actuating lever 349 pivotally mounted on the pivot 353 set on the connecting piece 354. When the disc feed guide member 300 is rotated by the disc reproducing unit rotating control mechanism, the actuating lever 349 is moved in the direction of arrows G or H in FIG. 31, by the rotation of the disc feed guide member 300. With such movement of the actuating lever 349, the arm rotating member 350 is rotated in the direction shown by arrow I or in an opposite direction about a pivot 355 set on one end of the bracket 316.

Figure 32:
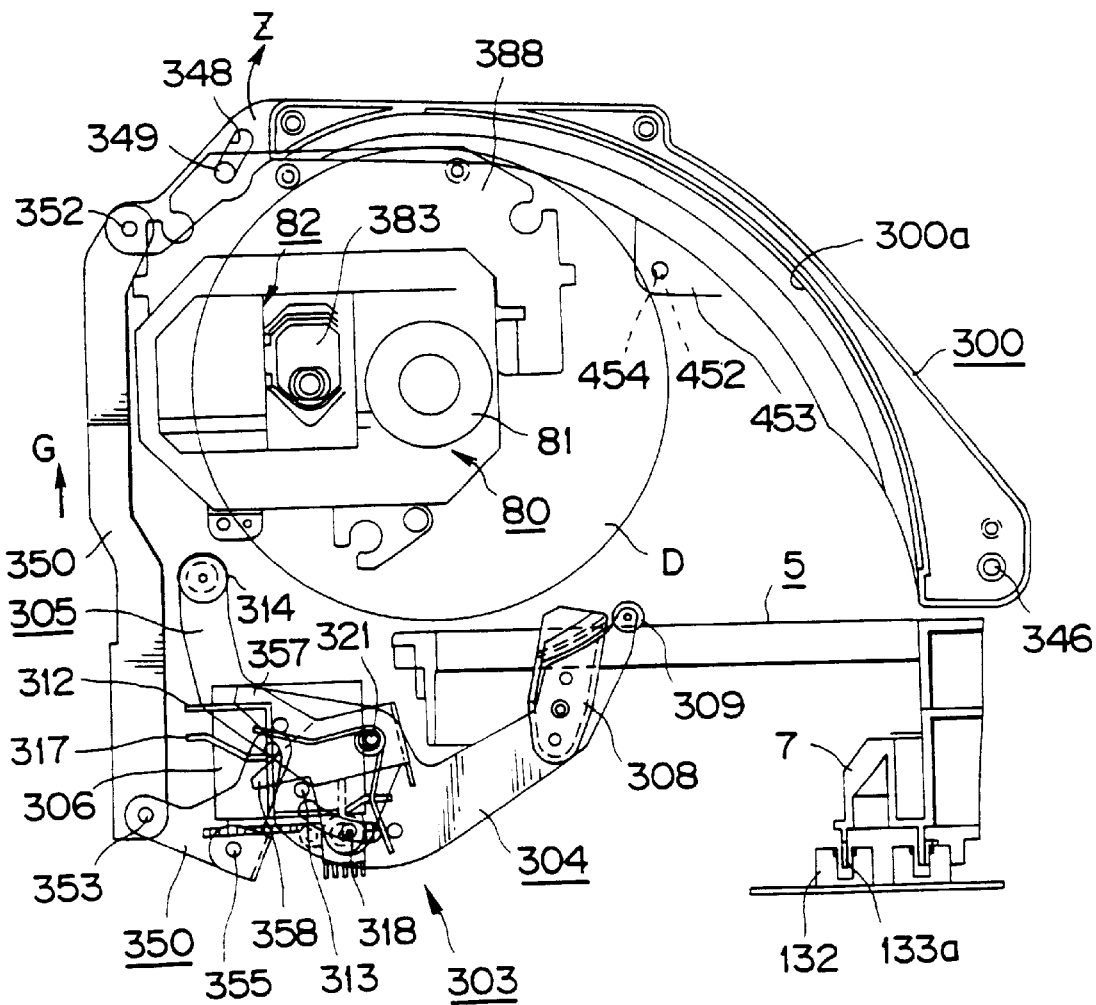
FIG. 32 is a side view showing the operating state of the disc transporting mechanism shown in FIG. 29 and showing the state in which the optical disc has been transported to the loading position on the disc reproducing unit and subsequently brought to the rotation enabling state.

When the actuating lever 349 is moved in a direction shown by arrow G in FIG. 31, with rotation of the disc feed guide member 300, the arm rotating member 350 is rotated in a direction shown by arrow I in FIG. 31 about the pivot 355 as the center of rotation. When the arm rotating member 350 has been rotated in direction shown by arrow I in FIG. 31, the rotating pin 351 set on one end of the rotating piece 352 is engaged between lugs 357, 358 set on the opposite sides of the rotating sections 311, 316 of the first and second arms 304, 305, as shown in FIGS. 31 and 32. At this time, the first and second arms 305, 306 have rotated the optical disc D as far as the disc loading position on the disc reproducing unit 310. When the arm rotating member 351 is further rotated in a direction shown by arrow I in FIG. 31, the rotating pin 350 continues to be engaged between the lugs 357, 358 of the first and second arms 304, 305, for causing the first and second arms 304, 305 to be rotated against the bias of the torsion coil spring 322 in the directions opposite to those shown by arrows P and Q for enlarging the distance between the end rolls 309 and 314. With the distance between the end rolls 309, 314 being enlarged in this manner, the disc support 308 and the end rolls 309, 314 are separated from the optical disc D transported as far as the disc loading position on the disc reproducing unit 301.

In addition, in association with the first rotatable cam 306 rotated by the cam driving mechanism 307 constituting the disc transporting mechanism 302, a housing unit rotation control mechanism 360 is arranged, as shown in FIG. 25. The housing unit rotation control mechanism 360 controls the rotation of the disc housing unit 2 at least during the time when the disc transporting mechanism 302 transports the optical disc D and when the optical disc D transported by the disc transporting mechanism 302 is reproduced.

The housing unit rotation control mechanism 360 has a stop member 362 rotatably supported by a pivot 361 by a mounting piece, not shown, formed by bending a portion of the mounting substrate 345 arranged within the outer casing 1. The stop member 362 has an engagement pin 363 mounted depending from one distal end side facing the pivotal mounting side to the pivot 361 and an engagement piece 364 projected towards the engagement recess 10 formed on the outer periphery of the rotary table 5 of the disc housing unit 2, as shown in FIGS. 25 and 27. The stop member 362 is mounted with the engagement pin 363 engaged in a spirally extending cam groove 365 formed on the upper end face of the first rotatable cam 306 and is rotated about the pivot 362 as the center of rotation by the rotation of the first rotatable cam 306 for engaging or disengaging the engagement piece 364 into or from the engagement recess 10.

During the time the disc housing unit 2 is rotated by the housing unit rotating driving mechanism 41, the stop member 362 is rotated in a direction in which the engagement piece 364 is disengaged from the engagement recess 10 formed on the outer peripheral surface of the rotary table 5. That is, by the engagement pin 363 engaged in the cam groove 365 formed on the upper end face of the first rotatable cam 306 being controlled by the rotation of the first rotatable cam 306, the stop member 362 is maintained in a state in which the engagement piece 364 is detached from the engagement recess 10.

When the first rotatable cam 306 is rotated in a direction shown by arrow X in FIG. 25, with the disc transporting operation by the disc transporting mechanism 302, the engagement pin 363 is guided and moved along the cam groove 365. By the engagement pin 363 being guided and moved by the cam groove 365, the stop member 362 is rotated counterclockwise as indicated by arrow J in FIG. 25, about the pivot 361 as the center of rotation, that is, in a direction in which the engagement piece 364 is engaged in the engagement recess 10 formed in the outer peripheral surface of the rotary table 5. The engagement piece 364 is engaged in that one of the engagement recesses formed in the outer periphery of the rotary table in register with the disc inserting slits 6 which is associated with the inserting slit in which is inserted the designated optical disc D transported by the disc transporting mechanism 302, as shown in FIG. 25. Consequently, the housing unit rotation control mechanism 360 constitutes a protection mechanism for the optical disc D being reproduced or transported and the disc housing unit 2 housing the optical disc D. In the present embodiment, the engagement piece 364 provided in the stop member 362 is set so as to have a smaller width than the opening width W of the engagement recess 8 provided in the rotary table 5, so that, even if a small error be produced in the stop angle of the rotary table 5, the disc inserting slit 6 of the rotary table 5 in which is inserted the optical disc D transported to and reproduced by the disc reproducing unit 301 may be corrected so as to be in correct register with the disc transporting mechanism 302.

A disc reproducing unit 301, constituting another embodiment of the disc reproducing apparatus according to the present invention, is hereinafter explained.

Figure 33:
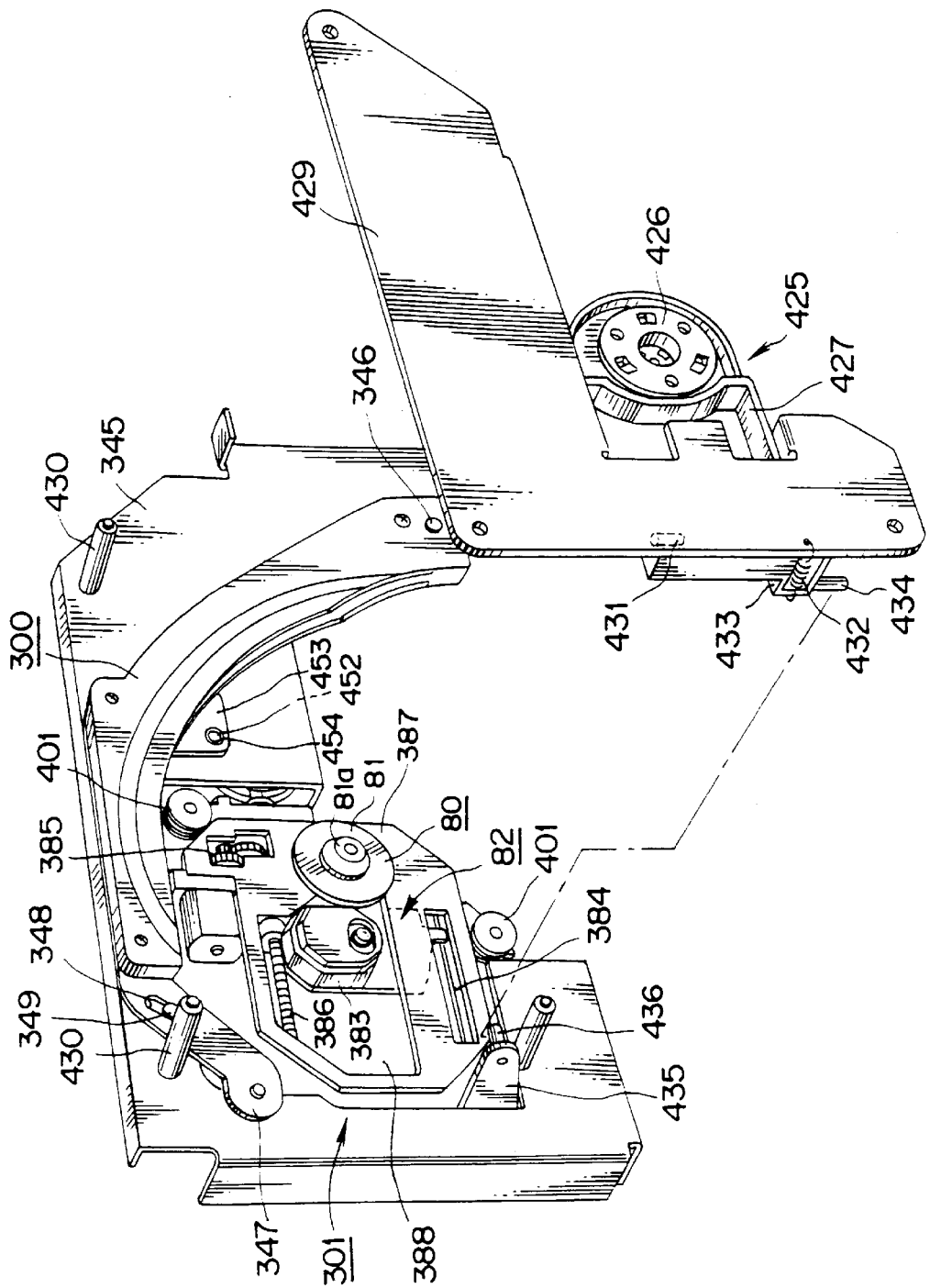
FIG. 33 is a perspective view showing the front side of a disc reproducing unit portion of the disc reproducing apparatus according to a further modification of the present invention.
Figure 34:
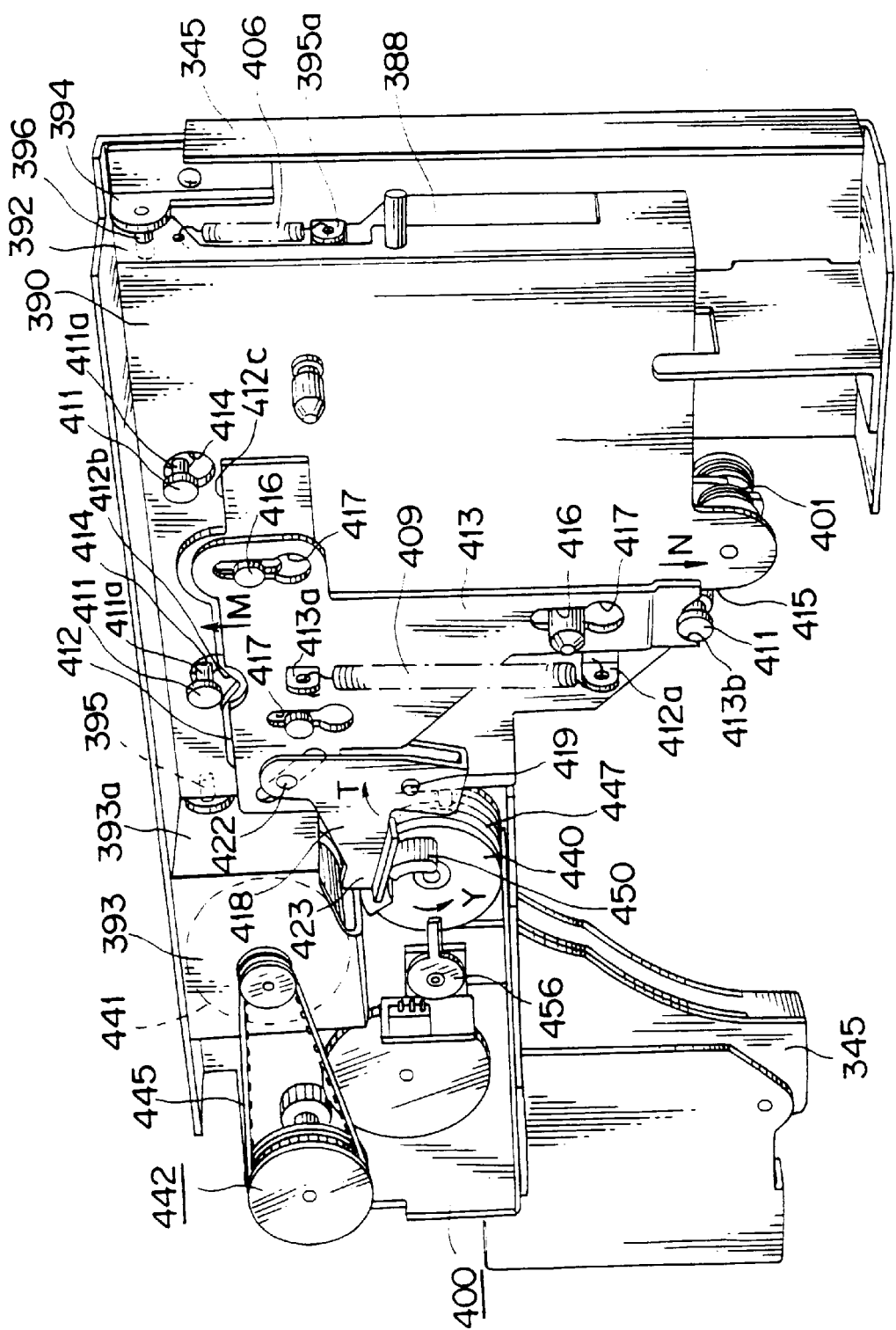
FIG. 34 is a perspective view showing the rear side of a disc reproducing unit portion of the disc reproducing apparatus according to the further modification of the present invention.

Similarly to the reproducing unit of the previous embodiment, the disc reproducing unit 301 is mounted on a disc reproducing unit mounting substrate 345 mounted in an outer casing 2 and is made up of a disc rotational driving mechanism 80 having a disc table 81 on which is loaded an optical disc D transported by a disc transporting mechanism 302, and an optical pickup unit 82, as shown in FIGS. 33 and 34. The optical pickup unit 82 acts as reproducing means for radiating a light beam to a signal recording surface of the optical disc D loaded and rotated on the disc rotating and driving mechanism 80 and for reproducing information signals, such as music signals, recorded on the optical disc D. The optical pickup unit 82 includes an optical pickup 383 having an objective lens 382 for converging the light beam from a light source, such as a semiconductor laser, on the signal recording surface of the optical disc D. The optical pickup 383 is carried by a slide guide member 384 and a feed screw 386 of a pickup feed unit and is fed radially of the optical disc D loaded on the disc rotating and driving mechanism So by the pickup feed unit 385 for scanning the signal recording surface of the optical disc across its inner and outer rims.

The disc reproducing unit 301 is also arranged so that the disc rotating and driving mechanism 80 has its rotary shaft lying at right angles to a pivot 4 acting as a center of rotation of the disc housing unit 2, as shown in FIGS. 23 and 24. Thus the optical disc D loaded and rotated on the disc rotating and driving mechanism 80 has its rotary plane extending parallel to the axis of the pivot 4 of the disc housing unit 2. With the disc housing unit 2 arranged in this manner, the optical disc D, housed and held within the disc housing unit Z with its major surface lying substantially parallel to the pivot 4, is transported by the disc transporting mechanism 302 without changing its inserting direction into the disc housing unit 2, so as to be loaded on the disc reproducing unit 301.

Turning to a more detailed structure of the disc reproducing unit 301, the disc reproducing unit 301 is mounted on a pickup chassis 387 produced by punching a metal plate and includes the disc rotating an driving mechanism 80 and the optical pickup unit 82, as shown in FIGS. 33 and 34. The pickup chassis 387, mounting the disc rotating and driving mechanism 80 and the optical pickup unit 82, is mounted through a spacer 389 to a pickup chassis supporting substrate 388 carrying a stator coil of a disc driving motor constituting the disc rotating and driving mechanism 80, a starting and controlling circuit for the driving motor, a driving controlling circuit for the optical pickup unit 82 and so forth. The pickup chassis supporting substrate 388 is supported by a disc driving unit supporting substrate 390 arranged for depending from the disc reproducing unit supporting substrate 345 arranged vertically within the outer casing 1.

Figure 35:
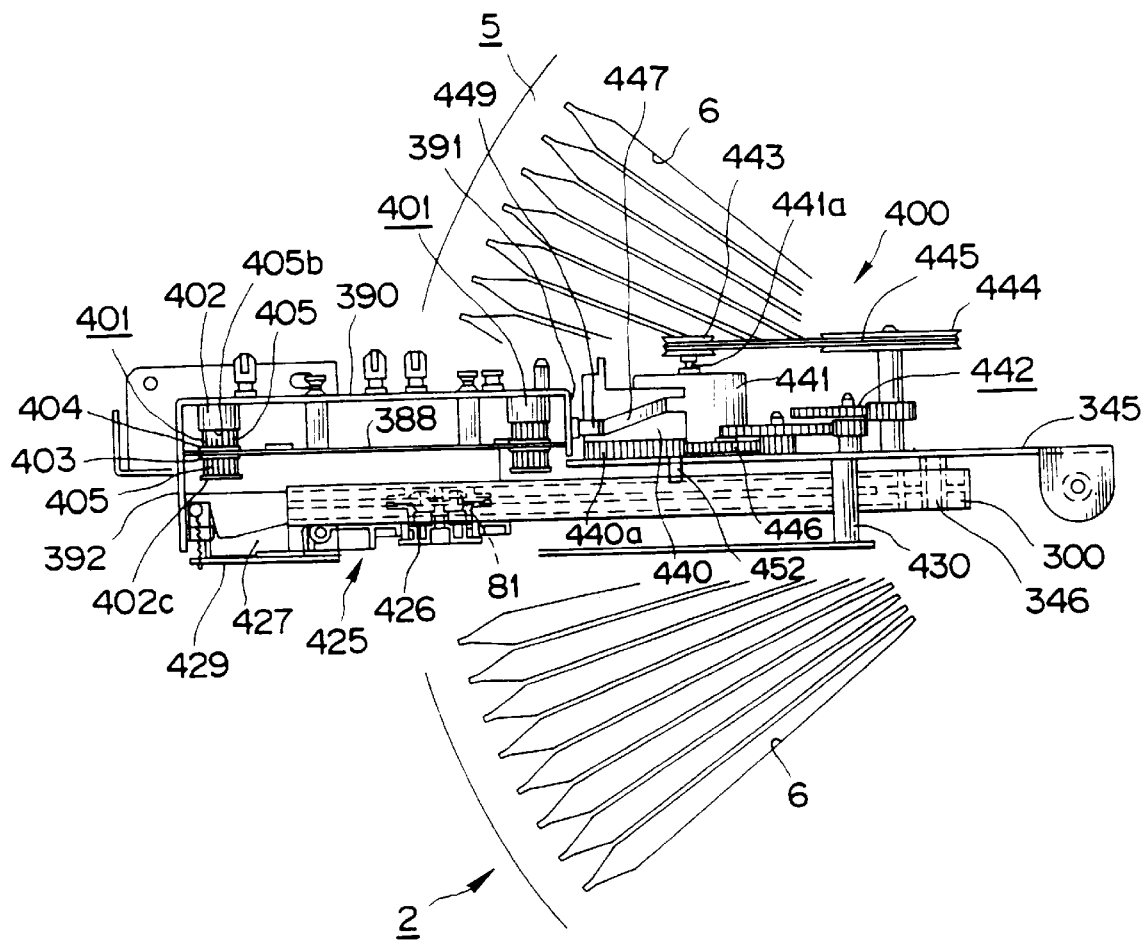
FIG. 35 is a plan view showing the disc reproducing unit portion of the disc reproducing apparatus according to the further modification of the present invention.

The disc driving unit supporting substrate 390 carrying the pickup chassis supporting substrate 388 has its opposing sides formed with a first upstanding wall 391 and a second upstanding wall 392, as shown in FIG. 35. The upper ends of the first and second upstanding walls 391, 392 of the disc driving unit supporting substrate 390 are pivotally mounted at pivot shafts 395, 396 mounted on a first pivot shaft mounting piece 393a formed upright on a lateral side of a driving motor mounting bracket 393 mounted on a surface of the mounting substrate 345 opposite to its surface mounting the disc feed guide block 300 and on a second pivot shaft mounting piece 394 mounted on the firstly stated surface of the mounting substrate 345, respectively, as shown in FIG. 34. Thus the disc driving unit supporting substrate 390 is rotated in the directions indicated by arrows K and D in FIG. 24, about the pivot shafts 395, 396 as the center of rotation, by a disc reproducing unit supporting substrate 400 as later explained. Thus the pickup chassis supporting substrate 388 supported by the disc driving unit supporting substrate 390 is also rotated in unison with the disc driving unit supporting substrate 390 in the directions indicated by arrows K and L in FIG. 24. The disc rotating and driving mechanism 80 and the optical pickup unit 82 are made to draw close to the optical disc D transported to the disc transporting position on the disc reproducing unit 301 by the disc transporting mechanism 402.

The pickup chassis supporting substrate 388 is carried by the disc driving unit supporting substrate 390 by means of a plurality of floating units 401. In the present embodiment, the pickup chassis supporting substrate 388 is carried by the disc driving unit supporting substrate 390 by means of three floating units 401. The function of the floating unit 401 is to absorb vibrations due to impacts applied to the disc driving unit supporting substrate 390 from outside the outer casing 1 and to prevent the vibrations from being transmitted through the pickup chassis supporting substrate 388 to the disc rotating and driving mechanism 80 and the optical pickup unit 82 in order to protect the disc rotating and driving mechanism 80 and the optical pickup unit 82 against the vibrations.

The floating unit 401 includes a supporting rod 402 set on the disc driving unit supporting substrate 390, as shown in FIG. 35. The supporting rod 402 has at its distal end a small-diameter portion which is passed through a cylindrical elastic support 404 for supporting the pickup chassis supporting substrate 388 for axial deviation relative to the supporting rod 402. The support 404 is formed of an elastic material having elastic properties, such as rubber, and is fitted in a through-hole 403 formed in the pickup chassis supporting substrate 388. There are fitted coil springs 404, 405, as elastic members, between a retention shoulder 402b formed at the base of the supporting rod 402 and the pickup chassis supporting substrate 388 and between a flange 402c formed at the upper end of the supporting rod 402 and the pickup chassis supporting substrate 388, as shown in FIG. 35. Thus the pickup chassis supporting substrate 388 is sandwiched between the coil springs 404, 405 and supported by the supporting rod 402 under the recoiling force of the coil springs 404, 405.

By supporting the pickup chassis supporting substrate 388 relative to the disc driving unit supporting substrate 390 by means of the above-described floating units 401, any vibrations generated in the disc driving unit supporting substrate 390 due to impacts applied from outside the outer casing 1 or vibrations in a direction perpendicular to the axial direction may be absorbed by these coil springs 404, 405 and prevented from being transmitted to the pickup chassis supporting substrate 388.

There is also mounted a tension spring 406 between the vicinity of the pivotal mounting portion of the first and second upstanding walls 391, 392 on the disc driving unit supporting substrate 390 to the pivot shafts 395,396 and spring retainers 405 provided on both sides of the pickup chassis supporting substrate 388, for biasing the pickup chassis supporting substrate 388 towards the pivot shafts 395, 396 at the upper porions of the outer casing 1, as shown in FIG. 34. The function of these tension springs 406 is to augment the elastic force of the elastic support 404 constituting the floating unit 401. That is, the tension springs 406 reinforce the elastic supporting force of the elastic support 404 which is placed under a load of the pickup chassis supporting substrate 388 arranged for depending within the outer casing 1.

Meanwhile, the pickup chassis supporting substrate 388, resiliently supported by the floating unit 401 by the disc driving unit supporting substrate 390, is locked by a floating lock unit 410 when the disc reproducing unit transports the optical disc D by the disc transporting mechanism 302 or when the optical disc D is being loaded on the disc table 81 of the disc rotational driving mechanism 80, that is, when the disc is in operating states other than the reproducing state.

The function of the floating lock unit 401 is to secure the pickup chassis supporting substrate 388 to the disc driving unit supporting substrate 390 against the resiliency of the floating unit 401 by thrusting a plurality of lock pins 411 set on the pickup chassis supporting substrate 388 against the surface of the disc driving unit supporting substrate 390 by first and second lock plates 412, 413 slidably mounted on the disc driving unit supporting substrate 390.

Figure 36:
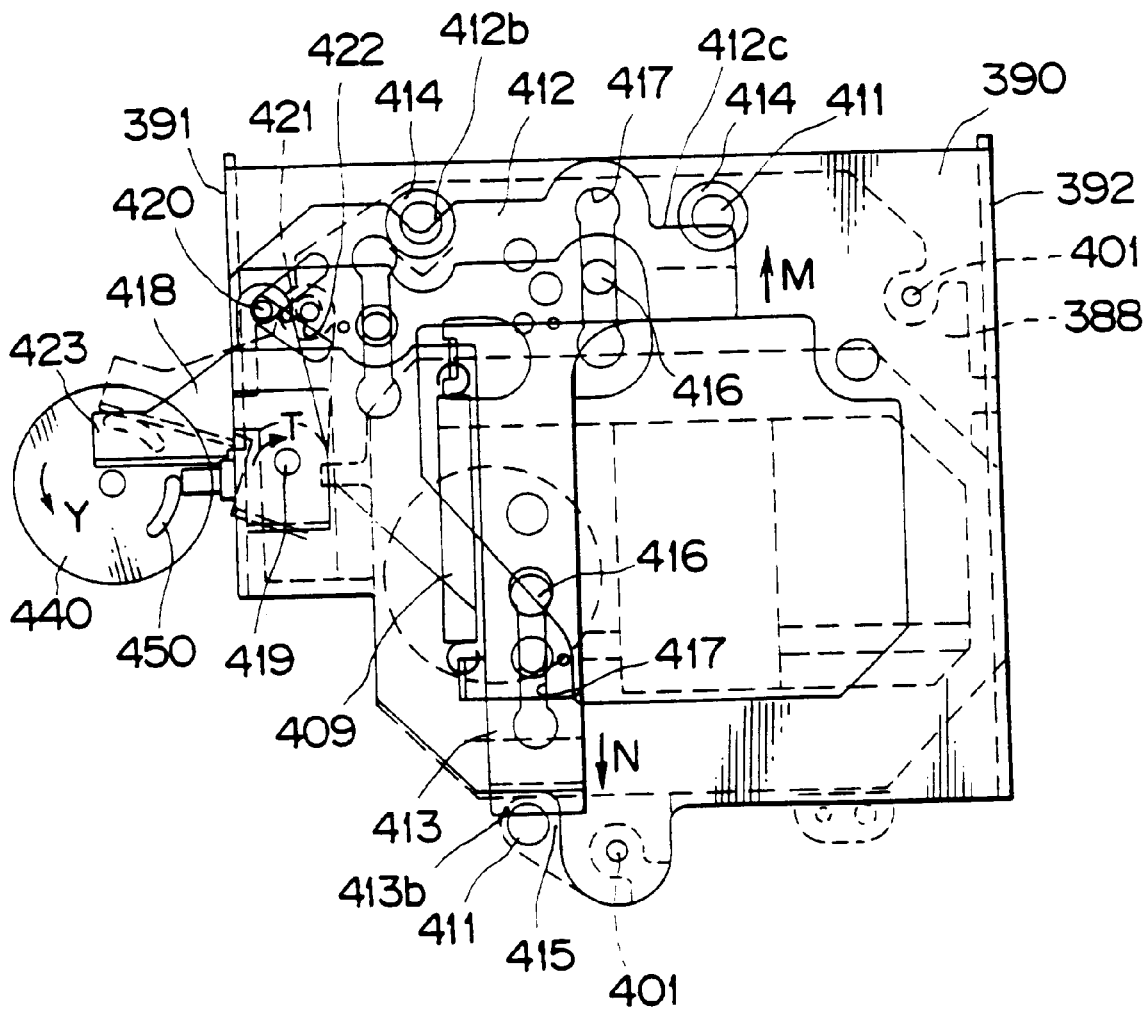
FIG. 36 is a back side view showing a floating lock mechanism of the disc reproducing apparatus according to the further modification of the present invention.

The lock pin 411, set on the pickup chassis supporting substrate 388 for constituting the floating lock unit 410, is protruded above the disc driving unit supporting substrate 390 via a through-hole 414 or a cut-out 415 formed in the disc driving unit supporting substrate 390, as shown in FIGS. 34 and 36. The distal end of each lock pin 411 is formed with an engagement recess 411a adapted to be engaged by each of first and second lock plates 412, 413.

The first and second lock plates 412, 413 are arranged between a plurality of lock pins 411 set on the pickup chassis supporting substrate 388 and arranged in superposition with each other, as shown in FIGS. 34 and 36. The lock plates 412, 413 are supported for sliding movement, with common slide guide pins 416 being passed through slide guide openings 417, in a direction towards and away from the lock pins 411. A tension spring 417 is mounted between the first and second lock plates 412, 413 by means of spring retainers 412a, 413b. The first lock plate 412 has its side having an engagement section 412b and an abutment section 412c for the lock pin 411 biased under the force of the tension spring 417 in a direction towards the lock pin 411 as indicated by arrow M in FIGS. 34 and 36. By the first and second lock plates 412, 413 biased by the tension spring 417 and by the engagement sections 412b, 413b and the abutment sections 412c being abutted and engaged with the lock pin 411, the pickup chassis supporting substrate 388 is secured to the disc driving unit supporting substrate 390 against the resiliency of the floating unit 401.

On the disc driving unit supporting substrate 390 is mounted a floating unlock lever for sliding the first and second lock plates 412, 413 against the bias of the tension spring 417 for releasing the thrusting support of the lock pin 411 by the first and second lock plates 412, 413. The floating unlock lever 418. is rotatably supported by a pivot 419 set on the disc driving unit supporting substrate 390 and has a slide guide pin 419 set on the disc driving unit supporting substrate 390 introduced into slide guide holes 421, 422 bored in one ends of the first and second lock plates 412, 413, as shown in FIGS. 34 and 36. On one end of the floating lock lever 418 is mounted upright a rotating arm 423. The floating unlock lever 418 has its rotating arm 423 thrust by the disc reproducing unit supporting substrate 400 and thereby is rotated in a direction indicated by arrow T in FIG. 35 about the pivot 419 a the center of rotation for sliding the first and second lock plates 412, 413 against the bias of the tension spring 417 in the directions opposite to those indicated by arrows M and N in FIGS. 34 and 36. By the first and second lock plates 412, 413 being slid in the directions opposite to those indicated by arrows M and N in FIGS. 34 and 36, the engagement sections 412b, 413b and the abutment section 412c are disengaged from the lock pin 411 for establishing a floating state in which the pickup chassis supporting substrate 388 is resiliently supported by the disc driving unit supporting substrate 390 by means of the floating unit 401.

The disc reproducing unit supporting substrate 345 has a chuck mechanism 425 for holding the optical disc D transported by the disc transporting mechanism 302 to the disc loading position on the disc reproducing unit 301 for rotation in unison with the disc table 81 in cooperation with the disc table 81, as shown in FIGS. 33 and 35. The chuck mechanism 425 has a chuck member supporting arm 427 supporting a chuck member 426 carrying a magnet, not shown.

The chuck member 426 is loosely fitted in a support hole 428 bored in the distal end of a chuck member supporting arm 427 for rotation relative to the chuck member supporting arm 427.

The chuck member supporting arm 427 constituting the chuck mechanism 425 is rotatably mounted on a chuck mechanism supporting substrate 429 mounted on an opposite side of the disc reproducing unit supporting substrate 345 mounting the disc driving unit supporting substrate 390 supporting the pickup chassis supporting substrate 388, as shown in FIG. 33. The chuck mechanism supporting substrate 429 is mounted parallel to the plane of the disc driving unit supporting substrate 390 by being made fast with a plurality of substrate supporting shafts 430 set on the disc driving unit supporting substrate 390.

The chuck member supporting arm 427 has a supporting shaft 431 mounted on both sides of the proximal side opposite to its distal side carrying the chuck member 426 pivotally mounted on the chuck mechanism supporting substrate 429, with the chuck member 426 facing the disc table 81 of the disc rotating mechanism 80, so that the chuck member supporting arm 427 may be rotated about the supporting shaft 431 as the center of rotation. By being rotated about the supporting shaft 431 as the center of rotation, the chuck member supporting arm 427 causes the chuck member 426 to be contacted with or separated from the disc table 81. The chuck member supporting arm 427 is rotationally biased by a tension spring 432 mounted between the proximal side of the chuck member supporting arm 427 and the chuck mechanism supporting substrate 429 in a direction in which the end chuck member 426 is brought into or out of contact with the disc table 81.

The chuck member supporting arm 427 has the function of being rotated in unison with rotation of the disc driving unit supporting substrate 390 for moving the chuck member 426 into or out of contact with the disc table 81. The proximal side of the chuck member supporting arm 427 is formed with a tab 433 which in turn is formed with an engagement pin 434 for engaging with the disc driving unit supporting substrate 390. The engagement pin 434 is engaged with a rotating pin 436 set on a rotating piece 435 formed upright on one side of the disc driving unit supporting substrate 390. The chuck member supporting arm 427, causing the engagement pin 434 to bear against the rotating pin 436 of the disc driving unit supporting substrate 390 under the force of the tension spring 432, is rotated in a direction of approaching the end chuck member 426 to the disc table 81 when the disc driving unit supporting substrate 390 is rotated towards the optical disc D being transported to the disc loading position on the disc reproducing unit 301.

Figure 37:
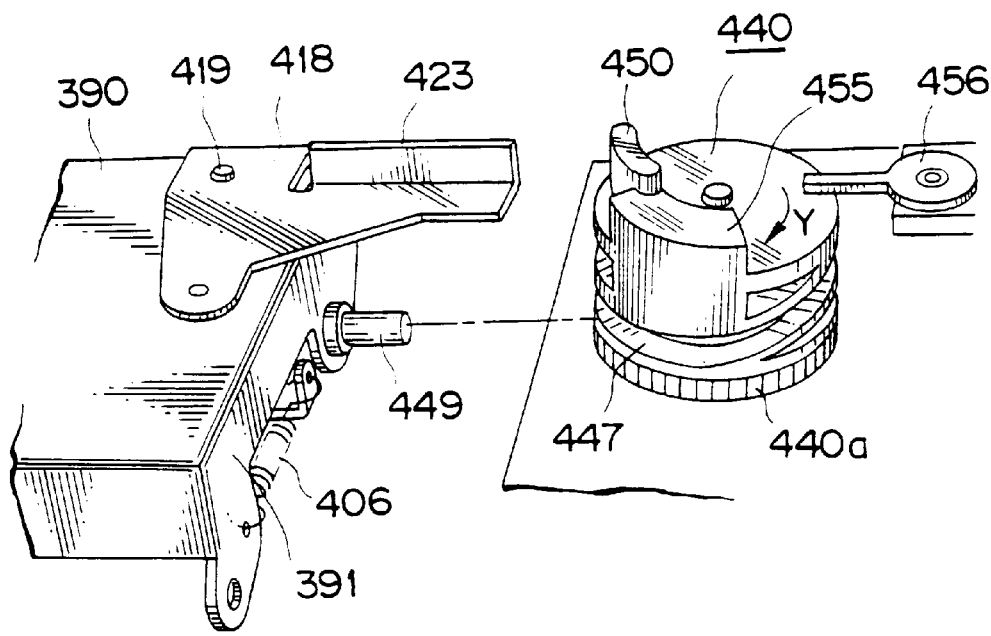
FIG. 37 is a schematic perspective view showing supporting structure for a second rotary cam member of a disc driving unit supporting substrate of the disc reproducing apparatus according to the further modification of the present invention.

The disc reproducing unit supporting substrate 400, causing rotation of the disc driving unit supporting substrate 390 rotatably supported by the disc reproducing unit supporting substrate 345, includes a second rotatable cam 440, as a rotary cam for rotating the reproducing unit, a driving motor 441 for rotationally driving the second rotatable cam 440 in the forward and reverse directions, and a decelerating gearing 442 having a plurality of gears for transmitting the rotary driving force of the driving motor 441 to the second rotatable cam 440, as shown in FIGS. 34 and 37, and constitutes a third driving mechanism of the present disc reproducing apparatus.

The driving motor 441, constituting the disc reproducing unit supporting substrate 400, is mounted on a driving motor mounting bracket 393 to the disc reproducing unit supporting substrate 345. The second rotatable cam 440 and the decelerating gearing 442 are also rotatably mounted on the disc reproducing unit supporting substrate 345. The driving motor 441 and the decelerating gearing 442 are interconnected by a connecting belt 445 placed around a pulley 443 mounted on an output shaft 441a of the driving motor 441 and a pulley gear 444 positioned at an initial stage of the decelerating gearing 442, as shown in FIG. 35. The decelerating gearing 442 and the second rotatable cam 440 are interconnected by engaging a gear 446 at the last stage of the decelerating gearing 442 with a reactive gear 440a provided at the lower end of the second rotatable cam 440. With such interlinking structure, the rotational driving force of the driving motor 441 is transmitted to the second rotatable cam 440 for rotating the cam 440.

The peripheral surface of the second rotatable cam 440, rotated by the driving motor 441, is formed with a can groove 447 for controlling the rotation of the disc driving unit supporting substrate 390. The cam groove 447 is engaged b, an engagement pin 449 formed upright on one side of the disc driving unit supporting substrate 390, as shown in FIGS. 35 and 37. BV engaging the engagement pin 449 in the cam groove 447 formed on the second rotatable cam 440, the disc driving unit supporting substrate 390 is rotated with the rotation of the second rotatable cam 440 about the pivot shafts 395, 396 as the center of rotation in the directions indicated by arrows K and L in FIG. 24.

On one end face of the second rotatable cam 440 is formed a floating unlock lever rotating piece 450 for abutting against the rotating arm 423 provided on the floating unlock lever 418 for rotating the floating unlock lever 416 with rotation of the second rotatable cam 440. Thus the floating unlock lever 418 is controllingly rotated by the rotation of the second rotatable cam 440 for fastening and unfastening the pickup chassis supporting substrate 380 carried by the disc driving unit supporting substrate 390 to and from the disc driving unit supporting substrate 390. The pickup chassis supporting substrate 388 is supported by the disc driving unit supporting substrate 390 via the floating unit 401.

On one end face of the second rotatable cam 440 a switch actuating piece 456 which discontinues the driving of the driving motor 441 for discontinuing rotation of the second rotatable cam 440 when the disc driving unit supporting substrate 390 is rotated to a position approaching the optical disc D transported to the disc loading position within the disc reproducing unit 301 or to a position spaced apart from the optical disc D transported to the disc loading position, as shown in FIG. 37.

On the other end face of the second rotatable cam 440 is mounted a control pin 452 with an offset with respect to the center of rotation of the rotatable cam 440. The control pin 452 controlledly rotates the disc feed guide member 300 about the pivot 346 as the center of rotation. The control pin 452 is mounted on the disc feed guide member 300 by means of an elongated opening bored in the disc reproducing unit mounting substrate 345. The control pin 452 is engaged in an engagement opening 454 bored in a projecting piece 453 mounted on one side at a mid portion of the disc feed guide member 300 mounted on one lateral side of disc reproducing unit mounting substrate 345, as shown in FIG. 33. Thus the disc feed guide member 300 is rotated by rotation of the second rotatable cam 440 about the pivot 346 as the center of rotation for bringing the disc feed guide surface 300a into and out of contact with the outer periphery of the optical disc D being fed. By such rotation of the disc feed guide member 300, the arm rotation control member 350, rotating the first and second arms 304, 305 of the disc transporting mechanism 302 against the bias of the torsion coil spring 322, is rotated by means of the rotating lever 349.

Since the disc housing unit 2 in the present embodiment is of the same construction as that of the previous embodiment, the housing unit rotary position detection mechanism 44 employing the disc housing unit 2 is of the same construction as that described previously and hence is not explained herein.

The operation of selecting one of a large number of optical discs D housed within the disc housing unit 2 in the present embodiment and loading the selected optical disc D on the disc reproducing unit 301 will now be explained.

The disc number of the desired optical disc housed within the disc housing unit 2 is designated and the disc housing unit rotating and driving mechanism 41 is driven for rotating the rotary table 5 of the disc housing unit 2. The housing unit rotational position detection mechanism 44 detects that the optical disc D having the designated disc number has been transported to the takeout enabling position O to halt the disc housing unit rotating and driving mechanism 41.

When the optical disc D of the desired disc number is moved to the takeout enabling position by the disc transporting mechanism 42, the stop member 362 of the housing unit rotation control mechanism 360 is disengaged from the engagement recess 10 of the rotary table 5 which may now be rotated about the pivot 4 as the center of rotation.

It is noted that, when the disc housing unit 2 for moving the optical disc D having the desired disc number to the takeout enabling position by the disc transporting mechanism 42 is ready to be rotated by the disc housing unit rotating and driving mechanism 41, the first and second arms 304, 305 making up the disc feed mechanism 303 of the disc transporting mechanism 302 are set in a state shown in FIG. 23. That is, the first rotatable cam 306 is at an initial rotational position, with the first rotating pin 313 of the first arm 304 and the second rotating pin 318 of the second arm 305 being in pressure contact with the first horizontal cam 335 of the first cam 312 and with the first horizontal cam 337 of the second cam 317, respectively. In this state, the first arm 304 is set in a state of having been rotated to a position in which the disc support 308 and the end roll 309 are spaced apart downward from the outer periphery of the optical disc D housed within the disc housing unit 2, as shown in FIG. 23. On the other hand, the second arm 305 is set in a state of having been rotated to a position in which the end roll 314 is spaced apart upward from the outer periphery of the optical disc D housed within the disc housing unit 2, as shown in FIG. 23.

When the first and second arms 304, 305, making up the disc feed mechanism 303, are rotated from the initial position shown in FIG. 23 so that the first rotatable cam 306 is rotated by the cam rotating and driving mechanism 307 in a direction shown by arrow X in FIG. 25, the second arm 305 is rotated clockwise as indicated by arrow Q in FIG. 29. That is, the second rotating pin 318 provided on the second arm 305 is brought into pressure contact with the first inclined cam section 338 provided on the second cam 317 and is rotated in the direction indicated by arrow Q in FIG. 29 under the bias of the torsion coil spring 322. The roll 314 provided on one end of the second arm 305 is made to bear against the outer periphery of the optical disc D which is housed within the disc housing unit 2 and which is to be transported, thus restricting rotation of the second arm 305.

If there is no optical disc D in the inserting groove 6 in the disc housing unit 2 corresponding to the designated disc number, the end roll 314 is not contacted with the optical disc D, so that the second arm 305 is further rotated under the bias of the torsion coil spring 322 in the direction indicated by arrow Q in FIG. 29. The detection switch 319 provided on the rotational trajectory of the second arm 302 for detecting the possible presence of the optical disc D is thrust by the switch actuating pin 320 set on the rotating piece 316 of the second arm 305 for electrically detecting the absence of the desired optical disc D in the inserting groove 6 of the disc housing unit 2 in register with the disc transporting mechanism 302. With the detection switch 319 thus thrust, the driving of the driving motor 330 of the cam rotating and driving mechanism 307 rotating the first rotatable cam 306 ceases so that the takeout operation of the optical disc D from the housing unit 2 ceases. Following such cessation, the driving motor 330 is driven in reverse for rotating the first rotatable cam 306 in reverse for restoring the first and second arms 304, 305 to their initial positions shown in FIG. 23.

During the time the possible presence of the optical disc D in the disc housing unit 2 is continued by the second arm 305, the first rotatable cam 306 is rotated with the first rotating pin 313 resting on the first horizontal cam section 335 of the First cam 304. Thus the first arm 304 is maintained in a state in which the disc support 308 and the end roll 309 are spaced apart downward from the outer periphery of the optical disc D housed within the disc housing unit 2.

If, as a result of detection of possible presence of the optical disc D in the disc housing unit 2, the designated optical disc D to be transported is found to be present in the disc housing unit 2, the first rotatable can 306 continues to be rotated in the direction indicated by arrow X in FIG. 25. The first rotating pin 313 of the first arm 304 is made to bear against the inclined cam section 336 consecutive to the first horizontal cam section 335 of the first cam 312. On the other hand, the second rotating pin 318 of the second arm 305 is made to bear against the inclined cam section 339 consecutive to the first horizontal cam section 338 of the second cam 317.

When the first rotating pin 313 is made to bear against the inclined cam section 336 of the first cam 312, the first arm 304 is rotated in the direction indicated by arrow P in FIG. 23, under the bias of the torsion coil spring 322, until the disc support 308 and the end roll 309 are made to bear against the outer periphery of the optical disc D housed within the disc housing unit 2. The optical disc D which is housed within the disc housing unit 2 and which is to be transported is supported by being clamped between the first and second arms 304, 305, as shown in FIG. 30.

When the first rotatable cam 306 is further rotated in the direction indicated by arrow X in FIG. 25, from the state in which the optical disc is clamped between the first and second arms 304, 305, the first and second rotating pins 313, 318 are moved on the inclined cam section 336 of the first cam 312 and on the second inclined cam section 339 of the second cam 31?, respectively. The first and second arms 304, 305 are rotated in the directions opposite to those shown by arrows P and Q in FIG. 30, about the pivot 321 as the center of rotation. By such rotation of the first and second arms 304, 305, the optical disc D which has been designated and which is to be transported is taken out of the disc housing unit 2 and fed towards the disc guide member 300. The optical disc D, supported at three points on its outer periphery by the first and second arms 304, 305 and the disc feed guide member 300, is guided by the disc feed guide section 300a so as to be transported to the disc loading position within the disc reproducing unit 301, as shown in FIG. 31.

By suitably selecting the profile of the first inclined cam section 336 of the first cam 312 and the second inclined can section 339 of the second cam 317, the movement trajectory of one sides of the first and second arms 304, 305 may be of a flat and smoothly continuous contour. That is, the first and second arms 304, 305 are rotated for enlarging the gap therebetween at one ends thereof, against the bias of the torsion coil spring 322, in order to follow up with the rotation of the first and second arms 304, 305 in the direction opposite to those indicated by arrows P and Q in FIG. 30, that is towards the disc reproducing unit 301. By the gap between the first and second arms 304, 305 being increased in this manner, the movement trajectory at the one ends may be of a flat and smoothly continuous shape. The disc feed guide member 300, adapted for guiding the movement of the optical disc D along with the first and second arms 304, 305, may also be flat in contour, so that the disc reproducing apparatus (disc player) itself may also be reduced in height.

When the first and second arms 304, 30, have been rotated until the optical disc D has been fed to a position registering with the disc loading position in the disc reproducing unit 301, the first and second rotating pins 313, 318 arrive at the second horizontal cam sections 341, 342 of the first and second cams 312, 317 provided on the first rotatable cam 306, respectively. The first and second arms 304, 305 are substantially upright on the bottom surface of the outer casing 1, as shown in FIGS. 31.

When the first rotatable cam 306 has rotated the first and second arms 304, 305 as far as the position indicated in FIG. 31, the control switch 324 is thrust by the switch actuator 324a for halting the driving motor 330 of the cam rotating and driving mechanism 307 for terminating the transporting operation of the disc reproducing unit 301 as far as the disc loading position.

When the transporting operation of the optical disc D to the disc reproducing unit 301, and the control switch 324 is thrust, the driving motor 441 of the disc reproducing unit rotating mechanism 400 starts to be driven in the forward direction, for rotating the second rotatable cam 440 in the forward direction indicated by arrow Y in FIGS. 34 and 36.

With the present embodiment of the disc reproducing apparatus, the pickup chassis supporting substrate 388 carrying the disc rotating and driving mechanism 80 and the optical pickup unit 82 and the disc driving unit supporting plate 390 carrying the pickup chassis supporting substrate 388 are spaced apart from the disc loading position for the transported optical disc D. That is, the disc driving unit supporting plate 390 is maintained in a state of having been rotated in the direction indicated by arrow L in FIG. 24. The chuck member support arm 427 of the chuck mechanism 425 is maintained in a state in which the chuck member 426 carried at its distal end has been rotated in a direction away from the disc table 81 of the disc rotating and driving mechanism 80 as shown in FIG. 27. That is, the disc driving unit supporting plate 390 and the chuck member support arm 427 are in a state of being inclined and depending from the disc reproducing unit mounting substrate 345 and a space large enough to hold the optical disc D transported by the disc transporting mechanism 302 is provided between the disc table 81 of the disc rotating mechanism 80 and the chuck member 426.

When the driving motor 441 starts to be rotated in the forward direction, and the second rotatable cam 440 is rotated in the forward direction indicated by arrow Y in FIGS. 34 and 35, the disc driving unit supporting plate 390 having the engagement pin 449 engaged in the cam groove 447 formed on the periphery of the second rotatable cam 440 is rotated in the direction indicated by arrow K in FIG. 24. With such rotation of the disc driving unit supporting plate 390 in the direction shown by arrow K in FIG. 24, the pickup chassis supporting substrate 388 supported by the disc driving unit supporting plate 390 by means of the floating unit 410 is also rotated in the same direction in unison with the disc driving unit supporting plate 390. The pickup chassis supporting substrate 388 is secured at this time by the floating unit 410 and the disc driving unit supporting plate 390.

When the pickup chassis supporting substrate 388 is rotated along with the disc driving unit supporting plate 390 in the direction indicated by arrow K in FIG. 24, the disc rotating mechanism 80, mounted on the pickup chassis supporting substrate 388 through the pickup chassis 387, is rotated towards the disc loading position in which is disposed the optical disc D transported by the disc transporting mechanism 302. When the disc rotating mechanism 80 is rotated towards the disc loading position, the centering member 81a, projected towards the disc setting surface of the disc table 81, is engaged in a center opening of the optical disc D which is supported by the first and second arms 304, 305 and the disc fee; guide member 300 and transported to the disc loading position. The optical disc D is centered relative to the disc table 81 by the centering action of the centering member 81a so as to be loaded on the disc table 81. Since the pickup chassis supporting substrate 388 is secured by the floating unit 410 and the disc driving unit supporting plate 390 the relative position matching between the center opening of the optical disc D and the centering member 81a may be achieved correctly for reliably setting the optical disc D on the disc table 81.

Figure 38:
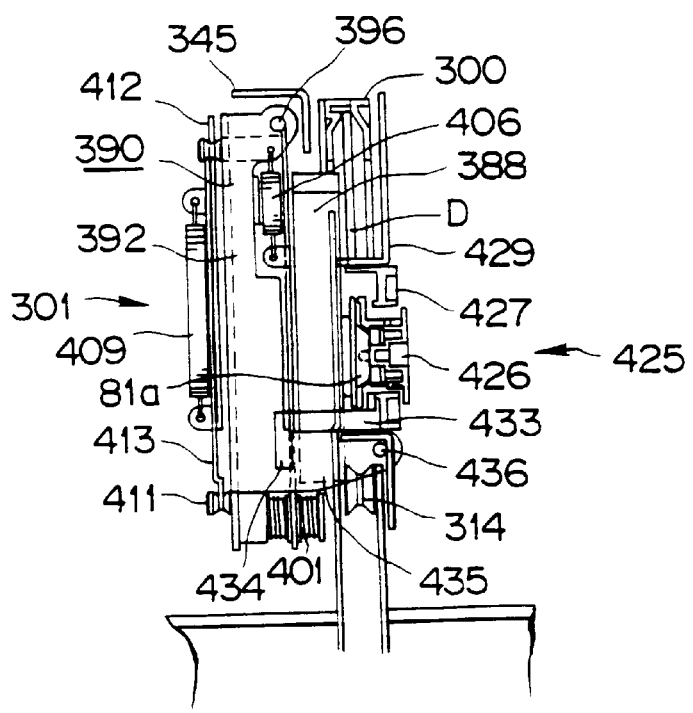
FIG. 38 is a front view showing the state in which an optical disc is loaded on the disc reproducing apparatus according to the further modification of the present invention.

When the disc driving unit supporting plate 390 is rotated in the direction indicated by arrow K in FIG. 24, the chuck member support arm 427 is rotated under the force of the tension spring 432 in a direction of approaching the chuck member 426 towards the disc table 81. That is, the chuck member support arm 427 is operatively connected to the disc driving unit supporting plate 390 by having the engagement pin 434 at the proximal side thereof engaged by the rotating pin 436 set on one side of the disc driving unit supporting plate 390, so that the support arm 427 is rotated concurrently synchronism with rotation of the disc driving unit supporting plate 390. Thus the disc table 8 and the chuck member 426 approach the optical disc D substantially simultaneously and cooperate with each other for chucking the optical disc D. By the optical disc D chucked in this manner, the optical disc D is enabled to be rotated in unison with the disc table 81, as shown in FIG. 38.

As described above, the second rotatable cam 440 is rotated in the forward direction, as indicated by arrow Y ir FIG. 35 for rotating the disc driving unit supporting plate 390 and the chuck member support arm 427 for rotating the floating unlock lever 413 by the floating unlock lever rotating piece 450 provided on one end face of the second rotatable cam 440 in operative association with the chuck operation for the optical disc D. As the second rotatable cam 440 is rotated in the forward direction indicated by arrow Y in FIG. 35, the floating unlock lever 418 is rotated in the direction indicated by arrow Z in FIG. 35 by the floating unlock lever rotating piece 450. By such rotation of the floating unlock lever 418, the first and second lock plates 412, 413 are slid in the directions opposite to those shown by arrows M and N in FIG. 35. The abutting engagement of the engagement sections 412a, 413a and the abutment section 412b provided on the first and second lock plates 412, 413 with respect to the lock pin 411 is released so that the pickup chassis supporting substrate 388 is in a floating state of being elastically supported by means of the floating unit 401 by the disc driving unit supporting plate 390.

The rotation of the floating unlock lever 418 by the second rotatable cam 440 is started with a slight delay with respect to the start of rotation of the disc driving unit supporting plate 390 and comes to a close substantially simultaneously with the chucking of the optical disc D on the disc table 81.

When the second rotatable cam 440 is rotated in the forward direction as indicated by arrow Y in FIG. 36, the disc feed guide member 300 is rotated in the direction indicated by arrow Z in FIG. 34, about the pivot 346 as the center of rotation, by the control pin 452 provided on the other end face of the second rotatable cam 440. The disc feed guide member 300 is spaced apart from the optical disc D disposed in the disc loading position.

When the disc feed guide member 300 is rotated in the direction indicated by arrow Z in FIG. 32, about the pivot 346 as the center of rotation, the rotating lever 349 is moved in the direction indicated by arrow G in FIG. 31, with the rotating member 350 being rotated in the direction indicated by arrow I in FIG. 31. The rotating pin 351 provided on the arm rating member 350 is engaged in a space between lugs 357, 358 on the rotating pins 311, 316 of the first and second arms 304, 305 for rotating the first and second arms 304, 305 against the bias of the torsion coil spring 322 for enlarging the space between the end rolls 309 and 314, as shown in FIG. 32.

When the disc feed guide member 300 is spaced apart from the optical disc D in the disc loading position, and the gap between the end rolls 309, 314 on the first and second arms 304, 305 is enlarged, the disc feed guide member 300 and the first and second arms 304, 305 cease to support the optical disc D. The optical disc D is supported solely by the chuck member 426 on the disc table 81, so that the optical disc may be rotated freely in unison with the disc table 81 without being impeded by any other components parts. Thus the loading of the optical disc D on the disc reproducing unit 301 comes to a close. Substantially simultaneously with completion of the loading operation of the optical disc D on the disc reproducing unit 301, the driving motor control switch 450 is actuated by the switch actuating piece provided on the second rotatable cam 440 so that the driving of the driving motor 441 of the disc reproducing unit rotating mechanism 400 comes to a close.

The operation of displacing the disc feed guide member 300 away from the optical disc D and the operation of enlarging the gap between the first and second arms 304, 305 come to a close substantially simultaneously with the completion of chucking of the optical disc D with respect to the disc table 81.

When the optical disc D is taken out of the disc housing unit 2 and loaded on the disc reproducing unit 301, rotation of the disc rotating mechanism 80 is started for rotating the optical disc D. Simultaneously, the optical pickup unit 82. starts to be driven for reproducing the optical disc D.

When reproduction of the optical disc D comes to a close, the driving motor 441 of the disc reproducing unit rotating mechanism 400 is run in reverse rotation and the second rotatable cam 440 is rotated in reverse so that the first and second arms 304, 305 and the disc feed guide member 300 are run in rotation by the reverse of the loading operation of the optical disc D. The disc driving unit supporting plate 390 and the chuck member support arm 427 are rotated in a direction of being moved away from the optical disc D. The driving motor 330 of the cam rotating and driving mechanism 307 is driven in reverse and the first rotatable cam 306 is driven in reverse in a direction opposite to that shown by arrow X in FIG. 25 for rotating the first and second arms 304, 305 towards the disc housing unit 2. The optical disc D carried by these first and second arms 304, 305 is inserted in the disc inserting slit 6 having the corresponding disc address of the disc housing unit 2 for completing the returning operation of the optical disc D.

The disc reproducing apparatus of the above-described embodiment of the disc reproducing apparatus employs the rotatable cams 306, 440 for the disc reproducing unit rotating mechanism 400 and the disc transporting mechanism 302, respectively, so that the disc reproducing unit rotating mechanism 400 and the disc transporting mechanism 302 may be reduced in size to allow further reduction in size of the disc reproducing apparatus.

The electrical circuitry of the disc reproducing apparatus according to the present invention will be explained by referring to FIG. 39. The electrical circuitry may be applied to both the above-described embodiments.

The electrical circuitry in the disc reproducing apparatus includes a detection circuit 151 made up of various sensors and switches, a driving control circuitry 152 for supplying the driving current to the driving motor as the driving source for various mechanisms provided in the disc reproducing apparatus and a controller 141 for outputting driving signals and control signals to the driving control circuitry 152 based upon various detection signals from the detection circuitry 151 and control signals from a system controller 154 which will be explained subsequently. In addition, the electrical circuitry includes the above-mentioned system controller 154 supplied with input signals from a variety of operating keys arranged on the operating panel 13 and registering the input signals as data in a memory 153. The electrical circuitry also includes a reproducing circuitry 155 for converting information signals reproduced from the optical pickup unit 82 of the disc reproducing unit 3 or 301 into output speech signals and taking out tracking error and focusing error signals from the information signals for supplying them to a servo circuitry, not shown.

To the system controller 154 are connected a number of LEDs corresponding to the number of the groups and a display unit 28 (FIG. 2) by means of a character display circuit, not shown. The memory 153 is comprised of an SRAM, for example, and a number of files associated with the disc numbers are logically allocated to the array variable regions of the SRAM. To the memory 153 is connected a back-up circuit 156 whereby data in the memory 153 is prevented from being erased even if the power source switch 15 provided on the operating panel 13 is turned off. The disc numbers are the numbers from "1" to "100" corresponding to the predetermined disc inserting slits 6 in the rotary table 5.

Figure 40:
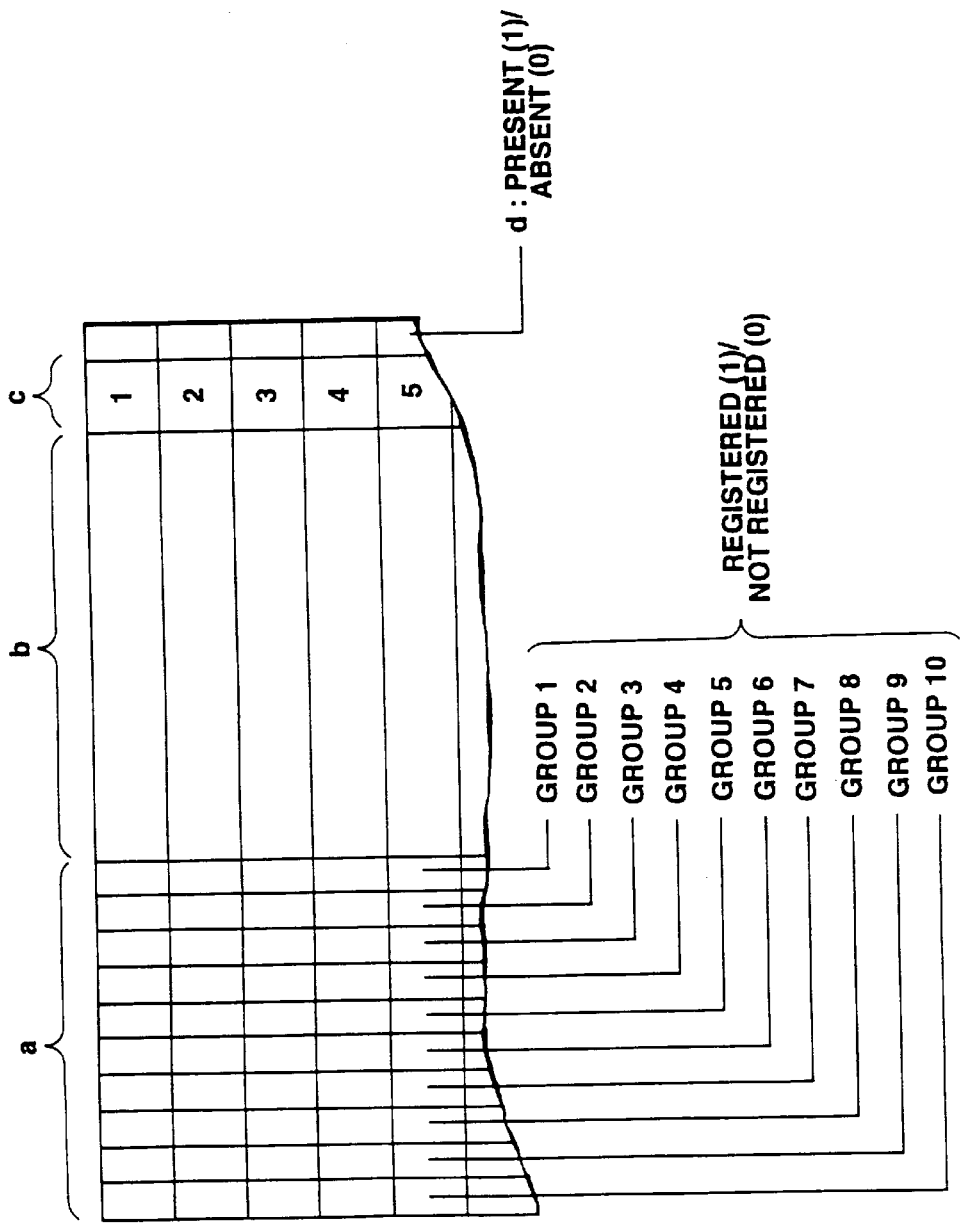
FIG. 40 is a diagrammatic view showing the construction of a file allocated to a memory of the disc reproducing apparatus according to the present invention.

Each file is made up of a flag area a in which bit allocation is made in association with the group numbers, a memo storage area b in which memoranda concerning the associated disc numbers are stored as code data in katakana letters or alphanumerics, a disc number register area c in which the disc numbers have been registered in accordance with the file sequence and a disc present bit (1)/disc absent bit (0), as shown in FIG. 40. The bits of the flag area a indicate whether the corresponding group has been registered. If "1" is set in each of the first, third and fifth bits, it indicates that the disc number has been registered in the groups 1, 3 and 5.

The operating keys connected to the system controller 154 are the keys and operating buttons arranged on the operating panel 13 shown in FIG. 2. However, for simplicity of explanation, only ten disc group designating keys 17 (17a, 17b, , 17j) rotary operating key 22 and a pushbutton switch 24 are shown in FIG. 39. The processing operations of the disc reproducing apparatus according to the present invention, above all, the group registering operation for grouping the 100 optical discs D set on the rotary table 5 according to disc groups, such as musicians, genres and users for control purposes, memo inputting operations for registering memoranda such as titles according to disc numbers and the operations of selecting and reproducing one of the 100 optical discs D, will now be explained by referring to flow charts of FIGS. 41 to 44.

Figure 41:
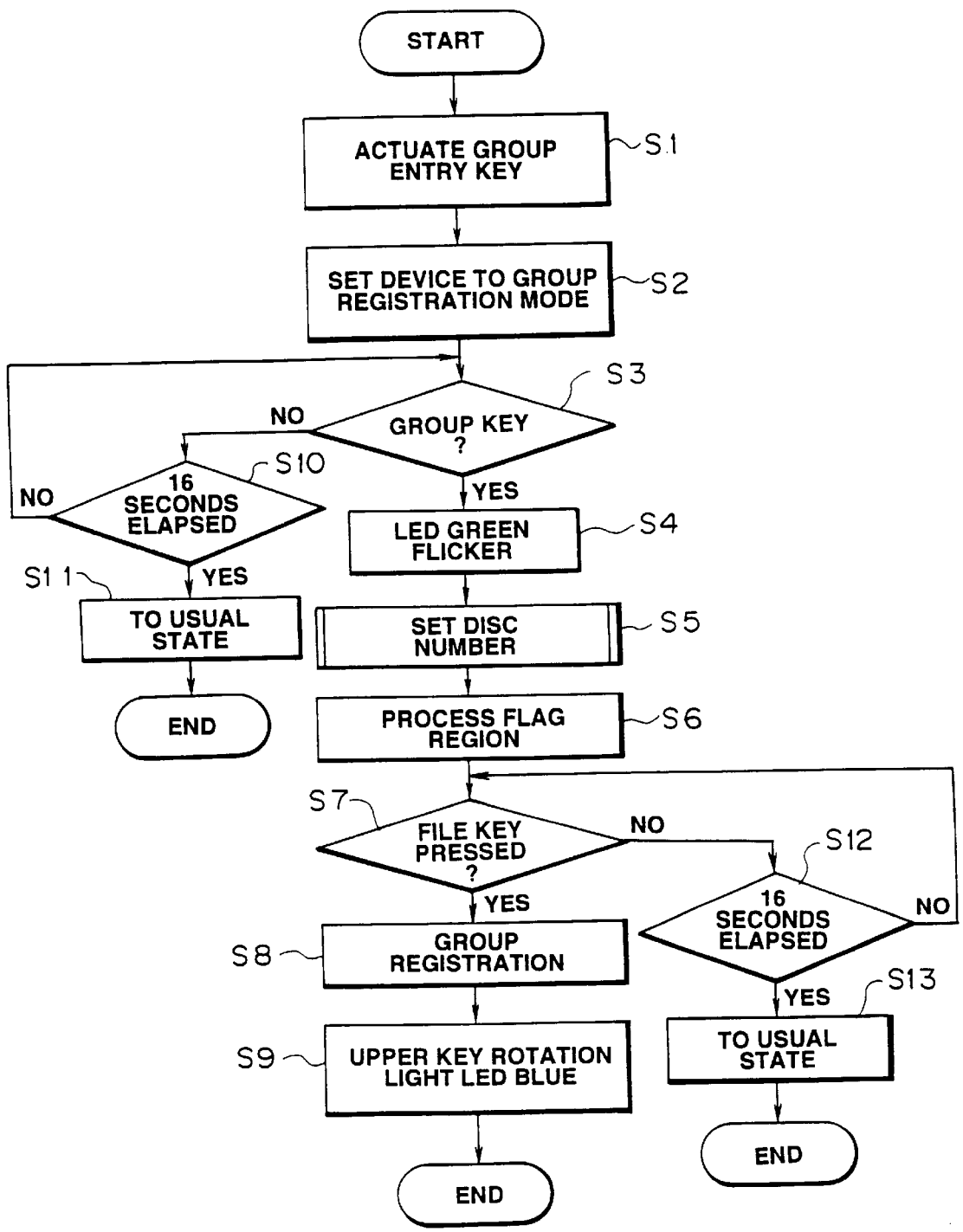
FIG. 41 is a flow chart showing the operational sequence of group registration in the disc reproducing apparatus according to the present invention.

Referring to FIG. 41, the group registering operation is started on actuation of a group entry key 24 (step S1). The program for group registration is transferred to the RAM region of the system controller 154 and the reproducing apparatus is set to the group registration mode (step S2).

At the next step S3, it is checked whether any one of the ten group keys has been actuated. If one of the disc group designating key 17 is pressed, processing proceeds to a step S4 for turning the LED arranged on the actuated disc group designating key 17 on and off, while displaying the group number corresponding to the actuated disc group designating key. Processing then transfers to a disc number setting routine (step S5).

Figure 42:
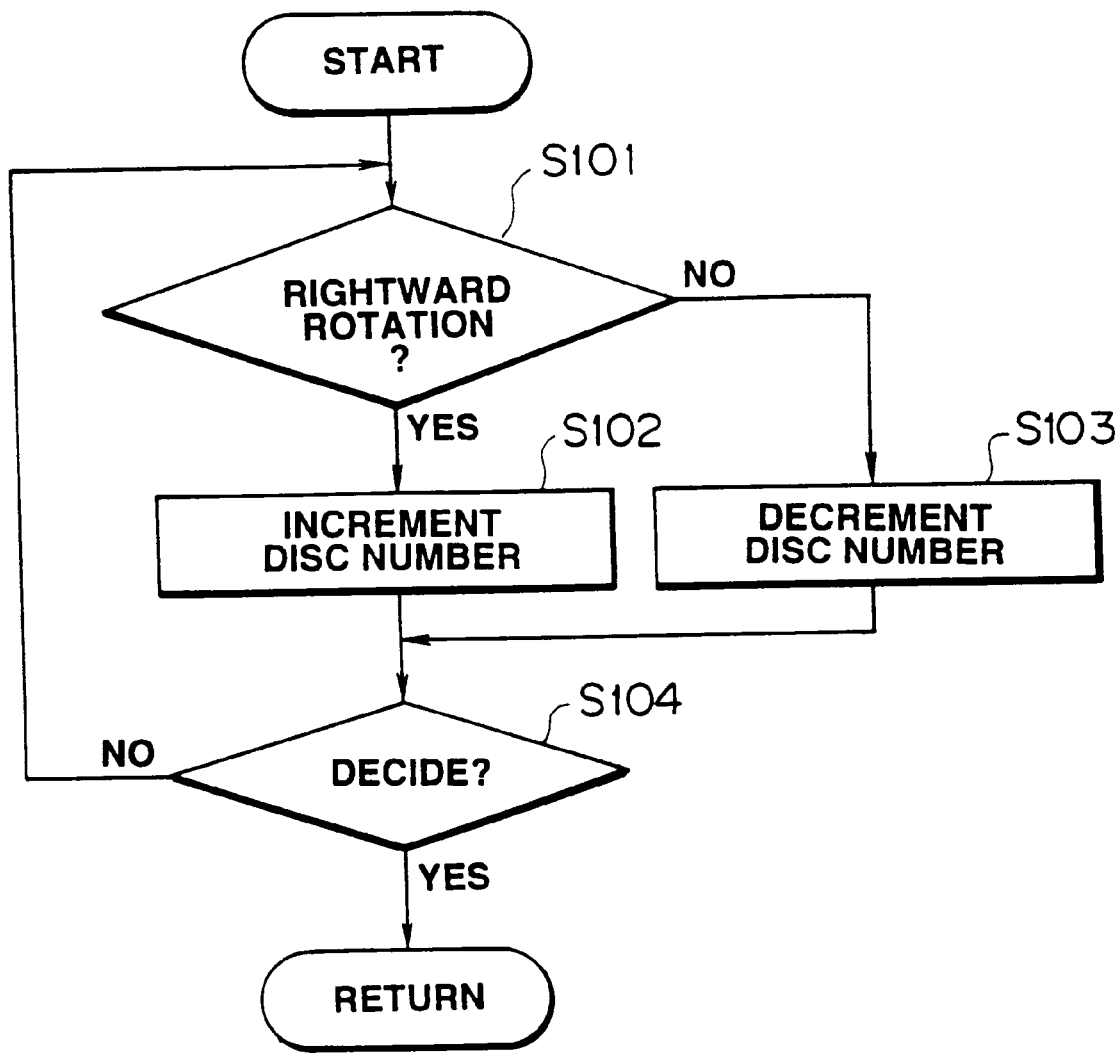
FIG. 42 is a flow chart showing the operational sequence of disc number setting in the disc reproducing apparatus according to the present invention.

With the disc number setting, it is checked whether the rotary operating key 22 has been rotated towards the right or clockwise at the step S101, as shown in FIG. 42. If the rotary operating key 22 is rotated clockwise, processing transfers to a step S102 where the disc number currently displayed or the first disc number display area 31a is incremented by one. If the displayed disc number is 100", the display "1" is made.

If the rotary operating key 22 is rotated leftwards, processing transfers to a step S103 where the disc number currently displayed on the first disc number display area 31a is decremented by one. If the displayed disc number is "0" or "1", the display "100" is made.

At each display of the disc number, it is checked whether the pushbutton switch 24 has been pushed. If the pushbutton switch 24 has not been pushed, processing reverts to the step S101 where it is checked whether the rotary operating switch 22 has been rotated rightwards and the routine of the steps S101 to S104 is repeated until the pushbutton switch 27 has been pushed. When the pushbutton switch 24 is actuated, the disc number currently displayed in, for example, the working area for disc numbers is stored at the time of actuation of the pushbutton switch 24. The processing then comes to a close.

Reverting to the processing routine of FIG. 41, one of a large number of files associated with the disc numbers stored in the working area for the disc numbers is read out at the next step S6 into the RAM area, and the bits corresponding to the group number of the actuated disc group designating key in the flag area a of the read-out file are set.

At the next step S7, it is checked whether the file key 23 has been actuated. If the file key 23 has been actuated, processing traverses to a step S8 where the file on the RAM region is registered in the original file on the memory based upon the disc number stored in the working area for the disc numbers (overwriting).

At the next step S9, the LED arranged on the upper portion. of the actuated disc group designating key 17 is turned or to a green tint. This completes the group registering operation.

On the other hand, if it is found at the step S3 that the disc group designating key 17 has not been pushed, processing traverses to a step S10. This step S10 is a step of awaiting the entry operation by the disc group designating key 17 for a certain time interval, herein for 16 seconds. If there is no entry at the disc group designating key 17 after lapse of 16 seconds, the state prior to the step S1, that is, the usual key entry awaiting state, referred to herein as an ordinary state. The processing then comes to a close (step S1).

If it is found at the step S7 that the file key 23 has not been pushed, processing traverses to a step S12. The step S12 is a step of awaiting the entry operation at the file key 23 for a certain time, herein for 16 seconds. If there is no entry at the file key 23 even after lapse of 16 seconds, reversion is made to the ordinary state at step S13 before the processing comes to a close.

Figure 43:
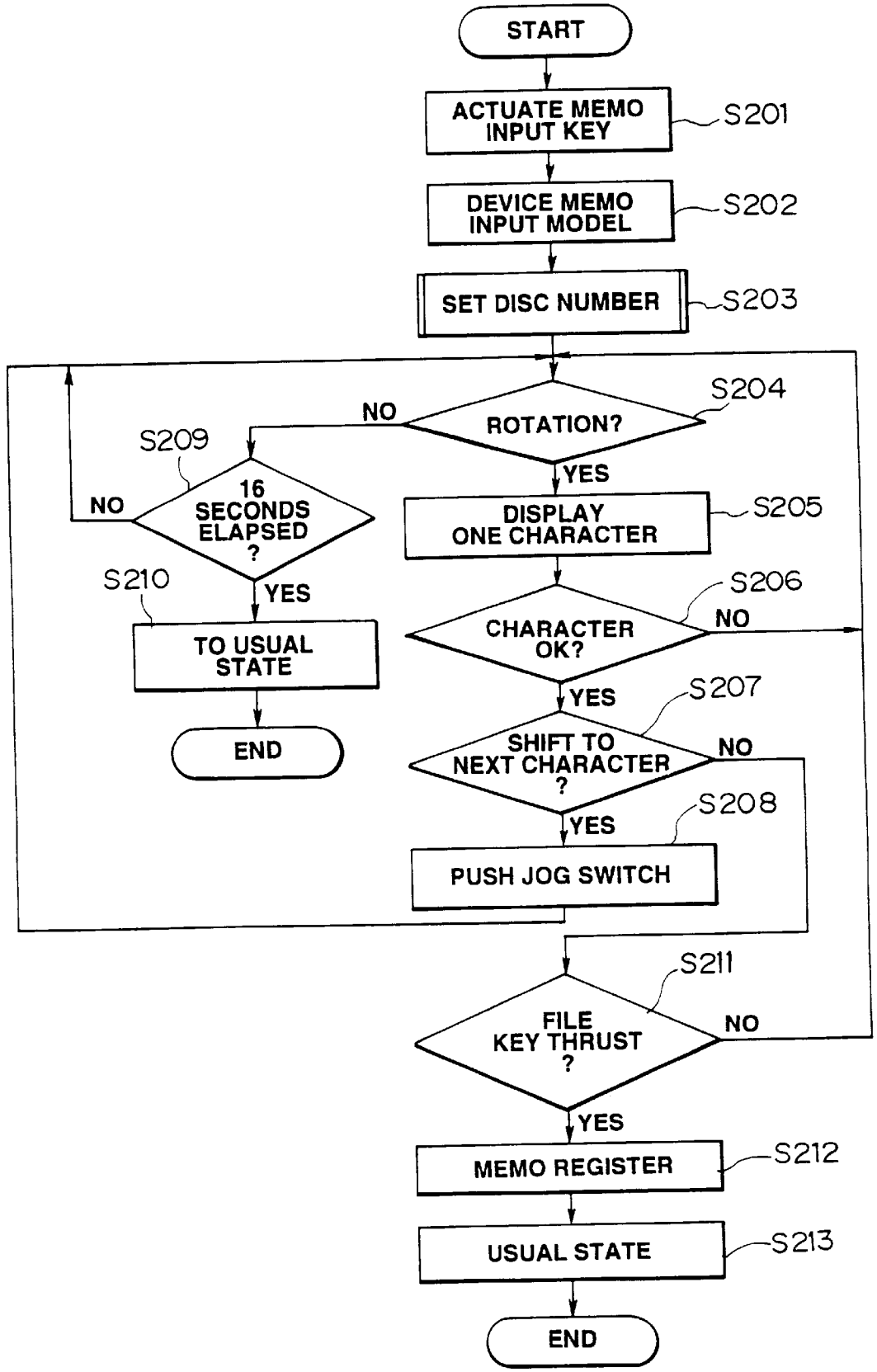
FIG. 43 is a flow chart showing the operational sequence of memory inputting in the disc reproducing apparatus according to the present invention.

Referring to FIG. 43, the memo entering operation is started by actuating the memo entry key 20 at step S201. The program for memo entry is transferred to the RAM region of the system controller 154 and the reproducing apparatus is set to the memo entry mode at step S202. At this time, a cursor for entry is displayed at a leading digit of the memo display in the memo display area 30 of the display unit 28.

Processing then enters into a disc number setting routine at step S203. The disc number setting routine has been explained previously and hence the description is not repeated for clarity.

At the next step S204, it is checked whether the rotary actuating key 22 has been pushed. If the rotary actuating key 22 is pushed, processing traverses to the next step S205 where the letters or numerals displayed at the cursor position are updated in an amount corresponding to the number of clicks of the rotary actuating key 22. If the letter or numeral displayed at the cursor position is a letter "M", for example, and the rotary actuating key 22 is rotated clockwise by click+1, the display is updated in the positive direction of the alphabetic order, so that the display is changed to the letter "N". Conversely, if the rotary actuating key is rotated counterclockwise by click−1, the display is changed to the letter "L".

This processing is continued until the letter or numeral satisfactory for registration is displayed at the digit where the cursor is positioned (step S206). If it is desired to shift the cursor to the next digit, the pushbutton switch 24 is actuated (steps S207, S208). After the cursor is shifted to the next digit, the rotary actuating key 22 is actuated for updating until the satisfactory letter or numeral is displayed in the digit location. The memo data thus prepared is transiently stored in the working area or memo on the RAM region.

If it has been found at the step S204 that the rotary actuating key 22 has not been pushed, processing transfers to a step S209. This step S209 is a step of awaiting the entry at the rotary actuating switch 22 for a certain time, herein for 16 seconds. If there is no entry at the rotary actuating key 22 even after lapse of 16 seconds, reversion is made to the ordinary state at a step S213 before the processing comes to a close.

If, at the step S207, there is no necessity of proceeding to the next digit, processing transfers to a step S211, where it is checked whether the file key 23 has been pushed. This file key 23 is used for checking whether the memo entering processing has come to a close. If the file key 23 is actuated, processing transfers to the next step S212 where memo data stored in the working area is registered in the memo storage area b of one of the large number of files registered in the memory 153 which corresponds to the disc number stored in the working area for the disc numbers. Reversion is made subsequently to the ordinary state at the step S213 before processing comes to a close.

Figure 44:
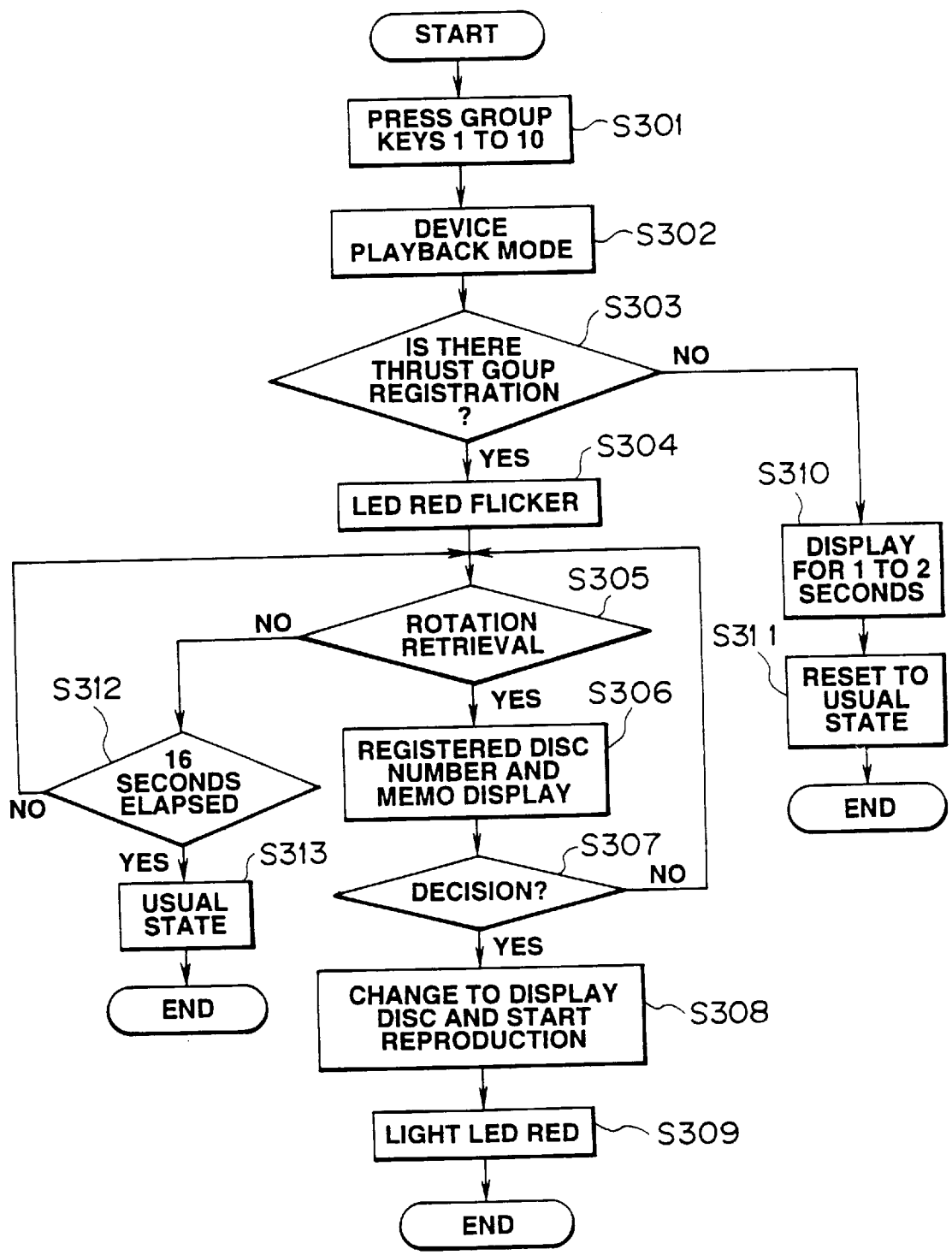
FIG. 44 is a flow chart showing the operational sequence of reproduction in the disc reproducing apparatus according to the present invention.

Referring to FIG. 44, the playback operation is started at a step S301 by actuation of the disc group designating key 17 for transferring the program for playback operations to the RAM region of the system controller 153 for setting the disc reproducing apparatus to a playback mode at a step S302. At this time, the group number corresponding to the actuated disc group designating key 17 is displayed in the group number display region 29.

At the next step S303, one of the files registered in the memory 153 in which the bit corresponding to the group number of the flag area A is "1" is retrieved and the corresponding files are read out in their entirety in the order of the disc numbers into the working area for files of the RAM region. If, in the course of the retrieval operation, there is any file in which the above-mentioned group number has been registered, processing transfers to the next step S304, where the LED arranged at an upper portion of the actuated disc group designating key 17 is turned on in red tint. From this state, the state of awaiting the entry at the rotary actuating key 22 is established, that is, it is checked at a step S305 whether the rotary actuating key 22 has been pushed.

If the rotary actuating key 22 has been pushed, processing transfers to the next step S306, where the file of the group of files read out into the RAM region is sequentially updated responsive to the rotation of the rotary actuating switch 22 and the disc number of the updated file registered in the disc number registration area g and the memo stored in the memo storage area b are displayed in the first disc number display area 31a and the memo display area 30 of the display unit 28. In addition, in the present embodiment, the disc number registered in the disc number registration area g of the file to be updated next is displayed in the second disc number display area 31b of the display unit 28. Additionally. if the disc present (1)/disc absent (0) bit of the updated file is "0", a message "no disc" indicating that there is no optical disc D set is displayed in the memo storage area 30 of the display unit 28.

Each time the disc number and the memo are displayed, it is checked at the next step S307 whether the pushbutton switch 24 has been pushed. If the pushbutton switch 24 is not actuated, processing reverts to the step S305 in order to check whether the rotary actuating key 22 has been pushed. The routine of the steps S305 to the step S307 is repeated until actuation of the pushbutton switch 24 occurs.

If the pushbutton switch 24 is pushed, processing transfers to a step S308 where information signals are reproduce from the optical disc D having the displayed disc number. That is, at a time point when the pushbutton switch 24 has been pushed, the system controller 154 transmits to the controller 141 the data indicating the device number of the driving device and a signal requesting the driving of the driving device. The object or driving herein is the driving motor 45 of the housing unit rotational driving mechanism 41.

The controller 141 analyzes data supplied from the system controller 154 and routes a driving signal and a deceleration request signal to the driving control circuit of the driving control circuitry 152 which corresponds to the driving motor 45 of the housing unit rotating and driving mechanism 41 which is the driving device. As a result, a driving current is supplied from the driving control circuit for the driving device to the driving motor 45 of the housing unit rotating and driving mechanism 41 for running the rotary table 5 into rotation.

Simultaneously with the rotation of the rotary table 5, the rotational position of the rotary table 5 is detected by the disc housing unit rotational position detection mechanism 44 shown in FIG. 3. A stop signal is output to the controller 141 at the time when the optical disc D having the selected disc number in subject has reached the takeout enabling position by the optical disc transporting mechanism 42 or 302. The controller 141 outputs the stop signal to the driving control circuit of the driving motor 45 of the housing unit rotating and driving mechanism 41 based upon the routing of the stop signal from the disc housing unit rotational position detection mechanism 44. This interrupts the routing of the driving signal to the driving motor 45 from the driving control circuit for halting the rotary table 5. That is, the rotary table 5 is halted when the optical disc D having the selected disc number has reached the takeout enabling position by the transporting mechanism 42 or 302.

The system controller 154 then routes a signal commanding the control to be transferred to the disc transporting mechanism 42 to the controller 141. Based on such command signal, the controller 141 outputs a driving signal to the driving control circuits associated with the driving motors 61 or 330 for the disc transporting mechanisms 42 or 302, respectively. Based on the driving signal supplied from the controller 141, the driving control circuit causes the driving current to flow through the driving motors 61 or 330 for the disc transporting mechanisms 42 or 302 for rotating the rotary disc 60 or the first rotatable cam 306. By such rotation of the rotary disc 60 or the first rotatable cam 306, the first arm 54 or 305 and the second arm 55 or 305 making up the disc feed mechanism as mentioned above are rotated in order to take out the optical disc D housed within the disc housing unit 2 and in order to transport the optical disc D thus taken out to the disc loading position of the disc reproducing unit 2 or 302.

When the optical disc D selected from the disc housing unit 2 is routed to the disc loading position by the disc feed mechanism 50 or 303, the two-position switch 72 or the control switch 324 is actuated by the rotary disc 60 or the first rotatable cam 306 for detecting that the optical disc D has been transported to the disc loading position. A detection signal detecting the end of disc transport is output from the two-position switch 72 or the control switch 324. Based on such detection signal, the controller 141 outputs a stop signal to a driving control circuit for the driving motors 61 or 330 of the disc transporting mechanism 42 or 302. This interrupts the supply of the driving current from the driving control circuit to the driving motors 61 or 330 for halting the rotation of the rotary disc 60 or the first rotatable cam 306.

The system controller 154 then routes to the controller 141 a signal commanding the transfer of the control operation to the vertical movement mechanism 102 shown in FIG. 17 or to the disc reproducing unit rotating mechanism 400. Based on such command signal, the controller 141 outputs a driving signal to the driving motor 103 of the vertical movement mechanism 102 or to the driving motor 441 of the disc reproducing unit rotating mechanism 400. Based on the driving signal from the controller 141, the driving control circuit causes the driving current to flow through the driving motor 141 of the vertical movement mechanism 102 or the driving motor 441 of the disc reproducing unit rotating mechanism 400 in order to rotate the main gear 106. With rotation of the main gear 106, the optical disc D transported to the disc loading position is chucked on the disc reproducing unit 43 or 301.

The system controller 154 then routes a signal commanding the transfer of the control operation to the disc reproducing unit 43 or 301 to the controller 141. Based on such command signal, the controller 141 supplies the current to the disc rotating mechanism 80 of the disc reproducing unit 43 or 301 for unidirectionally rotating the optical disc D in unison with the disc table 81 and for moving the optical pickup unit 82 radially of the optical disc D for reproducing the pit information corresponding to the information signals recorded on the optical disc D. The playback signals from the optical pickup unit 82 are supplied to the reproducing circuitry 155 where they are separated into speech signals, tracking error signals and focusing error signals. The speech signals are outputted at an output terminal øout of the reproducing circuitry 155, while the tracking error signals and focusing error signals are supplied to a servo circuitry, not shown.

The system controller 154 turns on the LED arranged at an upper portion of an actuated disc group designating key in red hue at a time when the playback operation for the optical disc D loaded on the disc reproducing unit 43 or 301 is started (step S309).

If there is no optical disc inserted in the disc inserting slit 6 having the designated disc number in the disc housing unit 2, such that there is no optical disc to be transported by the disc transporting mechanism 42 or 302, the disc presence/absence detection switch 70 or 319 is actuated by the second arm 55 or 305 constituting the disc feed mechanism 50 or 303. Such actuation of the detection switch 70 or 319 produces an output detection signal which is routed via the controller 141 to the system controller 154. The system controller 154 converts to "0" the disc present/absent pit of the file among a large number of files read out into the RAM region which corresponds to the disc number of the optical disc D to be reproduced, and registers the converted pit "0" before proceeding to a step S309.

At the stage of completion of the processing of the step S309, a large number of files on the RAM region are overwritten on the corresponding ones of one hundred files on the memory 153 to complete a series of processing operations.

If it is found at the step S303 that the group corresponding to the actuated disc group designating key 17 has not been registered, processing transfers to a step S310 in order to display in, for example, the memo display area 30 of the display section 28 an error message (e.g., "no entry"), for e.g., 12 seconds. On completion of the error message, processing transfers to a step S311 where reversion is made to the ordinary state before the program comes to a close.

If it is found at the step S305 that the rotary actuating key 22 has not been actuated, processing transfers to a step S312. This step S312 is a step of awaiting the entry by the rotary actuating key 22 for a certain time, herein 16 seconds. If there is no entry by the rotary actuating key 22 after lapse of 16 seconds, reversion is made to the ordinary state (step S313) before the processing comes to a close.

If, in the present disc reproducing apparatus, only the rotary actuating key 22 is actuated from the ordinary state, the optical disc D is reproduced based on the file which is currently read into the file working area of the system controller 154. That is, the rotary actuating key 22 is rotated for sequentially updating the files and the optical disc D having the disc number registered in the disc number registration area g of the updated file is reproduced. Of course, the disc number of the optical disc D to be reproduced is displayed in the first disc number display region 31a and the disc number of the optical disc D to be reproduced next is displayed in the second disc number display region 31b.

The above description of the playback rode mainly refers to continuous playback mode, generally termed the continue-mode. If the continue-mode is desired to be set, the continue key, disposed at the leftmost side, of three mode setting keys 201, 202 and 203, arranged at the upper right-hand side in the lower mid portion of the operating panel 13, may be set for operation. At this time, the LED arranged above the key 201 is turned on.

The remaining two modes, that is, an unordered playback mode, generally referred to as a shuffle mode, and a program mode, may be established by actuating a centrally disposed shuffle key 202 and a right-hand side program key 203, respectively. At this time, the LEDs arranged above the keys 202, 203 are turned on selectively.

Similarly to the continue-mode, the shuffle mode is a playback mode in which, while the optical discs are reproduced based on the file as read out into the file working area of the RAM region of the system controller 154, the optical disc D to be reproduced next is selected at random with the rotary actuating key 22. That is, the rotary actuating key 22 is rotationally actuated for selecting one of the disc numbers of the files read out into the file working area at random for setting the optical disc D to be reproduced next. In such case, the selected disc number is displayed in the second disc number display region 31b.

The program mode is a playback mode in which the order of files read out into the file working area of the RAM region of the system controller 154 is changed with the rotary actuating key 22 and the optical discs are reproduced based on the so-modified files. In such case, playback is performed in the order of the files, as in the case of the continue-mode. The disc number concerning the file next to the file being reproduced is displayed in the second disc number display region 31b.

Since the various data are updated in the present disc reproducing apparatus with the aid of the rotary actuating key 22, the large number of keys, such as are usually required in the reproducing apparatus capable of reproducing a large number of optical discs D for entering and updating purposes, may be replaced by the sole rotary actuating key 22, with the result that the key array on the operating panel 113 may be simplified. In addition, since data updating may be performed by a simplified rotational operation, the operation of data registration, which usually requires a complex operation, may be achieved easily, thereby improving the convenience of the disc reproducing apparatus. In addition, since the memo is registered for each disc number, group registration may be achieved while reference is had to the disc number and its memo, with the result that the confirmation may be made easily during registration with the least risk of mistaken registration.

Furthermore, the disc number currently reproduced is displayed in the first disc number display region 31*a*, and the disc number reproduced next is displayed in the second disc number display region 31*b*, it becomes possible to resolve the inconvenience in the disc reproducing apparatus capable of reproducing the large number of the optical discs D, that is, the inconvenience that the disc to be reproduced next is unknown and the corresponding disc number needs to be confirmed by a corresponding key operation, thereby further improving the convenience.

In the above-described embodiment, data updating and setting is carried out using the rotary actuating key 22 and the pushbutton switch 24 installed on the operating panel 13. Alternatively, a rotary actuating key and a pushbutton switch similar to them may also be provided on a remote controller for data updating and setting by a remote control operation.

Although a single memo is registered for each disc number, it is possible to modify memo contents among the groups for a given disc number.

Although the recording/reproducing apparatus according to the present invention is applied to a reproducing apparatus for optical discs, it may also be applied to a reproducing apparatus for other types of the disc-shaped recording media, such as magneto-optical discs.

It is noted that, if a plurality of optical discs D are housed within the rotary table 5 of the disc housing unit 2 as described above, there may be occasions wherein a plurality of optical discs D owned by a mother and a plurality of optical discs D owned by a father co-exist with the result that it becomes extremely difficult to select desired optical discs D from the plural optical discs D. On the other hand, it is only a rare occurrence that all of the music selections recorded on the single disc D are to be reproduced, while it is more common to select only one or more desired music selections for reproduction. In this consideration, it would be convenient if only favorite optical discs D and favorite music selections could be stocked.

With the reproducing apparatus, such function is afforded to first to fourth music clip keys 251 to 254 shown in FIG. 2.

If such music clip keys 251 to 254 are used, different keys are preferably owned by different users, for example, the first music clip key 251 and the second music clip key 252 are owned by mother and father, respectively.

Figure 45:
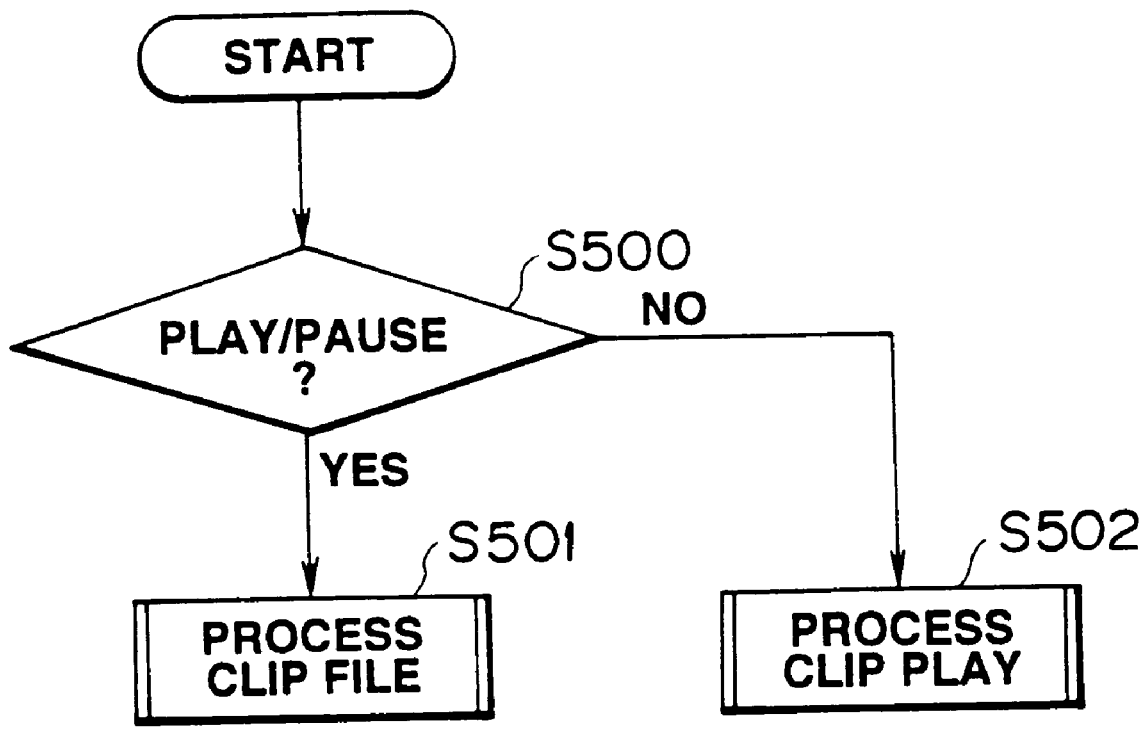
FIG. 45 is a flow chart for illustrating a selecting operation for clip filing and clip playing in the disc reproducing apparatus according to the present invention.

With such reproducing apparatus, whether a clip file of group registration of the music selection or replay of the previously clip-filed music selection is to be performed is determined depending on the status of the reproducing apparatus when the music clip keys 251 to 254 are turned on, as shown in the flow chart of FIG. 45.

The flow chart shown in FIG. 45 is started by the power on of the main power source, and processing first proceeds to a step S500.

Figure 39:
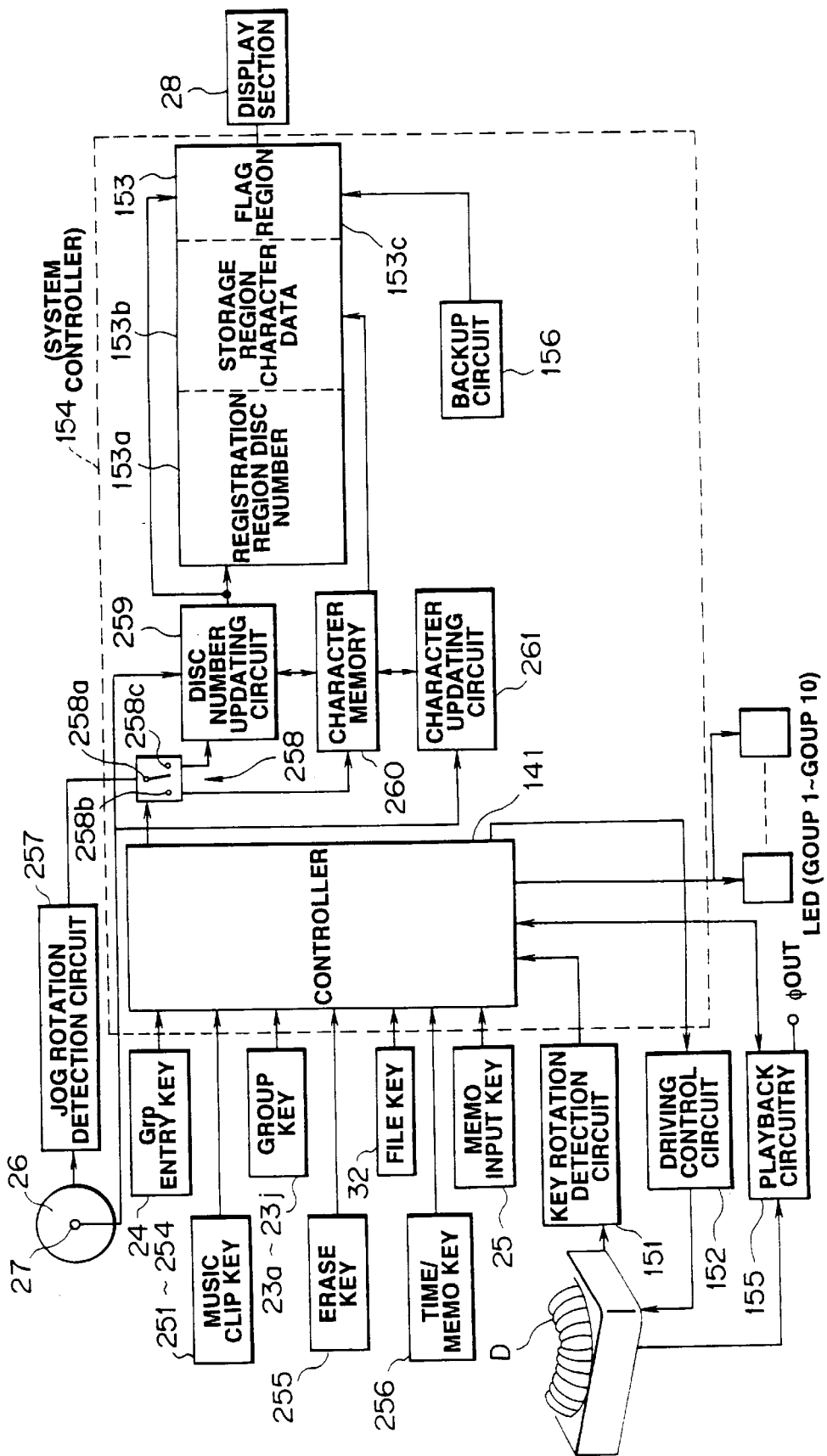
FIG. 39 is a block diagram showing a circuit system of a disc reproducing apparatus according to the present invention.

At the step S500, it is determined by the system controller 154 shown in FIG. 39 whether the designated music selection is being reproduced or in the playback paused state. If the result is YES, processing transfers to a step S501 in order to execute the processing routine for the clip file and, if the result is NO, processing transfers to a step S502 in order to execute the processing routine for the clip play which is the playback of the previously clip-filed music selection.

Figure 46:
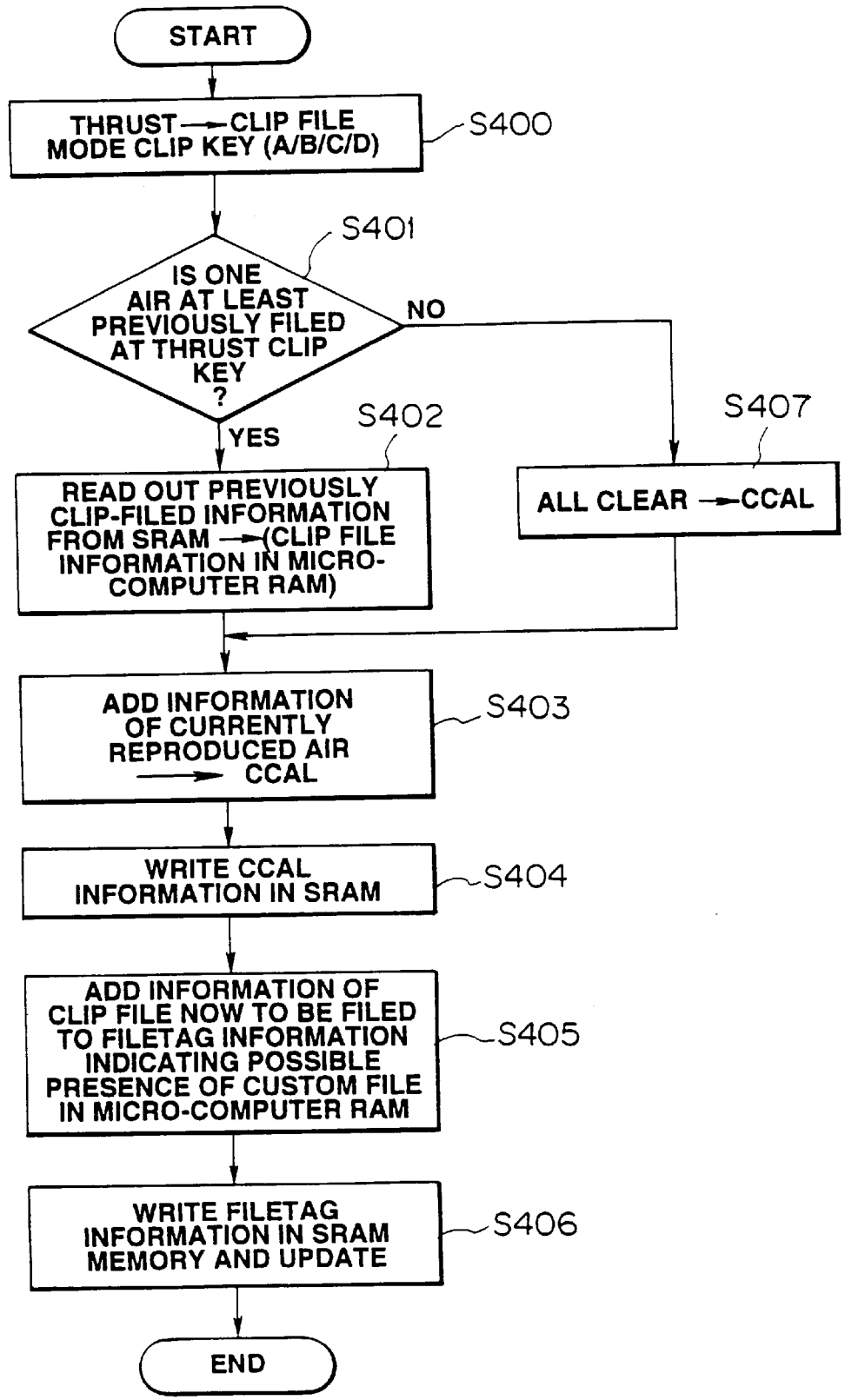
FIG. 46 is a flow chart for illustrating the clip filing in the disc reproducing apparatus according to the present invention.

The processing routine for the clip file is as shown in a flow chart shown in FIG. 46.

That is, the flow chart shown in FIG. 46 is started when one of the music clip keys 251 to 254 is turned on during the playback state or during the playback-paused state, and processing first proceeds to a step S400.

At the step S400, the system controller 154 detects the music clip key which has been turned on, and controls the display 28 for displaying a letter "clip file", for example, and flickering the displayed letter. The system controller 154 causes data indicating the turned-on music clip key to be transiently stored in a memory provided in the system controller 154. Processing then transfers to a step S401. The memory, not shown, is referred to herein as CLIPTBL.

At the step S401, it is checked by the system controller 154 whether a plurality of registration data indicating addresses or music selection numbers of music selections clip-filed in the past, referred to collectively as CCAL, have been recorded in the memory 153, such as an S-RAM, in order to check whether there is any clip-filed music selection for the turned-on music clip key. If the result is YES, processing transfers to a step S402 and, if the result is NO, processing transfers to a step S407.

At the step S402, since the CCAL has been stored in the memory 153, the system controller 154 reads out the totality of the CCAL of the clip files from the memory 153. Based on the CCAL, the system controller 154 controls a music calendar 31*c* and the display 28 so that the title occasionally affixed to the clip file during the clip memo mode as later explained is displayed. The music calendar 31*c* is constituted by the file numbers of the clip-files and the music selection numbers of the totality of music selections making up the clip-file. Processing then transfers to a step S403.

On the other hand, at the step S407, since no CCAL belonging to the clip file is stored in the memory 153, the system controller 154 clears the CCAL before proceeding to the step S403.

At the step S403, the system controller 154 controls the display unit 28 so that the music selection number or the like of the music selection currently reproduced or currently in the playback-paused state is displayed in the display section. Processing then transfers to a step S404.

At the step S404, the system controller 154 controls the writing in the memory 154 in such a manner that the registration information indicating the table-of-contents (TOC) data of currently reproduced or replay-paused music selections, the numbers of the currently reproduced optical discs D or the music selection number indicating the music selection arraying sequence in the clip file is newly written in a disc number registration region 153*a*. Processing then transfers to a step S405. The number of the optical disc D may be the number indicating the position corresponding to the disc inserting slit 6 of the disc table 5, or may be the number of the optical disc D itself.

If a title or the like is affixed to the clip file with the clip memo mode as later explained, such title data is written as character data in a character data recording area 153*b*.

At the next step S405, if the system controller 154 registers the registration information for the first time in the clip file, the system controller formulates data indicating that the registration information has been registered in the clip file, referred to hereinafter as file tag, before proceeding to a step S406.

At the step S406, the system controller 154 controls the writing in the memory 153 for causing the file tag to be written in a flag region 153c. The system controller also lights the LED provided on the music clip key which has been turned on and also controls the display on the display unit 28 so that letters "clip file" in a flickering state are illuminated for a predetermined time. The system controller also controls the display on the display unit 28 for displaying the music calendar indicating the music selection numbers in the clip file to complete the routine of the clip file. This permits the user to recognize that the music selections has now been clip-filed.

In this manner, by a simplified operation of turning on the desired music clip keys 251 to 254 during replay or replay-pause of a desired music selection. such music selection may be music-clipped. Consequently, data of plural desired music selections (the above-mentioned CCAL) may be grouped and stored in the memory 153 by repeating replay or replay pause of the desired music selections and turn-on of the music clip key as described above.

If the user has operated the music clip key in an effort to clip file the music selection currently reproduced, and subsequently has become aware that such is in error, the user turned on the same music clip key a second time during replay of the music selection. The system controller 154 then controls the display unit 28 for illuminating the letters "clip file" in a flickering manner. The user turns on an erase key 255 as later explained during the flickering of the letters "clip file". The system controller 154 controls the memory 153 to erase the registration information of the currently reproduced clip-filed music selection from the clip file.

Figure 47:
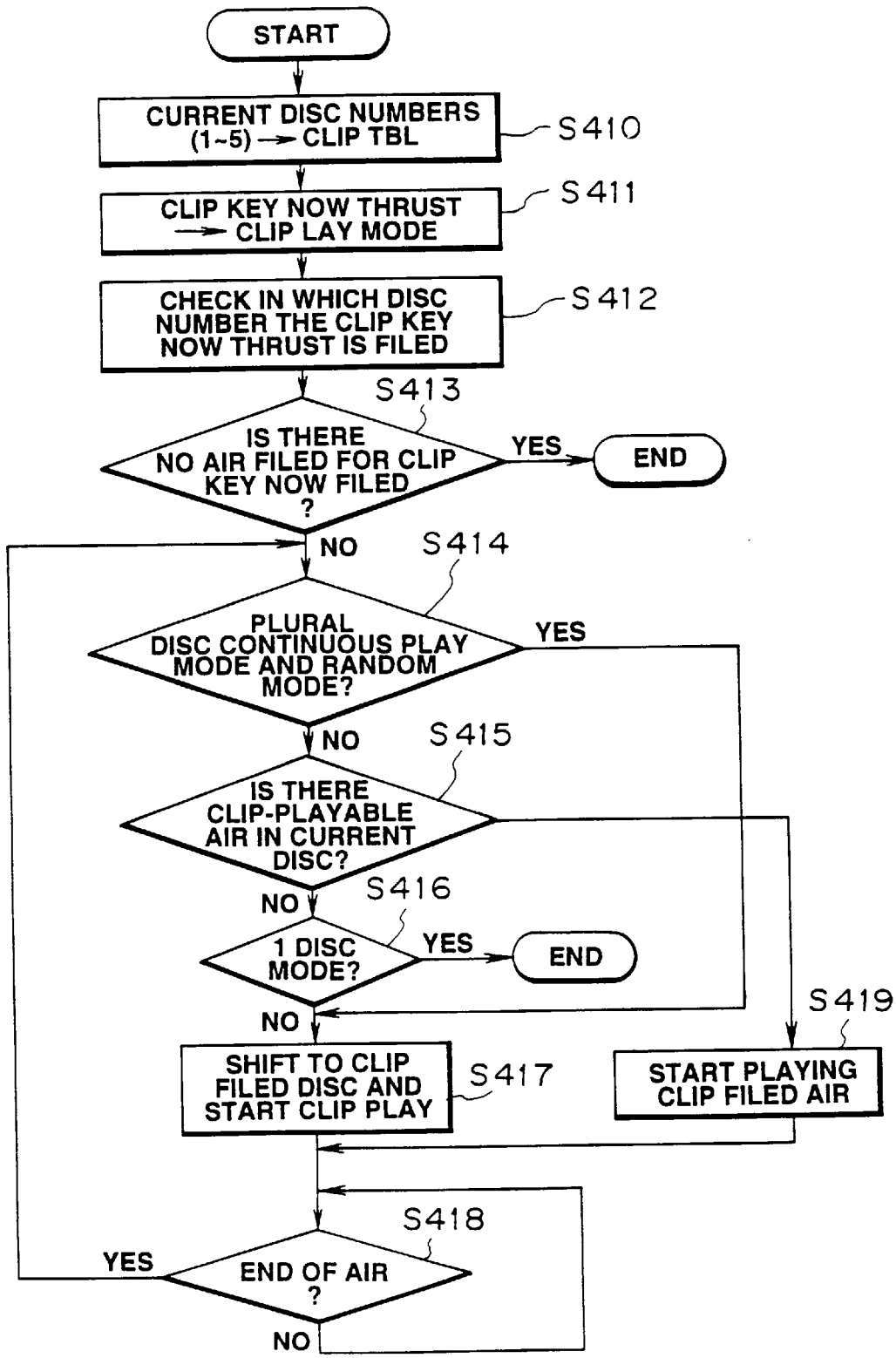
FIG. 47 is a flow chart for illustrating the clip playing in the disc reproducing apparatus according to the present invention.

The reproduction of the music-clipped music selection (clip-play) is performed in accordance with a routine indicated by a flow chart shown in FIG. 47.

The flow chart shown in FIG. 47 is started when one of the music clip keys 251 to 254 is turned on except during the replay or replay-pause, for example, during stop, fast feed or fast rewind. The flow chart is started at a step S410.

At the step S410, in order that the optical disc D loaded on the reproducing unit is enabled to be reproduced when there is no music-clipped music selection in the music clip file for the presently actuated music clip key, the system controller 154 causes the disc number of the optical disc D loaded in the reproducing unit to be stored in the RAM in the system controller (CLIPTBL). Processing then transfers to a step S411.

At the step S411, the system controller 154 stores data indicating the music clip key turned on in CLIPTBL. Processing then transfers to a step S412.

At the step S412, the system controller 154 retrieves the registration of the music selection of the clip file of the music clip key which has been turned on. Processing then transfers to a step S413.

At the step S413, the system controller 154 checks whether a musical selection has been registered in the clip file. If there is an air registered in the clip file, processing transfers to a step S414. If there is no file registered in the clip file, the routine is directly brought to an end.

Meanwhile, if there is no air registered in the clip file indicated by the music clip key, the system controller 154 controls the display unit 28 for displaying letters "no file".

Thus the user is apprised of the fact that there is no air registered in the clip file indicated by the music clip key.

At the step S414, the system controller 154 decides whether or not plural disc consecutive play mode of designating and sequentially reproducing plural optical discs D has been designated and the random play mode of designating random play of music selections recorded on the optical disc D has been designated. If the result of decision is YES, processing transfers to a step S417 and, if it is NO, processing transfers to a step S415.

At the step S415, the system controller 154 decides whether there is recorded a clip-filed music selection on the optical disc D currently loaded in the reproducing unit. If the result of decision is YES, processing transfers to a step S419 and, if it is NO, processing transfers to a step S416.

At the step S419, since the clip-filed music selection is recorded on the currently loaded optical disc D, the controller 154 controls the rotary table 5 in such a manner that the CCAL indicating the addresses of the clip-filed music selections is read out from the memory 153 and the optical disc D having the music selection recorded therein is loaded in the reproducing unit. The controller also controls the reproducing circuitry 155 so that the address of the clip-filed music selection is accessed and the music selection is reproduced. Processing then transfers to a step S418. Thus the clip-filed music selection is reproduced.

On the other hand, the system controller 154 controls the display unit 28 so that, if the title, for example, is affixed to the reproduced music selection based on the CCAL as explained subsequently, such title is read out from the character data storage area of the memory 153 and displayed. Thus the user is apprised of the name, for example, of the music selection currently reproduced. During such clip play, the system controller 154 controls the display unit 28 for illuminating the LED indicating the usual playback state for displaying the letters "clip play", for example, while also controlling the display unit 28 for displaying the music selection number 31a of the music selection currently reproduced, the clip file number, the number 31b of the music selection scheduled to be reproduced next and a music calendar 31c indicating the number of all of the music selections of the clip file.

Thus the user is apprised of the next music selection to be reproduced. Consequently, if the user intends to skip the next music selection, for example, he or she may select the following music selection, using a music selection skip key, on completion of reproduction of the current music selection.

At the step S416, the system controller 154 decides whether the present mode is the one-disc mode of reproducing only the currently loaded disc D. If the result of decision is YES, the routine is brought to an end because there is no clip-filed music selection on the currently loaded disc D. If it is YES, processing transfers to a step S417.

If the current mode is the one-disc mode, and the clip-play is not possible, the system controller 154 controls the display unit 28 to display letters such as "the mode is one-disc mode and hence next clip play is not possible". Thus the user is apprised of occurrence of an unavailable operation.

The step S417 is a step to which processing proceeds when it is determined at the step S414 that the current mode is the plural disc continuous play mode and moreover the random play mode, and when it is determined at the step S416 that the current mode is not the one-disc mode. At the step S417, the system controller 154 reads out the clip-filed CCAL from the memory 153 and controls the rotary table 5 so that the optical disc D to be reproduced based on the CCAL is loaded on the reproducing unit, while controlling the playback circuitry 155 so that the address of the clip-filed music selection on the disc D is accessed and the clip-filed music selection is reproduced. Processing then transfers to the step S418. Thus the clip play is carried out, that is the clip-filed music selection is reproduced.

At the step S418, the system controller 154 determines whether the replay of the clip-filed music selection has come to an end. If the result of decision is NO, the step S418 is iteratively executed until the replay of the music selection comes to an end. If the result of decision is YES, processing reverts to the step S414.

The system controller 154 iteratively executes the above-mentioned routine until all of the clip-filed music selections have been reproduced, or a stop key commanding the cessation of replay is actuated.

Thus the reproducing apparatus clip-files music selections if the music clip keys 251 to 254 are actuated during replay or replay-pause, while clip-playing the music selections registered at the music clip key if the music clip keys 251 to 254 are actuated during stop. Thus the clip-filed music selection may be easily reproduced by one key actuation. Additionally, the inconvenience of re-programming desired music selections for each reproduction may be eliminated.

The music selections clip-filed as described above may be erased (clip-erased) at any time during clip play.

Figure 48:
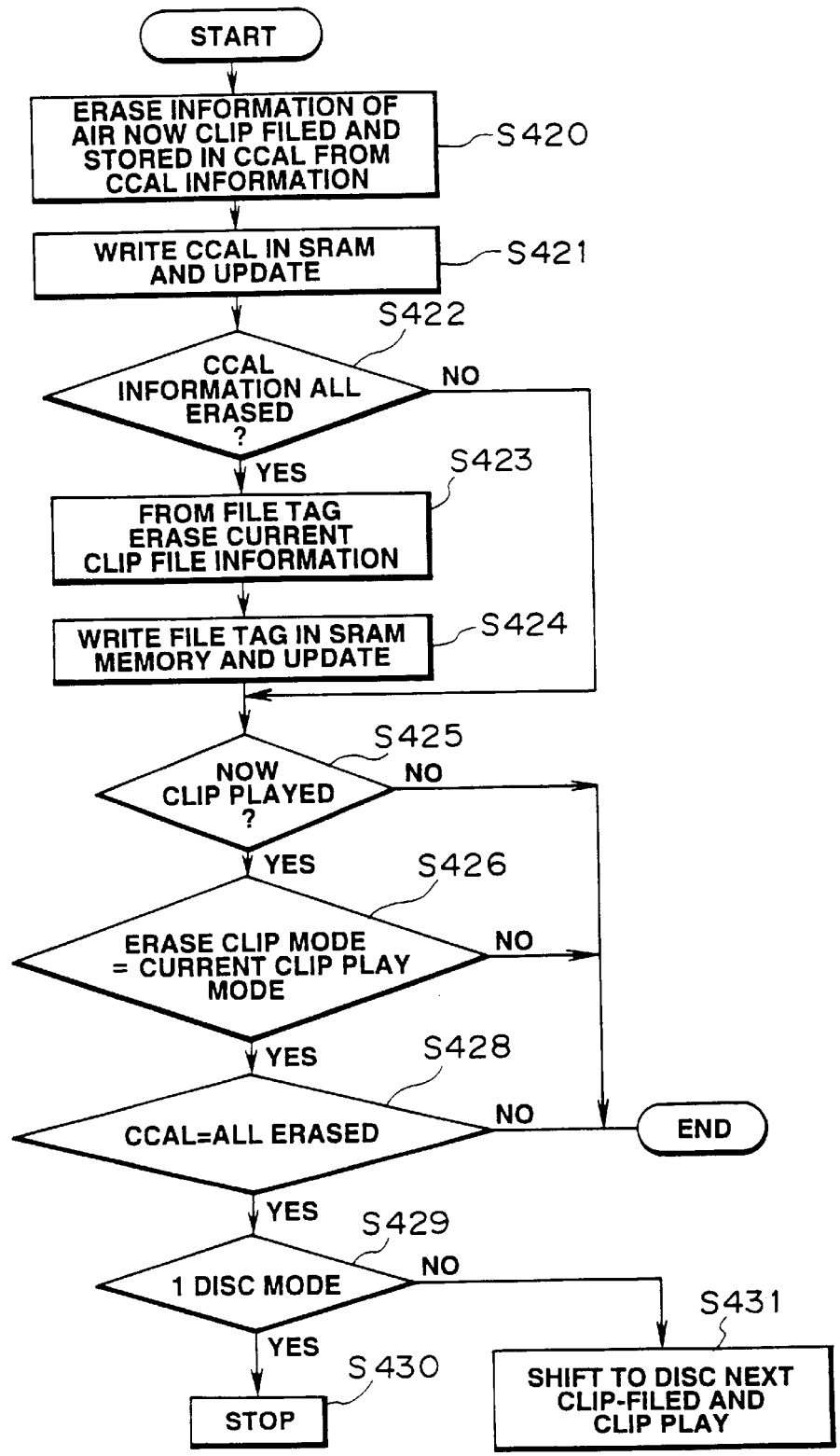
FIG. 48 is a flow chart for illustrating the clip erasing in the disc reproducing apparatus according to the present invention.

The clip erasure processing routine is as shown in the flow chart of FIG. 48. The flow chart shown in FIG. 48 is started when the music selection desired to be clip-erased is reproduced by the user designating such music selection and the erase key 255 is turned on while the music selection is reproduced. The flow chart is started at a step S420.

At the step S420, since the erase key 255 is actuated, the system controller 154 detects the registered information of the currently reproduced music selection from the four CCALs stored in the memory 153. Processing then transfers to a step S421.

At the step S421, the registered information of the currently reproduced music selection is erased from the CCAL stored in the memory 153. Processing then transfers to a step S422.

At the step S422, the system controller 154 checks whether as a result of erasure of the registered information of the currently reproduced music selection, there is any clip file in which the registered information of all of the music selections constituting the clip file has been deleted, that is whether there is any clip file in which there is no music selection to be registered. If the result of decision is YES, processing transfers to a step S423 and, if it is NO, processing transfers to a step S425.

At the step S423, a file tag is formed for the clip file completely devoid of the registered music selections for indicating that there is no registered music selection. Processing then transfers to the step S425.

At the step S425, the system controller 154 determines whether or not the clip play is currently performed. If the result of decision is YES, processing transfers to a step S426. If it is NO, a replay standby state is established after complete replay of the current music selection until designation of the next operation to terminate the clip erase routine.

At the step S426, the system controller 154 determines whether the clip file in which the clip-erased registered information has been registered is the currently clip-played clip file. If the result is NO, the currently reproduced music selection is continuously reproduced to terminate the clip erase routine. If the result is YES, processing transfers to a step S428.

At the step S428, the system controller 154 determines whether, as a result of the clip erasure, the currently reproduced clip file has become completely depleted of the registered information, that is, whether there is CCAL present in the currently reproduced clip file. If the result is YES, processing transfers to a step S429 and, if it is NO, the clip erase routine is terminated.

If the result of decision at the step S428 is NO and thus the clip erase routine is terminated, the system controller 154 controls the playback circuitry 155 for reproducing the music selection registered next to the clip-erased music selection.

At the step S429, the system controller 154 determines whether the current mode is the one-disc mode of designating replay of only one optical disc D. If the result of decision is YES, processing transfers to a step S430 for controlling the reproduction circuitry 155 for prematurely terminating the reproduction of the currently reproduced music selection. If the result of decision is YES, since the current mode is the continuous playback mode for continuously reproducing a plurality of optical discs D, processing transfers to a step S431.

At the step S431, the system controller 154 controls the rotary table 5 and the playback circuitry 155 for reproducing the optical disc D in which a music selection next to the clip-erased music selection is recorded. Thus the clip erase routine is brought to an end.

If the clip erasure has been performed, the system controller 154 controls the display unit 28 for displaying the letters "clip erase" and for erasing the music selection number of the music selection from the music calendar. Thus, the user is apprised of the fact that the currently reproduced music selection has been clip-erased.

It is possible for the reproducing apparatus to add a title or the like for each clip-filed music selection.

Thus, the user reproduces the music selection, to which the title or the like is desired to be affixed, during the clip play, and turns on a time/memo key 256 shown in FIG. 39 during reproduction of the music selection. On detection that the time/memo key 256 has been turned on during the clip play, the system controller 154 sets a clip memo mode as later explained, and controls the display unit 28 for displaying the letters "memo file" in a flickering manner. Thus, the user is apprised of the fact that the title or the like can now be affixed. If it is detected during the operating mode other than the clip play mode, for example, the stop mode, that the time/memo key 256 has been turned on, the system controller controls the display unit 28 for displaying the total recording time of the optical disc D currently loaded on the reproducing unit or the recording or playback time of the currently reproduced music selection.

The title or the like may be registered with katakana letters, alphabetical letters or numerals. Thus, the user actuates a registering letter changeover key, not shown, provided for previously selecting whether the title should be registered in letters or numerals and for changing over the letter registration to numeral registration or vice versa. If the letter registration is selected by the actuation of the registration letter changeover key, the system controller 154 controls the switch 258 shown in FIG. 39 for selecting a fixed terminal 258b with a movable terminal 258a. If the numeral registration is selected, the system controller controls the switch 258 for selecting a fixed terminal 258c with the movable terminal 258c.

The movable terminal 258a of the switch 258 is connected by means of a JOG rotation detection circuit 257 to the rotary actuating key 22 which the user rotates in order to select one of the letter registration and the numeric registration.

Figure 49:
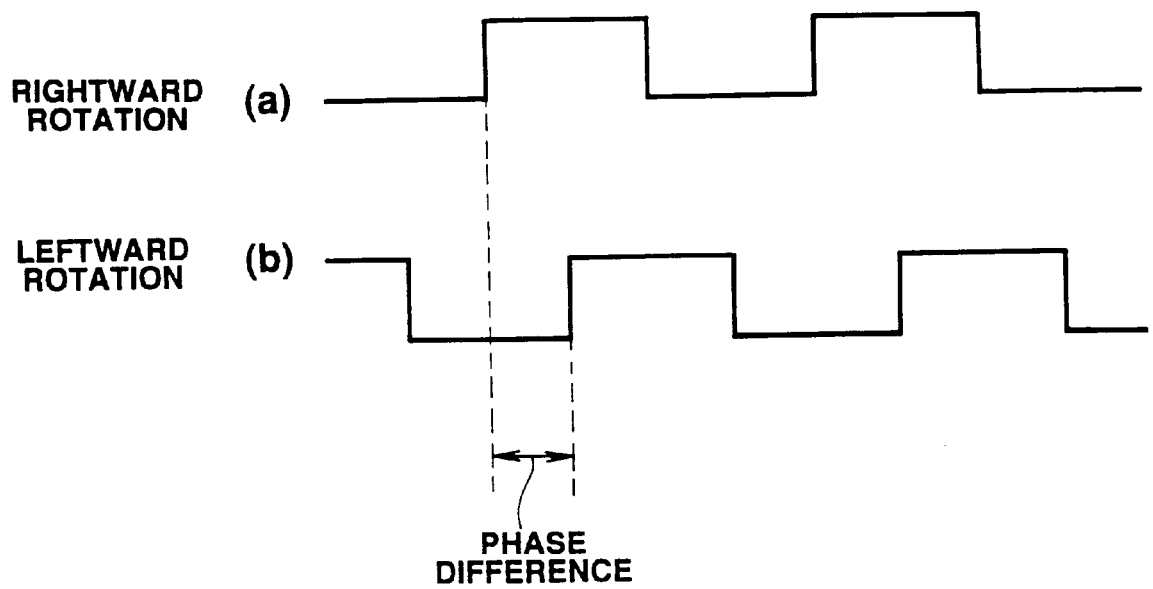
FIG. 49 is a waveform diagram for illustrating the phase difference of the pulses output depending on the direction of rotation of a rotary operating key provided in the disc reproducing apparatus according to the present invention.

That is, the direction of rotation or the like of the rotary actuating key 22 is detected by the JOG rotation detection circuit 257. The JOG rotation detection circuit 257 detects clockwise (that is, rightward) rotational actuation of the rotary actuating key 22 and, responsive to such actuation, outputs a first pulse phased as shown in FIG. 49a. The JOG rotation detection circuit 257 also detects counterclockwise (leftward) rotational actuation of the rotary actuating key 22 and, responsive to such actuation, outputs a second pulse having a phase difference of, for example, one-fourth of a period relative to the first pulse, as shown in FIG. 49b.

Specifically, the rotary actuating key 22 has, e.g., ten clicks therein so that, when the rotary actuating key 22 makes one complete rotation, the JOG rotation detection circuit 257 outputs ten first or second pulses.

If the user has designated letter registration, the first and second pulses are supplied by means of the switch 258 to a character updating circuit 261. If the user has designated numeric registration, the first and second pulses are supplied by means of the switch 258 to a disc number updating circuit 261.

Character data for displaying numerals, katakana letters or alphabetical letters are supplied to a character memory 260.

The character updating circuit 261 detects the phase of the supplied pulse in order to determine whether the pulse is the first pulse or the second pulse. If it is the first pulse, corresponding to the rightward rotation, the character data is read from the character memory 260 in the order of a, i, u, e and o or ABCD . . . , for example, and routed to the display unit 28. If it is the second pulse, corresponding to the leftward rotation, the character data is read from the character memory 260 in the order of o, e, u, i and a or DCBA . . . , for example, and routed to the display unit 28. Thus, the katakana letters and the alphabetical letters are displayed in the display unit 28 responsive to the rotational actuation of the rotary actuating key 22.

When the desired letter is displayed in the display unit by such actuation of the rotary actuating key 22, the user presses the pushbutton switch 27 provided at a mid portion of the rotary actuating key 22. This causes the pushbutton switch 27 to output a pulse, that is, a stationary pulse.

The pushbutton switch 27 is connected to the character updating circuit 261. When fed with the stationary pulse, the character updating circuit 261 controls the memory 153 for writing the katakana or alphabetical letters currently displayed in the display unit 28 in the character data storage region 153b of the memory 153. This causes the currently displayed katakana or alphabetical letters to be registered as one of the registered information data of the currently reproduced music selection.

If the user has designated the numeric registration, the first pulse or the second pulse is supplied by means of the switch 258 to the disc number updating circuit 259.

The disc number updating circuit 259 detects the phase of the supplied pulse in order to determine whether the pulse is the first pulse or the second pulse. If it is the first pulse, corresponding to the rightward rotation, the character data is read from the character memory 260 in the order of 01234 . . . , for example, and routed to the display unit 28. If it is the second pulse, corresponding to the leftward rotation, the character data is read from the character memory 260 in the order of 98765 . . . , for example, and routed to the display unit 28. Thus, the numerals are displayed in the display unit 28 responsive to the rotational actuation of the rotary actuating key 22.

When the desired numeral is displayed in the display unit by such actuation of the rotary actuating key 22, the user presses the pushbutton switch 27 provided at a mid portion of the rotary actuating key 22. This causes the pushbutton switch 27 to output a pulse, that is, a stationary pulse. The disc number updating circuit 259 is connected to the pushbutton switch 27, so that the stationary pulse is routed to the disc number updating circuit 259.

When fed with the stationary pulse, the disc number updating circuit 259 controls the memory 153 to write the numeral currently displayed in the display unit 28 in a disc number registration region 153a of the memory 153. Thus, the currently displayed numeral is registered as one of the registered information data for the currently played music selection.

The user repeats the above-described sequence of operations and, when the desired title or the like has been entered, he or she again actuates the time/memo key 256. In the present embodiment, character data corresponding to ten characters or letters may be stored.

When the time/memo key 256 is again actuated, the system controller 154 detects this and controls the display unit 28 for lighting for a predetermined time the letters "memo file" displayed in a flickering manner in the display unit. Thus, the user is apprised of the fact that the title or the like of the currently clip-filed music selection has now been registered.

The title and the like thus registered in the clip memo mode is read out during the clip play so as to be displayed in the display unit 28. Consequently, if desired music selections are selected from a plurality of optical discs D to form a clip file, the user can easily grasp which music selections make up the clip file.

Deletion of the character data of the registered title or the like, with the registered music selection information remaining intact, is hereinafter explained.

If the title or the like is to be deleted, the user first clip-plays the music selection the title or the like of which is desired to be deleted. The time/memo key 256 is turned on. This causes the system controller 154 to control the display unit 28 to display the letters "memo file" in a flickering manner as described above, and awaits an entry of the title or the like.

The user then actuates the erase key 255. This causes the system controller 154 to erase the character data of the music selection stored in the memory 153 and to erase the letters "memo file" so far displayed in a flickering mode so as to light up and display letters "file erase".

Thus, the user is apprised of the fact that the registered character data such as the title of the music selection has now been erased.

If the title or the like is affixed to each of the clip-filed music selections, it becomes possible to retrieve the desired music selection by such title.

For such retrieval, the user first actuates one of the music clip keys 251 to 254 associated with the clip files desired to be retrieved, and also actuates the time/memo key 256.

Thus, the system controller 154 enters the clip mode, as described above.

When the clip mode is set, the user actuates a retrieval key, not shown. This sets the system controller 154 to the retrieval mode, so that the display unit 28 is controlled to display the word "retrieval".

Specifically, the rotary actuating key 22 has, e.g., ten clicks therein. Thus, the system controller 154 is responsive to the rotational actuation of the rotary actuating key 22 to control the display unit 28 for updating the title displayed in the display unit 28 for each click.

Thus, the title of the music selections of the clip file is updated and displayed in the display unit 28, such as popular songs, folk songs or the like. The user retrieves the desired music selection as he or she views the title of the music selection displayed in the display unit 28.

When the desired title or the like is displayed in the display unit 28 by the rotary actuation of the rotary actuating key 22, the user actuates the pushbutton switch 24. The system controller 154 controls the rotary table 5 or the playback circuitry 155 or the like for reproducing the musical selections pertaining to the title which has been displayed on actuation of the pushbutton switch 24.

If, during the retrieval mode, the rotational actuation of the rotary actuating key 22 is halted, the system controller 154 counts the halt time duration. If 16 seconds, for example, have elapsed without actuation of the pushbutton switch 24, with the rotary actuating key remaining in the halted state, the system controller controls various parts to discontinue the retrieval mode in order to revert to the ordinary mode.

With the present reproducing apparatus, it is possible to retrieve music selections of the desired clip rile only by rotational actuation of the rotary actuating key 22, such that the retrieved music selection may be reproduced only by actuation of the pushbutton switch 24.

For retrieving the music selections, it is necessary to provide a plurality of keys. However, if music selection retrieval is made by the rotary actuating key 2 and the pushbutton switch 24, it becomes possible to reduce the number of keys which need to be provided for enabling retrieval of the music selection, with the result that the panel area and the number of component parts may be diminished to reduce the cost.

In the above embodiment, various data are updated and set using the rotary actuating key 22 and the pushbutton switch 24 mounted on the operating panel 11. Alternatively, the rotary actuating key 22 and the pushbutton switch 24 may be provided on a remote controller for updating and setting various data by remote control. Although the recording and/or reproducing apparatus according to the present invention is applied to a reproducing apparatus capable of reproducing a plurality of optical discs, it may also be applied to a reproducing apparatus capable of reproducing a single optical disc.

Industrial Utilizability

With the recording and/or reproducing apparatus for disc-shaped recording media according to the present invention, the possible presence of the disc-shaped recording medium in a preset holder of the disc housing unit is detected during transportation of the desired recording medium out of the housing unit, so that there is no necessity of providing a large number of sensors corresponding to the holding capacity of the housing unit. In addition, since the possible presence of the disc-shaped recording medium may be detected by the mechanical operation of the transporting mechanism, the apparatus itself may be reduced in size and production cost may also be reduced. The possible presence of the optical recording media may also be detected accurately without being affected by fluctuations in the surface state or in transparency of the disc-shaped recording media. Furthermore, with the recording and/or reproducing apparatus for disc-shaped recording media according to the present invention, the recording/reproducing unit is fixed to a main body of the recording and/or reproducing apparatus by a lock unit by regulating the force of elasticity of the floating unit during the time period when the disc-shaped recording medium is loaded by the chuck unit on the rotational driving means such as a disc driving unit, so that the relative position of the disc-shaped recording medium relative to the disc driving means or the recording and/or reproducing means such as an optical pickup may be accurately set in order to enable stabilized loading of the disc-shaped recording medium and in order to enable information signals to be recorded on or reproduced from the disc-shaped recording medium.

In addition, the present invention provides a recording and/or reproducing apparatus for disc-shaped recording media having a housing unit for containing a plurality of disc-shaped recording media and a transporting mechanism for transporting a selected one of the disc-shaped recording media contained in the housing unit to a position registering with the loading unit for rotational driving means of the recording and/or reproducing unit, in which the relative position between the selected disc-shaped recording medium and the recording and/or reproducing means or the rotational driving means for the disc-shaped recording medium may be accurately set in order to achieve reliable loading of the disc-shaped recording medium on the rotational driving means and in order to provide for accurate recording/reproduction of the information signals on or from the disc-shaped recording medium. Also, with the recording and/or reproducing apparatus for disc-shaped recording media according to the present invention, only the desired information from a single disc-shaped recording medium, only a desired one of the disc-shaped recording media or only the desired disc-shaped recording medium and the desired information from a plurality of disc-shaped recording media may be selected and the attributes of the information such as addresses or titles may be grouped and stored by memory means. The grouped information may be reproduced only by actuating group designating means during reproduction of the disc-shaped recording media.

This obviates the necessity of re-programming the desired information for each replay.

Moreover, if the group designating means is actuated during reproduction or reproduction pause or except during reproduction, the information being replayed is group-registered or the group information is to be reproduced, respectively, a given key may be used in two ways, so that the number of the operating keys may be reduced and the operating panel may be reduced in size.

Furthermore, since the information number or the like to be reproduced subsequently may be displayed in addition to the information numbers or the like of the currently reproduced information, the user may be positively apprised of which information data the group is composed.

What is claimed is:

1. A recording and/or reproducing apparatus for a disc-shaped recording medium, comprising:

a recording and/or reproducing unit having disc-shaped recording medium rotating means having a loading unit for loading the disc-shaped recording medium and adapted for rotating the disc-shaped recording medium loaded on said loading unit, and recording and/or reproducing means moved radially on the selected disc-shaped recording medium loaded on said rotating means for recording information signals on or reproducing information signals from the disc-shaped recording medium loaded on said rotating means;

floating means for elastically supporting said recording and/or reproducing unit on a main body of the recording and/or reproducing apparatus;

a chuck mechanism for loading the disc-shaped recording medium on said loading unit of said disc-shaped recording medium rotating means;

operating means for operating said chuck mechanism; and lock means mounted on said main body adjacent said floating means and operated by said operating means for controlling the elastic support of said floating means, whereby when the disc-shaped recording medium is loaded on said loading unit and secured by said operating means moving said chuck mechanism toward said rotating means, said operating means moves said lock means away from said floating means and releases control of the elastic support of said floating means.

2. The recording and/or reproducing apparatus for a disc-shaped recording medium as claimed in claim 1, wherein said recording and/or reproducing unit includes: first supporting means arranged for depending inside of the main body of the recording and/or reproducing apparatus for supporting the disc-shaped recording medium rotating means and the recording and/or reproducing means; and second supporting means rotatably supported within the main body of the recording and/or reproducing apparatus for rotating said first supporting means in directions towards and away from a vertical surface of the main body of the recording and/or reproducing apparatus, said first supporting means being elastically supported by means of said floating means by said second supporting means.

3. The recording and/or reproducing apparatus for a disc-shaped recording medium as claimed in claim 2, wherein said lock means includes securing means movably arranged in said second supporting means and adapted for securing said first supporting means to said second securing means against the bias of said floating means under pressure by biasing means, and movement means for moving said securing means against said biasing means.

4. The recording and/or reproducing apparatus for a disc-shaped recording medium as claimed in claim 2, wherein said lock means includes a lock plate movably supported on said second supporting means and biased by biasing means for thrustingly supporting said first supporting means and securing the first supporting means to the second supporting means, and an unlock lever for moving said lock plate against the bias of said biasing means.

5. A recording and/or reproducing apparatus for a disc-shaped recording medium, comprising:

a disc-shaped recording media housing unit for housing a plurality of disc-shaped recording media;

a recording and/or reproducing unit including disc-shaped recording medium rotating means having a loading unit for selectively loading a selected one of the plurality of disc-shaped recording media contained in said disc-shaped recording media housing unit, said disc-shaped recording medium rotating means rotating the disc-shaped recording medium loaded on the loading unit, and recording and/or reproducing means moved radially of the selected disc-shaped recording medium loaded on said disc-shaped recording medium rotating means for recording information signals on or reproducing information signals from the disc-shaped recording medium loaded on said disc-shaped recording medium rotating means;

floating means for elastically supporting said recording and/or reproducing unit on a main body of the recording and/or reproducing apparatus;

a transporting mechanism for transporting a selected one of the disc-shaped recording media housed within said disc-shaped recording media housing unit to a position in register with the loading unit of the disc-shaped recording medium rotating means;

a chuck mechanism for loading the disc-shaped recording medium on said loading unit of said disc-shaped recording medium rotating means;

operating means for operating said chuck mechanism; and lock means mounted on said main body adjacent said floating means and operated by said operating means for controlling the elastic support of said floating means, whereby when the disc-shaped recording medium is loaded on said loading unit and secured by said operating means moving said chuck mechanism toward said rotating means, said operating means moves said lock means away from said floating means and releases control of the elastic support of said floating means.

6. The recording and/or reproducing apparatus for a disc-shaped recording medium as claimed in claim 5, wherein said disc-shaped recording media housing unit has a main body of the housing adapted for radially holding the plurality of disc-shaped recording media with disc surfaces thereof erected upright and for being rotated about a center axis as a center of rotation, said transporting mechanism for the disc-shaped recording media transporting one of the plurality of disc-shaped recording media rotationally transported from a predetermined position to a loading position for securing said disc-shaped recording medium on said rotating means by said chuck mechanism.

7. The recording and/or reproducing apparatus for a disc-shaped recording medium as claimed in claim 6, wherein the plurality of disc-shaped recording media are loaded on the loading unit for the disc-shaped recording medium rotating means with major surfaces thereof perpendicular relative to the main body of the recording and/or reproducing apparatus.

8. A recording and/or reproducing apparatus for a disc-shaped recording medium, comprising:

a housing unit having a plurality of holders for radially holding a respective plurality of disc-shaped recording media with disc surfaces thereof erected upright, said housing unit being rotatably mounted on a pivot as a center of rotation between an exchange enabling position allowing for housing and exchange of at least one of the disc-shaped recording media exposed through an opening in a main body of the apparatus and a transport enabling position allowing for housing and transporting of the exposed disc-shaped recording medium, said housing unit having at least first and second detecting units for detecting a rotational position thereof, rotational driving control means having a first driving unit for rotationally driving said housing unit, detection means for detecting an amount of rotation of said housing unit based on said first and second detection units, and a controller for supplying a driving signal to said first driving unit based upon an input signal from an input unit for rotating said housing unit in an amount corresponding to the input signal from said input unit, said controller controlling the amount of rotation of said housing unit by said first driving unit based upon a detection output of said detection means;

transporting means having first and second arms for taking out a predetermined one of the disc-shaped recording media housed within the plurality of holders of said housing unit rotationally controlled by said rotational driving controlling unit which corresponds to an input signal from said input unit and for clamping an outer peripheral portion of the disc-shaped recording medium from a direction parallel to the disc surface for transporting the disc-shaped recording medium from the transporting enabling position as far as the recording and/or reproducing position, an arcuate guide section for abutting against the outer peripheral portion of the disc-shaped recording medium transported by said first and second arms for guiding the disc-shaped recording medium transported by said first and second arms, a second driving unit rotationally driving said first and second arms for moving the disc-shaped recording medium along said arcuate guide section, and a detection switch actuated by rotational movements of said first and second arms for detecting that there is no disc-shaped recording medium contained in the holder;

a recording and/or reproducing unit having disc-shaped recording medium rotating means arranged in register with the recording and/or reproducing position for rotatably holding the disc-shaped recording medium transported by said transporting means in cooperation with a chuck mechanism, recording and/or reproducing means for recording and/or reproducing information signals on or from the disc-shaped recording medium held by said transporting means in cooperation with said chuck mechanism, and a third driving unit for producing relative movement between said disc-shaped recording medium rotating means and said recording and/or reproducing means on one hand and said chuck mechanism on the other hand for holding the disc-shaped recording medium transported by said transporting means by said chuck mechanism and the disc-shaped recording medium rotating means;

floating means for elastically supporting said recording and/or reproducing unit on a main body of the recording and/or reproducing apparatus; and operating means for operating said chuck mechanism; and lock means mounted on said main body adjacent said floating means and operated by said operating means for controlling the elastic support of said floating means, whereby when the disc-shaped recording medium is loaded on said loading unit and secured by said operating means moving said chuck mechanism toward said rotating means, said operating means moves said lock means away from said floating means and releases control of the elastic support of said floating means.

9. A recording and/or reproducing apparatus for a disc-shaped recording medium, comprising:

a housing unit having a plurality of inserting slits for radially housing a respective plurality of disc-shaped recording media at outer peripheral portions thereof with the disc plane being upright and a detection unit for detecting a rotational position thereof, said housing unit being mounted for rotation on a pivot as a center of rotation;

selective input means for selecting one of the plurality of disc-shaped recording media housed within said housing unit;

rotational driving means having detection means for detecting the amount of rotation of said housing unit by detection of said detection unit and being adapted for rotational driving control of said housing unit based on an input signal from said selective input means and a detection signal from said detection means;

transporting means having rotatable first and second arms arranged respectively on a first side and a second side of said housing unit, a guide section for guiding the disc-shaped recording medium transported by said first and second arms by abutting against an outer periphery thereof, and a first driving unit for rotating said first and second arms, said transporting means taking out a predetermined one of the disc-shaped recording media held in a respective one of the plurality of inserting slits of said housing unit rotationally controlled by said rotational driving controlling means which corresponds to an input signal input at said selective input means, by clamping an outer peripheral surface of the disc-shaped recording medium from a direction parallel to the disc surface of the disc-shaped recording medium and by rotating said second arm by said first driving unit into the respective inserting slit, said transporting means transporting the disc-shaped recording medium thus taken out along said guide;

a recording and/or reproducing unit having disc-shaped recording medium rotating means arranged in register with a recording and/or reproducing position for rotatably holding the disc-shaped recording medium transported by said transporting means in cooperation with a chuck mechanism, recording and/or reproducing means for recording and/or reproducing information signals on or from the disc-shaped recording medium held by said transporting means in cooperation with said chuck mechanism, and a second driving unit for producing relative movement between said disc-shaped recording medium rotating means and said recording and/or reproducing means on one hand and said chuck mechanism on the other hand for holding the disc-shaped recording medium transported by said transporting means by said chuck mechanism and the disc-shaped recording medium rotating means; and regulating means for regulating rotation of said housing unit when transporting the disc-shaped recording medium by said transporting means.

10. The recording and/or reproducing apparatus for a disc-shaped recording medium as claimed in claim 9, wherein said first driving unit includes a cam having a cam groove engaged by said regulating means for driving said regulating means.

11. The recording and/or reproducing apparatus for a disc-shaped recording medium as claimed in claim 9, further comprising:

floating means for elastically supporting said recording and/or reproducing unit in a main body of the apparatus.

12. The recording and/or reproducing apparatus for a disc-shaped recording medium as claimed in claim 11, further comprising:

operating means for operating said chuck mechanism; and lock means mounted on said main body and operated by said operating means for controlling the elastic support of said floating means, whereby when the disc-shaped recording medium is secured on said rotating means by said operating means moving said chuck mechanism toward said rotating means, said operating means moves said lock means away from said floating means and releases control of the elastic support of said floating means.

* * * * *